US012604239B2

(12) United States Patent
Seed et al.

(10) Patent No.: US 12,604,239 B2
(45) Date of Patent: Apr. 14, 2026

(54) SEAMLESS EDGE APPLICATION HANDOVER

(71) Applicant: InterDigital Patent Holdings, Inc., Wilmington, DE (US)

(72) Inventors: Dale Seed, Allentown, PA (US); Chonggang Wang, Princeton, NJ (US); Xu Li, Plainsboro, NJ (US); Lu Liu, Conshohocken, PA (US); Michael Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 524 days.

(21) Appl. No.: 17/785,556

(22) PCT Filed: Dec. 16, 2020

(86) PCT No.: PCT/US2020/065268
§ 371 (c)(1),
(2) Date: Jun. 15, 2022

(87) PCT Pub. No.: WO2021/126948
PCT Pub. Date: Jun. 24, 2021

(65) Prior Publication Data
US 2023/0026671 A1      Jan. 26, 2023

Related U.S. Application Data

(60) Provisional application No. 62/951,377, filed on Dec. 20, 2019.

(51) Int. Cl.
*H04W 36/00*        (2009.01)
*H04W 36/32*        (2009.01)

(52) U.S. Cl.
CPC ..... *H04W 36/0033* (2013.01); *H04W 36/322* (2023.05); *H04W 36/0019* (2023.05); *H04W 36/00692* (2023.05)

(58) Field of Classification Search
None
See application file for complete search history.

(56) References Cited

U.S. PATENT DOCUMENTS

| | | | |
|---|---|---|---|
| 10,499,304 | B1 | 12/2019 | Stauffer et al. |
| 2019/0045409 | A1 | 2/2019 | Rasanen et al. |

(Continued)

FOREIGN PATENT DOCUMENTS

| | | |
|---|---|---|
| CN | 108076488 A | 5/2018 |
| CN | 108282801 A | 7/2018 |

(Continued)

OTHER PUBLICATIONS

"Mobile Edge Computing (MEC); End to End Mobility Aspects", ETSI Group Report, European Telecommunications Standards Institute (ETSI), vol. MEC, No. V1.1.1 Oct. 18, 2017, pp. 1-52.

(Continued)

*Primary Examiner* — Saumit Shah
(74) *Attorney, Agent, or Firm* — Flaster Greenberg, P.C.

(57) ABSTRACT

An edge application handover client in a user equipment may use application client information, such as type service, provider, location, context, and sendee requirements, to assist seamless edge application handovers of application clients between edge application servers. For example, a handover client may use context information to determine an anticipated route of the user equipment, and thereby determine a next, edge application server for a handoff. The handover client may weigh the needs of multiple application clients m selecting servers for handovers. The handover client may issue requests to servers requesting assistance in handover operations, and may issue subscription requests to servers, and further may determine the success of handovers by monitoring application state synchronization or migration between edge application handover servers.

14 Claims, 41 Drawing Sheets

(56) References Cited

U.S. PATENT DOCUMENTS

| | | | |
|---|---|---|---|
| 2019/0182895 A1 | 6/2019 | Di et al. | |
| 2019/0261260 A1* | 8/2019 | Dao | H04W 48/00 |
| 2019/0268812 A1 | 8/2019 | Li et al. | |
| 2021/0058489 A1* | 2/2021 | Kim | H04L 67/63 |
| 2021/0385617 A1* | 12/2021 | Huang | H04W 4/026 |
| 2022/0303196 A1* | 9/2022 | Giust | H04L 41/0893 |
| 2022/0338113 A1* | 10/2022 | Gupta | H04W 48/18 |

FOREIGN PATENT DOCUMENTS

| | | |
|---|---|---|
| CN | 108781389 A | 11/2018 |
| CN | 109392030 A | 2/2019 |
| CN | 109792652 A | 5/2019 |
| EP | 3509349 A1 | 7/2019 |
| JP | 2019-532604 A | 11/2019 |
| WO | 2018/135282 A1 | 7/2018 |

OTHER PUBLICATIONS

Convida Wireless LLC: "Solutions 20, 21 clean-up and conclusion to Key Issue#9 Preserving Service Continuity", 3GPP Draft; S6-192066, 3rd Generation Partnership Project (3GPP), Mobile Competence Centre; vol. SA WG6, No. Reno, Nevada; Nov. 4, 2019, Nov. 11, 2019-Nov. 15, 2019.

Huawei et al: "Key Issue on support for in-order packet delivery during application relocation", 3GPP Draft; S2-1912353, 3rd Generation Partnership Project (3GPP), Mobile Competence Centre; vol. SA WG2 Nov. 21, 2019, Oct. 18, 2019-Nov. 11, 2019.

Huawei et al: "Pseudo-CR on Solution to Edge Application Server discover and update", 3GPP Draft; S6-191885—WAS1723—Solution To Edge Application Server Discover and Update, 3rd Generation Partnership Project (3GPP), Mobile Competence Centre; vol. SA WG6, Sep. 8, 2019, Sep. 2, 2019-Sep. 6, 2019.

INTEL: "Pseudo-CR on Solution for preserving service continuity", 3GPP Draft; S6-191689 PSEUDO-CR On Solution for Preserving Service Continuity, 3rd Generation Partnership Project (3GPP), Mobile Competence Centre; vol. SA WG6, Aug. 25, 2019, Sep. 2, 2019-Sep. 6, 2019.

Suresh Chitturi (Samsung Research) Alan Soloway (Qualcomm Technologies) Jukka Vialen (Airbus): "Overview of 3GPP SA WG6", 3GPP Draft; S6-191415 SA6VERTICALSWS, 3rd Generation Partnership Project (3GPP), Mobile Competence Centre; vol. SA WG6, Jul. 12, 2019, XP051757969.

"Technical Specification Group Services and System Aspects; Application layer support for Vehicle-to-Everything (V2X) services; Functional architecture and information flows," 3rd Generation Partnership Project, 3GPP TS 23.286 V16.1.0 (Release 16), Sep. 2019, pp. 59.

"Technical Specification Group Services and System Aspects; Study on application architecture for enabling Edge Applications," 3rd Generation Partnership Project, 3GPP TR 23.758 V1.0.0, (Release 17), Sep. 2019, pp. 78.

"Technical Specification Group Services and System Aspects; Study on enhancements to application layer support for V2X services," 3rd Generation Partnership Project; 3GPP TR 23.764 V0.2.0 (Release 17), Sep. 2019, pp. 17.

OneM2M 3GPP Interworking, oneM2M TS-0026, v4.2.0, 2019.

Slovetskiy, S., et al., "Managing Non-IP Devices in Cellular IoT Networks," White Paper, OMA, LWM2M, V1.1, Oct. 2018, pp. 21.

Nokia et al., "Pseudo-CR on solution to Key Issues 9 with an alternative flow", 3GPP TSG-SA WG6 Online meeting Oct. 24, 2019, 3GPP TR 23.758, S6-192341, 5 Pages.

* cited by examiner

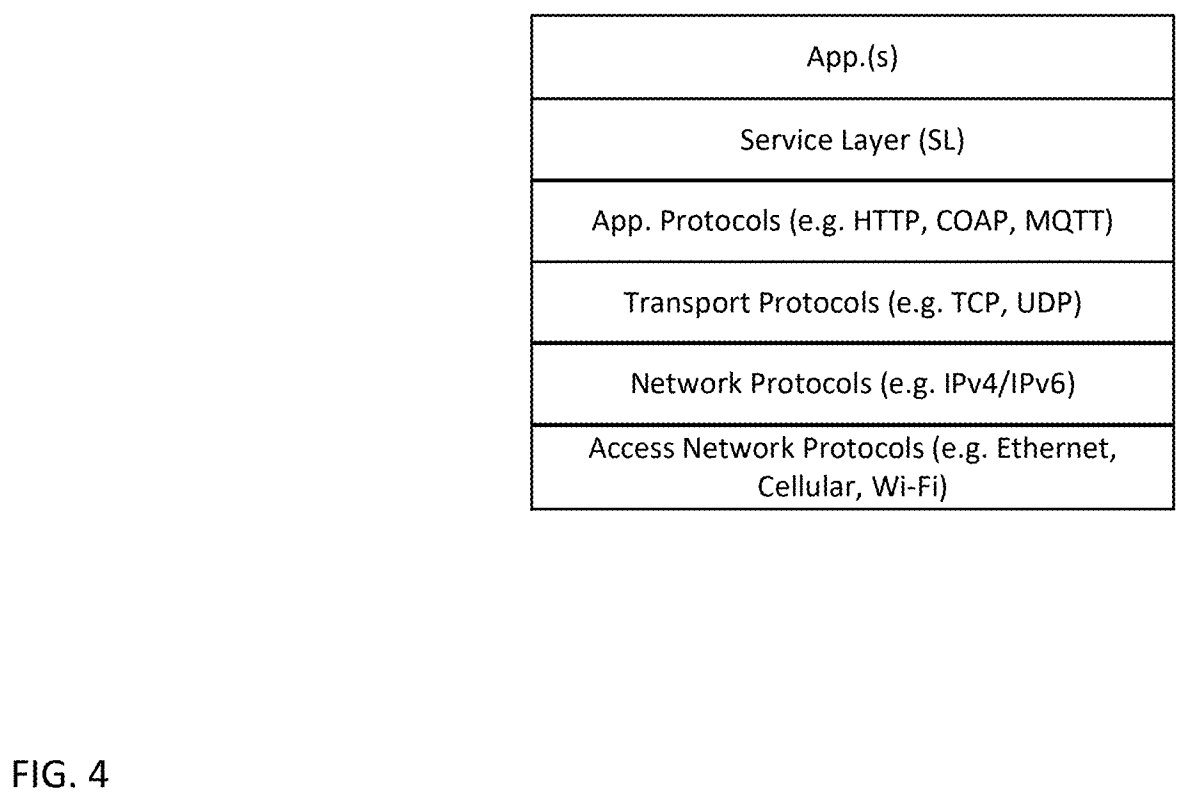

App.(s)

Service Layer (SL)

App. Protocols (e.g. HTTP, COAP, MQTT)

Transport Protocols (e.g. TCP, UDP)

Network Protocols (e.g. IPv4/IPv6)

Access Network Protocols (e.g. Ethernet, Cellular, Wi-Fi)

FIG. 4

EAH Policy Configuration

- EAS types
- EASs
- users
- subscribers
- ACs
- AC types
- providers
- UE locations
- UE routes
- Edge networks
- Edge nodes
- UEs
- Privacy
- DNS Servers

SEAMLESS EDGE APPLICATION HANDOVER

CROSS-REFERENCE TO RELATED APPLICATIONS

This application is the National Stage Application of International Patent Application No. PCT/US2020/065268, filed Dec. 16, 2020, which claims the benefit of U.S. Provisional Patent Application No. 62/951,377, filed on Dec. 20, 2019, titled "Seamless Edge Application Handover," the content of which is hereby incorporated by reference herein.

BACKGROUND

Machine-To-Machine (M2M), Internet-of-Things (IoT), and Web-of-Things (WoT) network deployments may encompass a wide variety of servers, gateways, and devices, such as those described in, for example: 3GPP Application layer support for Vehicle-to-Everything (V2X) services, 3GPP TS 23.286 v16.1.0; 3GPP Study on enhancements to application layer support for V2X services, 3GPP TR 23.764, v0.2.0; 3GPP; Study on Application Architecture for Enabling Edge Applications, 3GPP TR 23.758, v.0.0; oneM2M 3GPP Interworking, oneM2M TS-0026, v4.2.0; and Open Mobile Alliance (OMA) Lightweight Machine-to-Machine protocol LWM2M, v 1.1.

SUMMARY

Edge Application Handover Client (EAHC) functionality may be hosted on a UE that performs one or more of the following operations to assist Application Clients (ACs) on the UE with handovers between different instances of Edge Application Servers (EAS)s in the system.

The EAHC functionality on the UE may be a new dedicated function or it may be a sub-function of an existing function such as a 3GPP Edge Enabler Client, a 3GPP V2X Application Enabler Client, a oneM2M Common Services Entity (CSE), a oneM2M AE or a LWM2M Client.

An EAHC may support the capability to be configured with EAH policies. The EAH policies may include criteria used to determine what EAH operations an EAHC is to perform and under what conditions it is to perform these operations. The EAH policies may contain rules that are contingent upon:

types of requested services
    users, subscribers, and/or ACs
    network and/or service providers
    QoS/QoE levels
    location(s) of UE
    specified route(s) or anticipate route(s) of a UE
    edge or local area data network instances that a UE is connected to
    the status or availability of edge nodes
    deployment status of requested services An EAHC may support the capability to interface to ACs hosted on the UE to enable the ACs to share their past, present or future application service requirements and context information with the EAHC. The EAHC may locally store and process this information to assist with seamless edge application handovers of ACs between EASs. The EAHC may factor this context into its determination of if/when a handover of the AC is required from one EAS to another EAS. The EAHC may also share this information with an EAHS in the network to assist the ACs with managing seamless edge application handovers between EASs.

By interfacing with ACs on the UE, the EAHC may also support the capability to allow ACs to initiate an EAH. For example, if an AC detects that the level of service that it is receiving from an EAS is not meeting its requirements, an AC may initiate an EAH via a request to the EAHC. The EAHC can receive such requests from ACs and assist the ACs by performing EAH operations on their behalf.

An EAHC may support the capability to analyze service requirements and context information pertaining to ACs, EASs and the network(s) that interconnect the ACs and EASs. Based on this analysis and EAH policies, an EAHC may determine if/when an EAH is required. An EAHC may trigger an AC to perform EAH operations. Alternatively, the EAHC may perform EAH operations on behalf of an AC to assist it with performing the EAH.

Since an EAHC may be privy to service requirements and context information of all the ACs hosted on the UE, the EAHC may aggregate this information to make EAH decisions that are optimized across all the ACs on a UE. For example, if a single edge node in a network supports all EASs required by the different ACs on the UE, the EAHC may determine that an EAH operation to have the ACs use the EASs hosted on this single edge node is desired to enable the UE to operate in a more efficient manner (e.g., UE only requires a single PDU session to a single edge node).

An EAHC may issue requests to one or more EAHSs in the network to have them assist with EAH operations. One type of request may include a request to obtain information regarding available EASs in the current proximity (e.g., within the same LADN) of the UE and that are the best candidate EASs for an AC to be handed over to.

An EAHC may issue subscription request(s) to an EAHS in the network to receive notifications from the EAHS. One type of subscription may to be receive notifications if/when the EAHS determines that an AC should be handed off from one EAS to another.

Based on subscription requests to an EAHS, the EAHC may receive notifications from the EAHS. One type of notification may be a trigger to the EAHC to perform EAH operations for one or more designated ACs.

An EAHC may perform EAS FQDN resolution assistance operations when an EAH occurs. To minimize impact of an EAH on an AC and allow the AC to continue to use the same EAS FQDN before and after an EAH occurs, the EAHC may perform EAS FQDN resolution operations on behalf of an AC. This enables ACs to use the same EAS FQDNs to communicate with EASs even after an EAH has occurred. Thus, ACs are not burdened with managing lower level EAS point-of-contact information (e.g., IP addresses, ports, URIs) which can become stale after an EAH occurs. Instead, the EAHC can handle this burden on behalf of an AC.

An EAHC may perform establishment and tear-down of security sessions in an EAH aware manner on behalf of an AC. These operations may be performed by the EAHC when it triggers an EAH or in response to an EAH request that it receives from an AC or EAHS.

An EAHC may trigger and monitor application state synchronization or migration between EASs during an EAH and based off the status of state synchronization or migration determine whether an EAH was successful or another EAH is required.

An EAHC may buffer outgoing requests from ACs towards EASs while EAH operations are being performed (e.g., refreshing DNS lookup results, migrating state information to a new EAS, etc.). When EAH operations are completed and a new EAS is accessible, an EAHC may forward these requests to the new EAS for processing.

Edge Application Handover Server (EAHS) functionality may perform one or more of the following operations to assist Application Clients (ACs) hosted on UEs with the seamless handover between different instances of Edge Application Servers (EAS)s in the system.

An EAHS may be a standalone function or a sub-function of an existing EAHS such as a V2X Application Enabler Server, SEAL Server, Edge Enabler Server, an Edge Data Network Configuration Server, a oneM2M CSE or a LWM2M Server.

An EAHS may support the capability to be configured with EAH policies. The EAH policies may include rules used to determine what EAH operations an EAHS is to perform and under what conditions it is to perform these operations. The EAH policies may contain rules that are contingent upon:

types of requested services users, subscribers, and/or ACs network and/or service providers QoS/QoE levels location(s) of UE specified route(s) or anticipate route(s) of a UE edge or local area data network instances that a UE is connected to the status or availability of edge nodes deployment status of requested services EAHS policy rules may be contingent upon context information that pertain to information such as a UE's current location, a UE's planned or anticipated route, status information pertaining to the network (e.g., congestion levels).

An EAHS may interface to various entities in a 3GPP system and receive context information from these entities including but not limited to Core Network Functions, Application Clients, Edge Enabler Clients. Edge Application Handover Clients, V2X Application Enabler Servers, SEAL Servers, Edge Enabler Servers, Edge Data Network Configuration Servers, a oneM2M CSEs or LWM2M Servers.

Based on EAH policies, an EAHC may analyze context information and service requirements from entities in the system and determine if/when an EAH is required. An EAHS may trigger an EAHC to perform EAH operations on behalf of an AC to assist it with performing the EAH.

An EAHS may receive subscription request(s) from an EAHC hosted on a UE to receive notifications from the EAHS. One type of subscription may be to receive notifications if/when the EAHS determines that an AC should be handed off from one EAS to another.

Based on subscription requests from an EAHC, the EAHS may send notifications to an EAHC. One type of notification may be a trigger to the EAHC to perform EAH operations for one or more designated ACs.

An EAHS may interface to management function(s) in the system to query and discover available edge nodes that host (or that are capable of hosting) one or more specified types of EASs.

The EAHS may further specify the queried edge nodes to be located in proximity to a specified UE and/or located along an anticipated route of a UE Based on EAH policies and related context information, an EAHS may determine if/when edge nodes require EAS management operations to be performed (e.g., edge nodes that are in proximity to an AC's current location or along an anticipated route).

An EAHS may interface to management function(s) in the system to manage the deployment of EASs and instances of installed EASs on available edge nodes (e.g., edge nodes that are in proximity to an AC's current location or along an anticipated route).

An EAHS may assist the management function(s) in the system by sharing EAH related context information and/or performing an EAH as required by the management function(s).

An EAHS may assist the management function(s) in the system to interact with the service provider to trigger management operations (e.g., deploying new EASs, install/activate EASs). An EMS may interface to 3GPP network functions to configure and reserve connectivity centric resources in the 3GPP network (e.g., QoS session) between ACs on UEs and EASs in proximity to the current location of UEs or along an anticipated route.

An EAHS may send a request to an EAHC to instruct it to refresh cached DNS lookup results for a specified EAS FQDN by having the EAHC perform another DNS lookup. The request may also instruct the EAHC to switch over to a new DNS server to perform the lookup by providing it with updated DNS Server point-of-contact information. Before issuing a request to an EAHC, the EAHS may first initiate the update of EAS point-of-contact information stored within the DNS records of a DNS server such that an EAS FQDN maps to a different EAS.

When a handover of an AC occurs to a new EAS, an EAHS may share the AC's credentials with the new EAS over the secure communication session that exists between the EAHS and EAS. An EAHS may also share the EAS's credentials with an EAHC over the secure communication session that exists between the EAHS and EAHC. During this process the EAHS may also communicate with a security function in the network if new/updated credentials are required.

When an EAH occurs, an EAHS may assist EASs, involved in handoffs with one another, to establish a trust relationship so that they can securely perform handoff operations such as secure synchronization/migration of application state. When a handover of an AC occurs to a new EAS, the EAHS can share the old EAS's credential with the new EAS and vice versa.

When an EAH occurs, an EAHS may trigger and monitor application state synchronization or migration operations that occur between EASs during the EAH. Based off the status of the application state synchronization or migration, the EAHS may determine whether an EAH was successful or another EAH is required.

Using context information, a predicted route may be calculated by an EAHS and then used to select the next EAS(s) that AC(s) hosted on a UE are handed off to. An EAHS may monitor the current location of UE(s) relative to the different way points defined by a route and track a UE's movement along the route as well as any unexpected deviations.

An EAHS may share anticipated route information for one or more UEs with a 3GPP network such that the network can configure and optimize its network resource to ensure the requirements (e.g., QoS) of the UE(s) are met while traveling along the route.

An EAHS may request that the 3GPP network track the movement of UE(s) along an anticipated route on its behalf and send it notifications regarding the movement of UE(s) along the route such as notifications of when the UE arrives at specified way points along the route or when the UE deviates from the route.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 4 illustrates an example protocol stack supporting a service layer.

DETAILED DESCRIPTION

Table 0.1 of the Appendix contains explanations of selected abbreviations used here. Table 0.2 contains explanations of selected terms.

Edge Application Deployments

The benefits of deploying Application Servers (ASs) at the edge of a 3GPP system rather than in the cloud include reduced access latency and increased reliability for Application Clients (ACs) who access the services offered by these ASs. In addition, network operators may also benefit from the deployment of ASs at the edge of their networks since this model of deployment may allow them to distribute the load and reduce congestion levels in their networks (e.g., by enabling localized communication between ACs and ASs).

Figure 1:
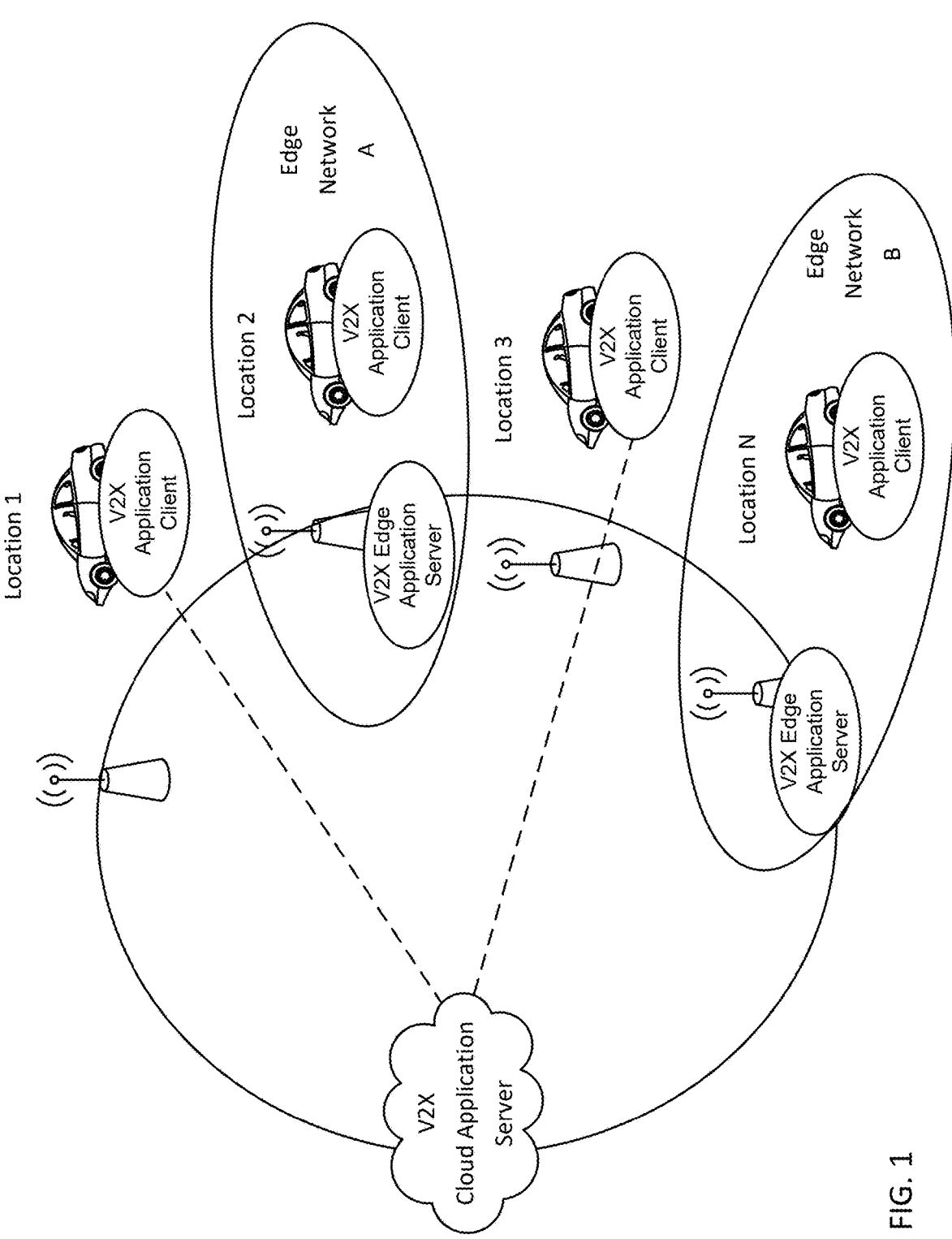
FIG. 1 is a block diagram of an example of the use of edge and cloud V2X application servers by V2X application clients on user equipments (UEs).

For example, FIG. 1 illustrates an autonomous vehicular use case. A vehicle hosts a UE and hosted on the UE is a V2X AC used by the vehicle's autonomous driving control system. The V2X AC communicates with V2X services deployed in a 3GPP system (e.g., platooning service, cooperative driving service, collision avoidance service, etc.). The V2X services are deployed in a distributed manner across the system as a combination of V2X ASs deployed on edge nodes (e.g., road-side units, cell towers, etc.) as well as in the cloud.

For enhanced performance (e.g., reduced access latency and higher reliability), the preferred method for accessing the V2X services by V2X ACs is via V2X ASs that are deployed in edge networks in the system which are in closer proximity to the vehicles rather than accessing V2X ASs via the cloud. When accessing the V2X ASs at the edge, a V2X AC hosted on the UE within the vehicle can take advantage of timelier and more reliable information regarding other vehicles and conditions of the roadway and traffic. As a result, the vehicle can travel at higher rates of speed and at closer distances to other vehicles. The vehicle is also able to change lanes more often and effectively without sacrificing safety. In contrast, when accessing V2X ASs in the cloud, the vehicle must fall back into a more conservative mode of operation due to the decreased availability of timely information. This typically results in a reduction in the vehicle's speed, an increase in distance between the vehicle and other vehicles and less optimal lane changes.

As vehicles travel down roadways, handovers of V2X ACs between V2X ASs hosted on different edge nodes in closest proximity to the vehicles must be coordinated. Likewise, handovers of V2X ACs between V2X ASs hosted on edge nodes and V2X ASs hosted in the cloud must also be coordinated for cases where edge network coverage fades in and out during a vehicle's journey. For all of these scenarios, seamless (e.g., low latency and reliable) V2X AC handovers, between ASs hosted on both edge nodes as well as in the cloud, is critical and essential for the successful deployment of this type of V2X use case as well as other types of use cases having similar requirements as V2X.

3GPP Architecture for Enabling Edge Applications

Figure 2:
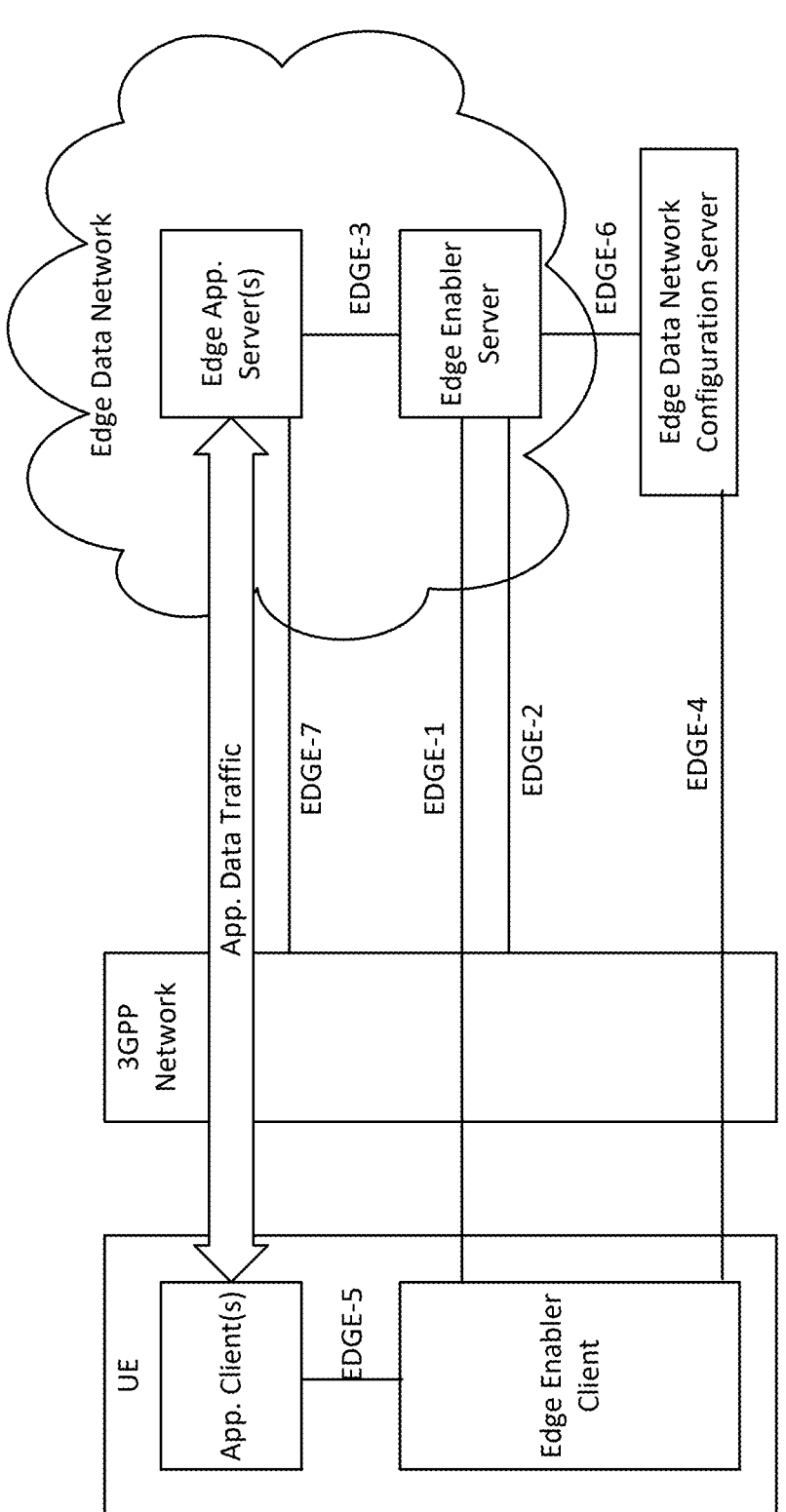
FIG. 2 is a block diagram of an example 3GPP architecture for enabling edge applications.

FIG. 2 shows the 3GPP defined architecture for enabling edge applications. See TR 23.758. The Framework for enabling edge applications consists of an Edge Enabler Client and Application Client(s) hosted on the UE and an Edge Enabler Server and Edge Application Server(s) hosted in an edge data network. An Edge Data Network Configuration Server is used to configure Edge Enabler Clients and Edge Enabler Servers. The Edge Enabler Client and Server offer edge centric capabilities to Application Clients and Servers, respectively. The Edge Enabler server and Edge Data Network Configuration Server may also interact with the 3GPP network.

3GPP Architecture for Enabling V2X Applications

Figure 3:
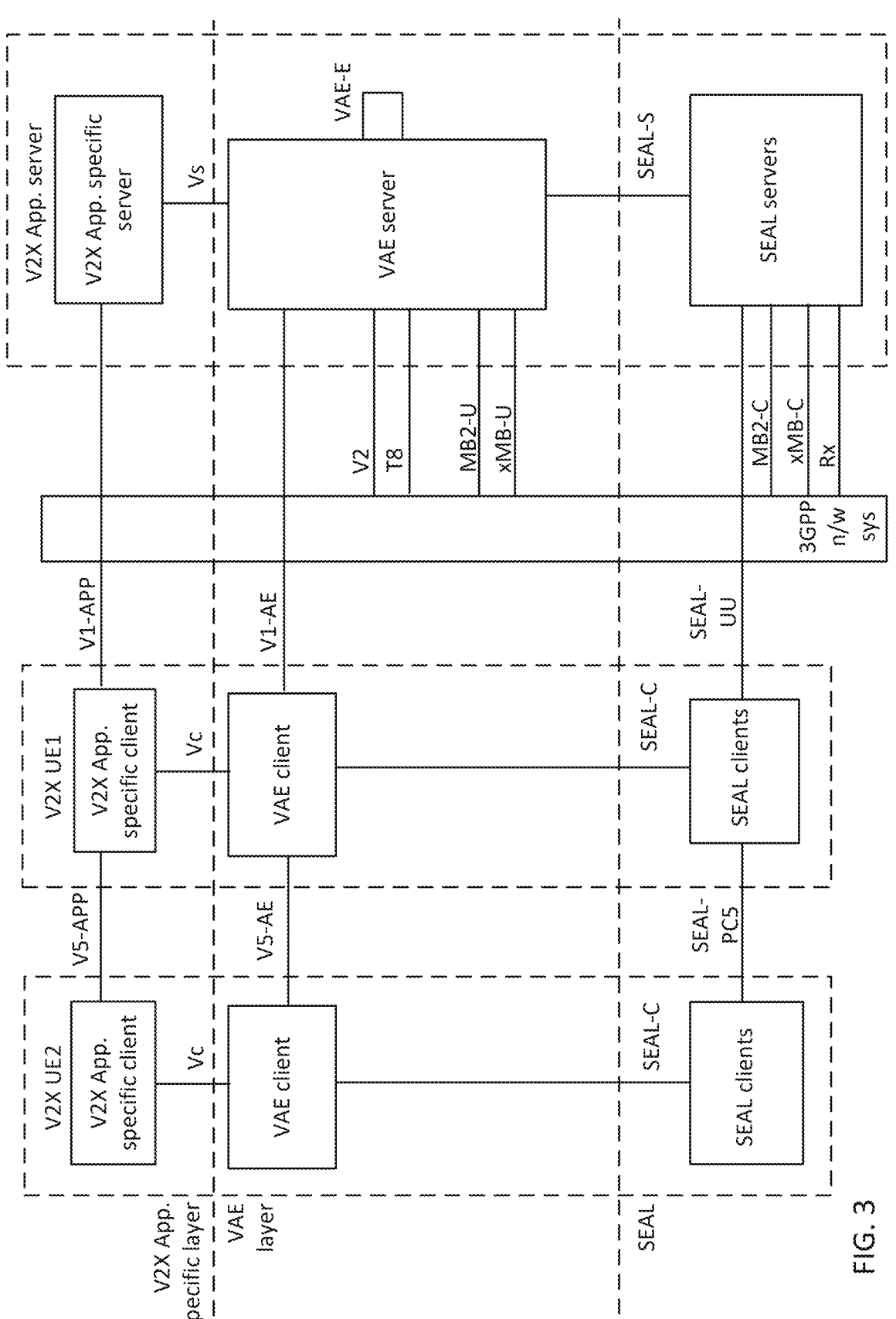
FIG. 3 is a block diagram of an example 3GPP defined architecture for enabling V2X applications. See TS 23.286.

FIG. 3 shows the 3GPP defined architecture for enabling V2X applications. See TS 23.286. The V2X Application Enablement (VAE) layer consists of a VAE Client hosted on the UE and a VAE Server hosted in the network. The VAE Client and Server offer VAE centric capabilities to V2X application clients and servers. The VAE Client and Server interface to more generic (e.g., non-V2X specific) services offered by the Service Enabler Architecture Layer (SEAL) Client and Server, respectively. The SEAL services consist of location management, group management, configuration management, identity management, key management and network resource management.

The VAE and SEAL servers may also interact with the 3GPP network system (e.g., over 3GPP defined reference points such as V2, MB2, xMB, Rx and T8).

IoT Service Layer (SL)

An IoT Service Layer (SL) is a technology specifically targeted towards providing value-added services for IoT devices, IoT applications and IoT data. Recently, several industry standard bodies have been developing IoT SLs to address the challenges associated with the integration of IoT devices, applications and data into deployments with the Internet/Web, cellular, enterprise, and home network. These include oneM2M, ETSI, OCF, and OMA, for example. See, e.g., 3GPP Application layer support for Vehicle-to-Everything (V2X) services, 3GPP TS 23.286 v16.1.0, 3GPP Study on enhancements to application layer support for V2X services, 3GPP TR 23.764, v0.2.0, oncM2M TR 23.758, oneM2M 3GPP Interworking, oneM2M TS-0026, v4.2.0, and Open Mobile Alliance (OMA) Lightweight Machine-to-Machine protocol LWM2M, v 1.1.

An IoT SL can provide applications and devices access to a collection of IoT oriented capabilities. A few examples include security, charging, data management, device management, discovery, provisioning, and connectivity management. These capabilities are made available to devices and applications via APIs which make use of message formats, resource structures and resource representations supported by the IoT SL.

From a protocol stack perspective, SLs are typically situated above the Application Protocol Layer and provide value added services to applications they support. Hence SLs are often categorized as 'middleware' services. FIG. 4 shows an exemplary service layer between the Application Protocols and Applications.

Figure 5:
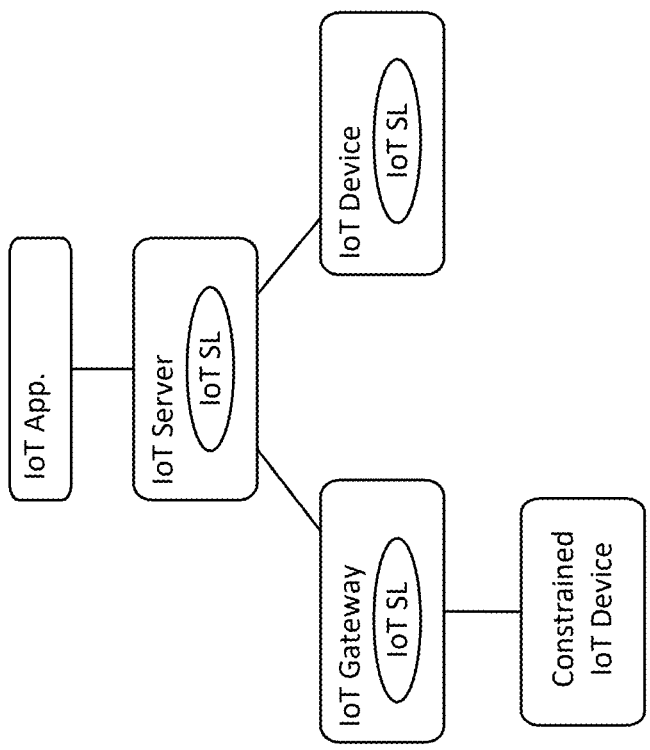
FIG. 5 is a block diagram of an example IoT service layer (SL) deployed on various types of connected network nodes.

From a deployment perspective, an IoT SL can be deployed on various types of network nodes including IoT servers, gateways and devices as shown in FIG. 5.

Example Challenges

3GPP is in the process of defining a 5G edge application architecture. See, e.g., TR 23.758. The motivation is to define a standardized framework for deploying various types of Edge Application Servers (EASs) at edge nodes of a 3GPP system in a manner which has minimal impact on Application Clients (ACs) hosted on UEs. However, the current 5G Edge Application Architecture does not yet define adequate support for seamless handover of ACs from one EAS to another for use cases involving ACs hosted on UEs requiring frequent handovers between EASs. Wherein seamless handover of an AC from one EAS to another EAS means the level of service that the AC experiences is maintained and there are no noticeable service degradation or service interruptions. The frequency of handovers is determined by the level of service (e.g., latency) required by the AC and the service coverage areas of the available EASs.

3GPP is also in the process of defining a 5G V2X Application Architecture. See, e.g., TS 23.286 and TR 23.764. The motivation is to define standardized types of V2X Application Servers (e.g., platooning) that can be deployed over 3GPP systems. However, the current 5G V2X Application Architecture does not yet define adequate support for seamless handover of V2X ACs between V2X EASs.

To support use cases such as the V2X example shown in FIG. 1, the capability to seamlessly transition (e.g., handover) an AC from one EAS to another EAS with low latency and high reliability is required. Below is a summary of some of the unique challenges involved with achieving seamless handover of ACs between EASs. These challenges have not yet been adequately addressed by the 5G Edge Application Architecture or 5G V2X Application Architecture.

Determining which EAS in the system is the most optimal one to use at a given point in time and when it is necessary to transition an AC over to using this EAS to ensure continuity of service is maintained can be challenging since the conditions that need to be considered can be numerous, have a high degree of variability and may originate from several different entities in the system. For example, the status and context of a UEs and their ACs, the health and availability of EASs in proximity to UEs, the health and availability of the network that connects the ACs and EASs, may all have high degree of variability. Relying on the AC to make optimal decisions on which EASs to use and when it is necessary to perform a handover to a different EAS is not realistic nor optimal in real-life deployments.

EASs will typically be deployed on different edge nodes in the system. Each EAS will have unique point-of-contact (s) including IP address(s), port(s) and URI path(s) for the services and resources that they offer. Accessing a given EAS requires an AC to send requests to an EAS's point-of-contact. If/when a handover to a new EAS occurs, a change in point-of-contact information will occur. A change in point-of-contact information of an EAS, can have a significant impact on ACs. It is not uncommon for point-of-contact information of EASs to be directly configured and/or coded into ACs. Hence if a change occurs to point-of-contact information of an EAS, this typically will require the AC to be made aware of this change. An AC must then stop its communication with the old EAS, initiate the teardown of various types of sessions (e.g., PDU, QoS, security) between the AC and the old EAS and establish corresponding sessions with the new EAS. This tear-down and re-establishment of the various types of sessions requires that new sessions be configured in a consistent manner as the prior ones such that the handover occurs seamlessly. This also needs to take place in a timely manner such that no disruptions in service occur for the AC.

Ensuring optimal usage of the limited edge node and edge network resources in the system while also ensuring the service requirements of the ACs are still met, can be challenging and in direct competition with one another. Edge nodes will typically be deployed with fixed/limited amounts of resources (e.g., CPU, memory, storage). Unlike cloud deployments, which typically support the capability to be dynamically scaled via cloud scaling techniques, once the resources of an edge node are consumed, additional resources typically cannot be easily added. Likewise, edge nodes will typically be deployed in edge networks (e.g., 3GPP LADNs) which will have fixed/limited amounts of resources (e.g., bandwidth) compared to core networks. Given these fixed/limited amounts of resources, it may not be possible to deploy EASs onto edge nodes in a static or pre-provisioned manner well in advance of when EASs are needed by ACs. For this reason, more dynamic methods may be needed to intelligently manage EASs on edge nodes in the system such that the resources on edge nodes are efficiently utilized and the service requirements of ACs are still met. For example, deploying an EAS onto an edge node may first require removing or disabling other EASs to free up edge node resources for the new EAS. This may require coordination between entities in the system to determine which EASs are actively being used by ACs and which ones are not such that candidates for removal or de-activation can be determined. For example, V2X use cases typically involve V2X ACs hosted on vehicles which move in and out of proximity of different edge nodes of the system with a high degree of frequency. For these use cases, V2X ACs require usage of V2X EASs for short durations of time while they are in proximity to the edge nodes hosting the V2X EAS. Once a vehicle and its V2X ACs leave the proximity of an edge node that hosts V2X EASs and enter the proximity of other edge nodes, methods are needed to ensure that the required type(s) of V2X EASs are available and accessible on the proper edge nodes that are in proximity to the V2X ACs. These methods must ensure that the required instance(s) of the V2X EASs are installed, running and securely accessible by the V2X ACs such that the transition occurs seamlessly and without interrupting the service continuity of the V2X ACs. Depending on the speed at which a vehicle is traveling and the service requirements (e.g., latency, reliability, etc.) of its V2X ACs, managing different V2X EASs hosted on the different edge nodes in the system, such that seamless edge application handovers can occur, can be extremely challenging. Ensuring that the required instances of EAS are available on the proper edge nodes, in the proper locations and within the proper time windows for when an AC requires access to them, can be a challenging task to manage.

Example Solutions

Figure 6:
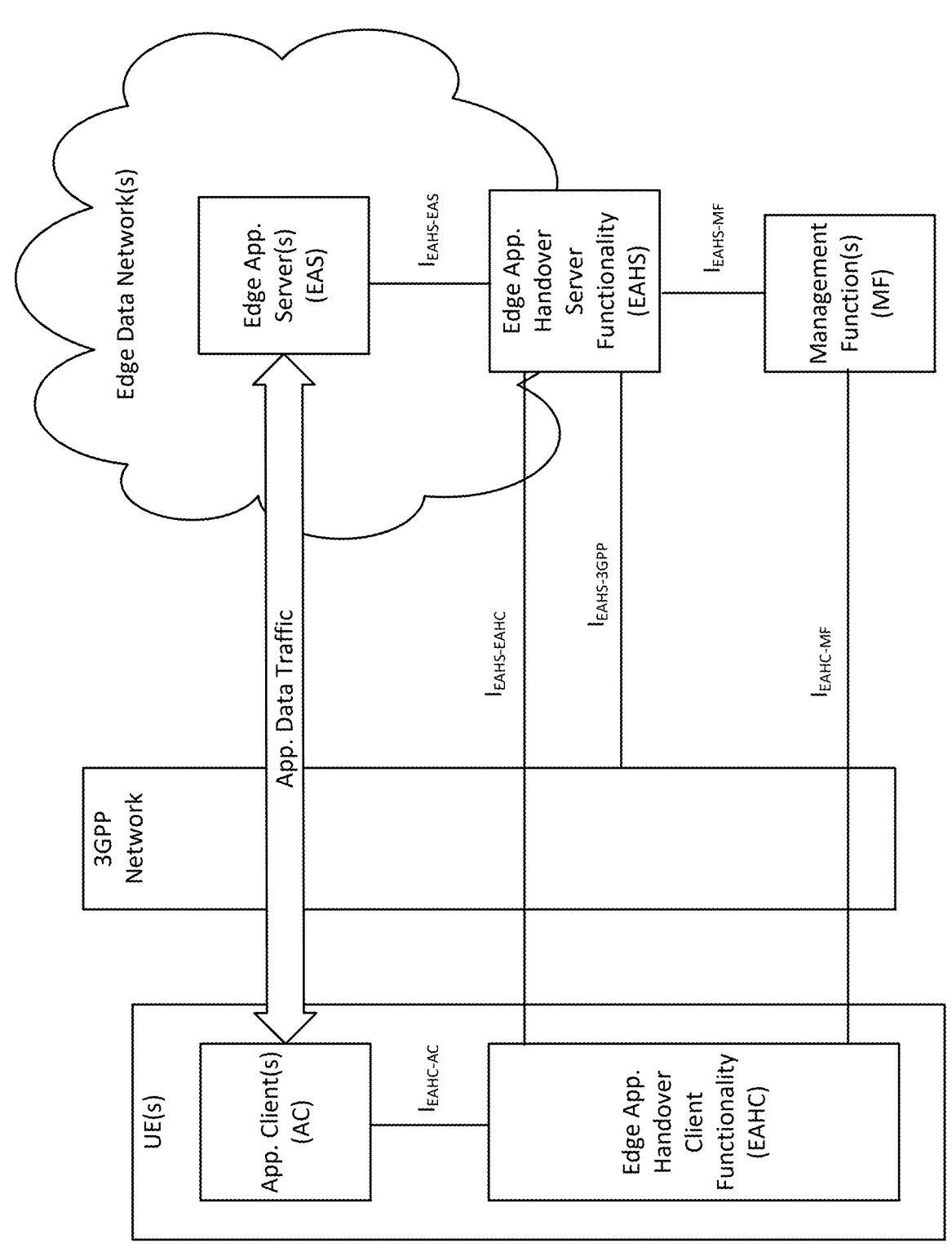
FIG. 6 is a block diagram of an example edge application handover client and server functionality.

FIG. 6 illustrates: edge application handover client and server functionality. Herein, several concepts are presented for addressing shortcomings of the existing 5G Edge Application Architecture and 5G V2X Application Architecture related to inadequate support for the seamless handover of UE Application Clients (AC)s between Edge Application Servers (EAS)s and/or vertical application servers such as VAE Application Servers in a 3GPP system. See, e.g., TS 23.286, TR 23.758, and TR 23.764. Herein, EASs may include or imply vertical application servers such as VAE Application Servers defined in 3GPP SA6 or other standards, unless explicitly specified.

The techniques are described herein to assist ACs with handovers between EASs may also be applied to assist ACs with handovers between EASs and Cloud Application Servers, e.g., as in the use case of FIG. 1.

Assisted Edge Application Handover Framework

To enable seamless handover of ACs between EASs in the system (e.g., when a UE moves out of the proximity of one EAS and into the proximity of another EAS), an Edge Application Handover (EAH) framework is described that provides assisted handover capabilities to ACs and EASs. The EAH framework may be deployed in a distributed manner consisting of an Edge Application Handover Client (EAHC) and an Edge Application Handover Server (EAHS) as shown in FIG. 6.

The Edge Application Handover Client (EAHC) and Edge Application Handover Server (EAHS) interface to various other entities in the system such as one or more Application Clients (ACs), Edge Application Servers (EASs), Management Functions (MFs) and 3GPP Networks as shown via the IEAHC-AC, IEAHS-EAS, IEAHS-MF and IEAHS-3GPP reference points, respectively. The EAHC and EAHS may also interface to one another via the IEAHS-EAHC reference point.

The EAHC functionality may be hosted on UEs in the system and interacts with EAHS functionality to assist with the seamless handover of ACs between EASs. An EAHC may be deployed as a standalone function on the UE or a sub-function of existing 3GPP defined functions such as an Edge Enabler Client or V2X Application Enabler Client. An EAHC may also be deployed as a sub-function of an existing non-3GPP defined function such as a oneM2M CSE or LWM2M Client. The EAHC may interface and interact with various other functions in the system when assisting with edge application handovers. This may involve the EAHC sharing information, receiving events, and performing operations involving other functions in the system. Further details of this interaction are provided in subsequent sections of this paper.

The EAHS functionality is defined such that it may be deployed external to UEs within the system. An EAHS may be deployed as a standalone function in the system or as a sub-function of an existing function such as a 3GPP V2X Application Enabler Server, SEAL Server, Edge Enabler Server, Edge Data Network Configuration Server or an SCS/AS. An EAHS may also be deployed as a sub-function of an existing non-3GPP defined function such as a oneM2M CSE or LWM2M Server. The EAHC interacts with EAHS functionality to assist with the seamless handover of ACs between EASs. The EAHS functionality may be deployed within an edge data network, within a cloud network or within the 3GPP network. The EAHS may also interface and interact with various other functions in the system when assisting with edge application handovers. This may involve the EAHS sharing information, receiving events, and performing operations involving other functions in the system. Further details of this interaction are provided in subsequent sections of this paper.

The Management Function (MF) functionality is defined such that it may be deployed external to UEs within the system. A MF may be deployed as a standalone function in the system or as a sub-function of an existing function such as a 3GPP Edge Data Network Configuration Server or an SCS/AS. An MF may also be deployed as a sub-function of an existing non-3GPP defined function such as a oneM2M CSE or LWM2M Server. The MF interacts with EAHS functionality to receive information about the capabilities and instantiation of EAHSs. The MF interacts with the EAHCs to send EAH policies to EAHCs. The MF functionality may be deployed within an edge data network, within a cloud network or within the 3GPP network. The MF may also interface and interact with various other functions in the system when assisting with edge application handovers. This may involve the MF sharing information, receiving events, and performing operations involving other functions in the system. Further details of this interaction are provided in subsequent sections of this paper.

Assisted Edge Application Handover Reference Points

IEAHC-AC Reference Point

Figure 7:
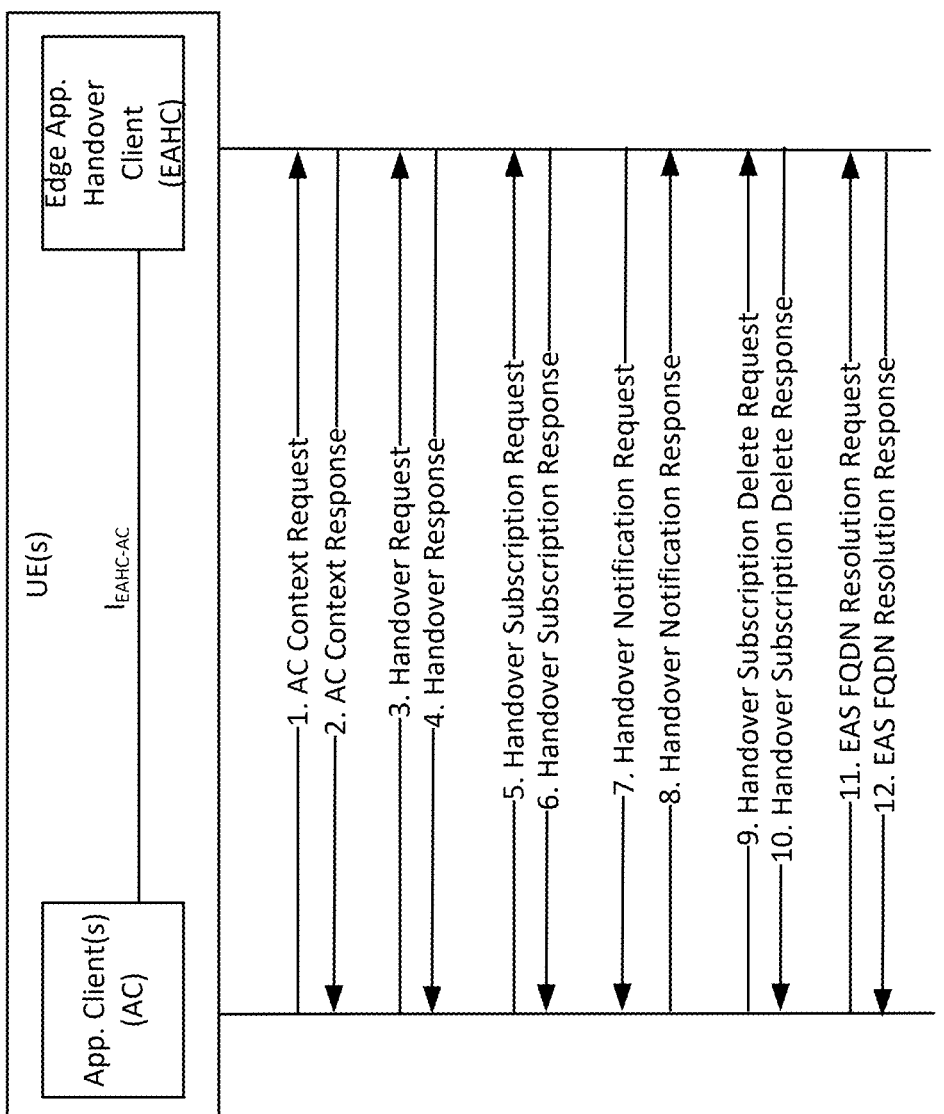
FIG. 7 is a call flow of an example IEAHC-AC functionality.

As shown in FIG. 7, an EAHC may support a reference point (IEAHC-AC) to ACs hosted on the UE. Via IEAHC-AC an EAHC may support various types of EAH centric operations between itself and the ACs such as but not limited to those described in Table 1 of the Appendix and shown in FIG. 7. Note, the EAH operations may be performed in different sequences than the sequence shown, and the operations may be performed independently of one another.

Additional details of the of the example IEAHC-AC operations defined in Table 1 of the Appendix are described below.

An EAHC may support the capability to analyze (e.g., based on EAH policies) service requirements and context information received from ACs, EASs and the network that interconnects ACs and EASs. Based on this analysis, an EAHC may determine if/when an EAH is required. Then an EAHC may trigger an AC to initiate an EAH, or alternatively, the EAHC may perform EAH operations on behalf of an AC to assist it with performing the EAH.

Since an EAHC may be privy to service requirements and context information of all the ACs hosted on the UE, the EAHC may support the capability to aggregate this information to make EAH decisions that are optimized across all the ACs on a UE. For example, if a single edge node in a network supports all EASs required by the different ACs on the UE, the EAHC may determine that an EAH operation to have the ACs use the EASs hosted on this single edge node is desirable to enable the UE to operate in a more efficient manner (e.g., the UE only requires a single PDU session to a single edge node).

An EAHC may receive prioritization information. The prioritization information may come from a user interface (e.g., a graphical user interface). The prioritization information may indicate to the EAHC the relative importance of Application Clients and the EAHC may use this information when determining what edge data networks and EASs to connect to. For example, an EAHC may decide to not perform a handover action and cause one Application Client to lose connectivity in order to avoid disrupting the connection of another Application Client. Alternatively, an EAHC may decide to perform a handover action and cause one Application Client to lose connectivity in order to avoid disrupting the connection of another Application Client.

IEAHS-EAS Reference Point

Figure 8:
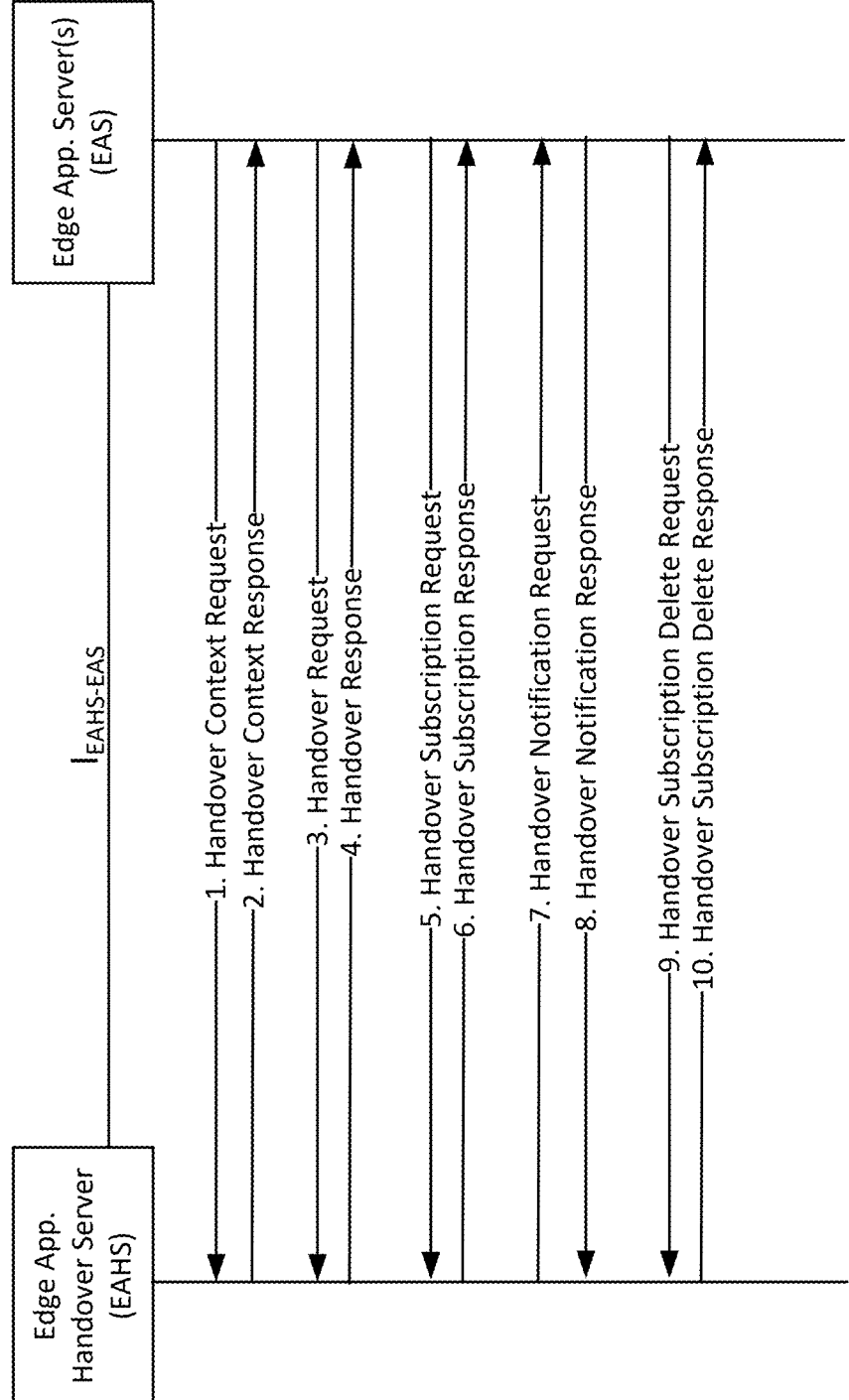
FIG. 8 is a call flow of an example IEAHS-EAS functionality.

As shown in FIG. 8, an EAHS may support a reference point (IEAHS-EAS) to communicate with EASs in the system. Via IEAHS-EAS an EAHS may support various types of EAH centric operations between itself and EASs such as but not limited to those in Table 2 of the Appendix. Note, the operations shown in FIG. 8 may be performed in different sequences than the one shown, and operations may be performed independently of others.

The IEAHS-EAS reference point may support operations such as but not limited to those in Table 2 of the Appendix.

IEAHS-EAHC Reference Point

Figure 9:
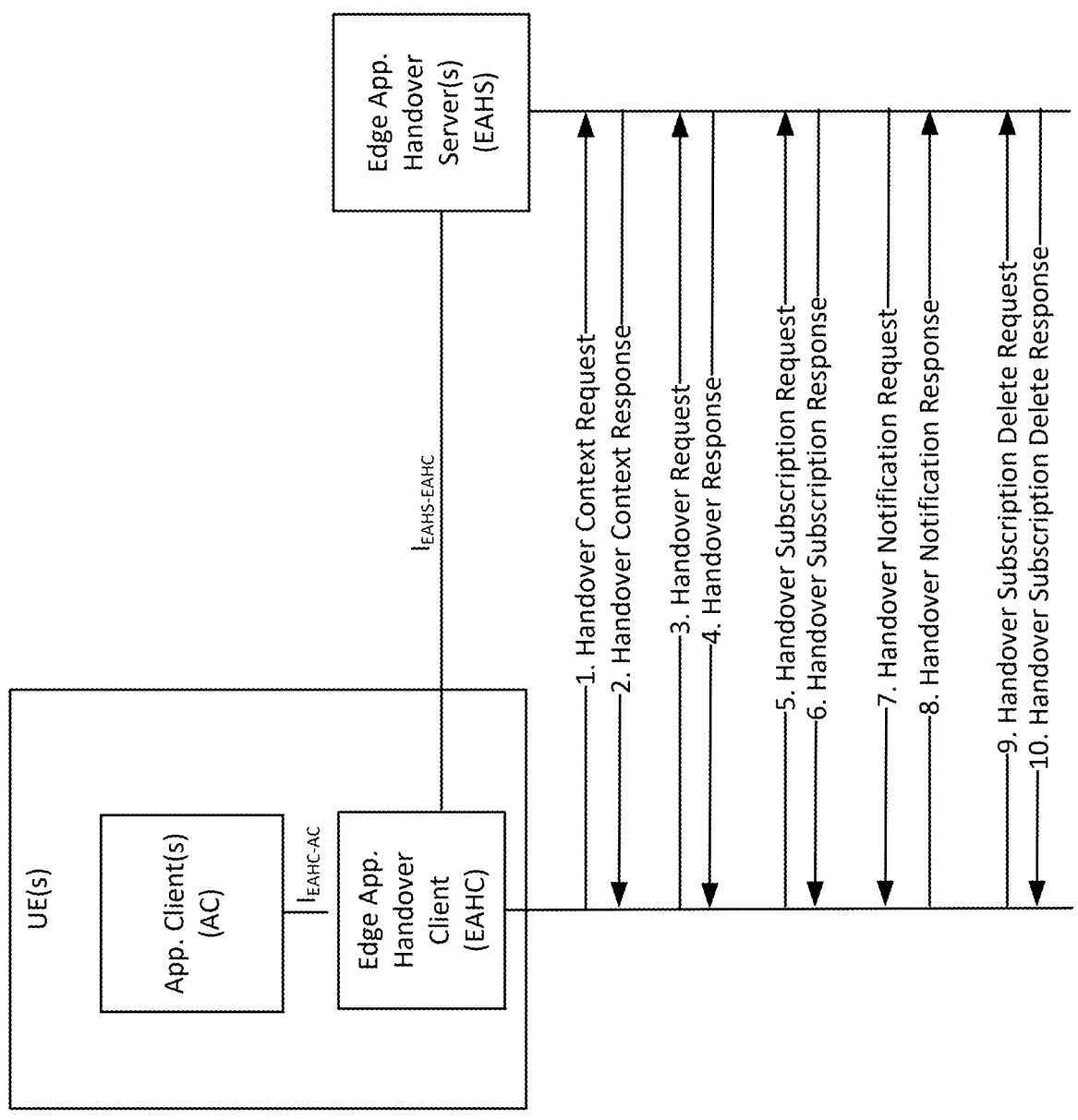
FIG. 9 is a call flows of example IEAHS-EAHC functionality.

As shown in FIG. 9, an EAHC may support a reference point (IEAHS-EAHC) to communicate with one or more EAHSs in the system. For example, an EAHC may support the capability to interface to an EAHS to share information about ACs with the EAHS such that the EAHS can help assist the EAHC with performing EAH operations on behalf of the ACs. Note, the operations shown in FIG. 9 may be performed in different sequences than the one shown, and some operations may be performed independently of others.

IEAHS-EAHC may support operations such as but not limited to those in Table 3 of the Appendix.

IEAHS-3GPP Reference Point

Figure 10:
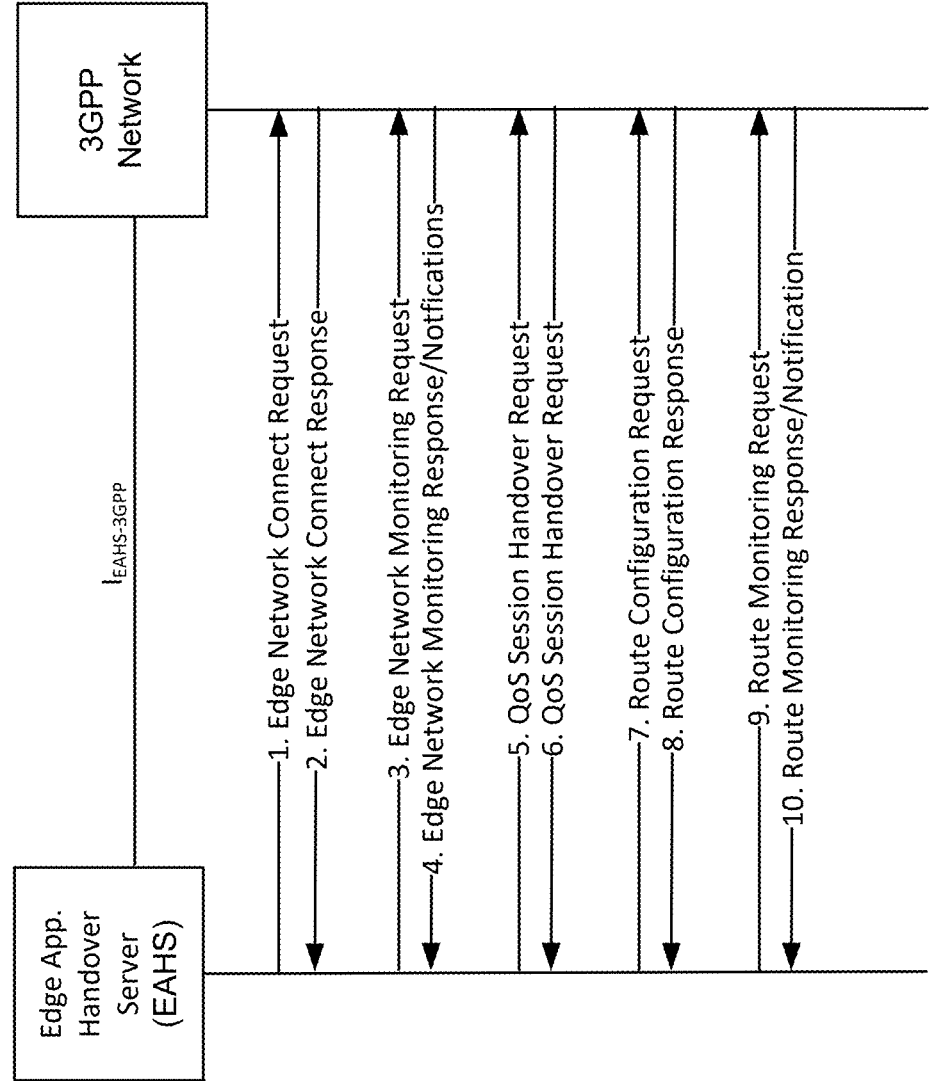
FIG. 10 is a call flow of an example IEAHS-3GPP functionality.

FIG. 10 illustrates IEAHS-3GPP functionality. As shown in FIG. 10, an EAHS may support a reference point (IEAHS-3GPP) to communicate with a 3GPP Network and its respective functions (e.g., NEF). Via IEAHS-3GPP an EAHS may support exchanging various types of EAH centric operations with a 3GPP Network. For example, an EAHS may send a request to a 3GPP Network to have it trigger a single UE (e.g., a vehicle) or a group of UEs (e.g., a platoon of vehicles) to connect to a specified edge data network (e.g., 3GPP LADN) that the EAHS has determined is in the same proximity as the UE(s). The 3GPP Network can then trigger the UE(s) to connect to the edge data network. Note, the operations shown in FIG. 10 may be performed in different sequences than the one shown, and operations may be performed independently of others. The IEAHS-3GPP reference point may support operations such as but not limited to those in Table 4 of the Appendix.

IEAHS-MF and IEAHC-MF Reference Points

Figure 11:
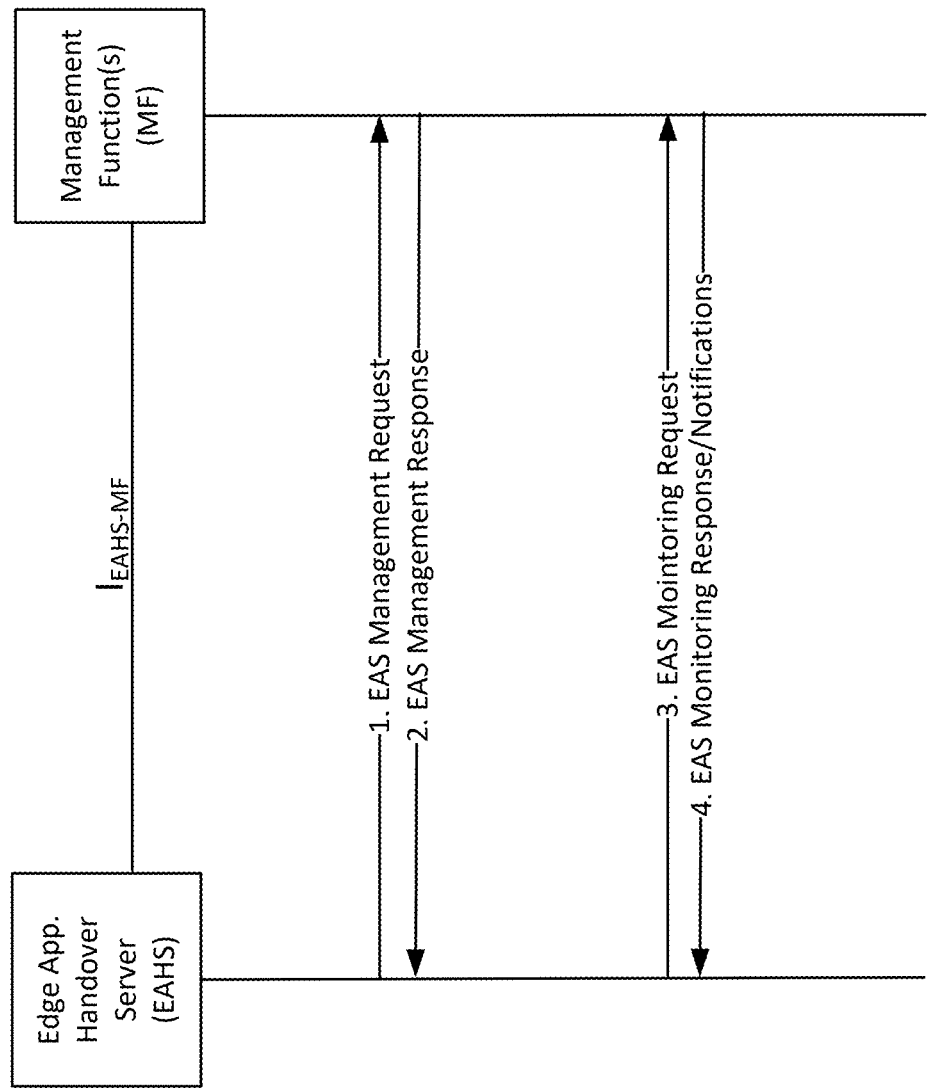
FIG. 11 is a call flow of an example IEAHS-MF functionality.

FIG. 11 illustrates IEAHS-MF functionality. As shown in FIG. 11, an EAHS may support a reference point (IEAHS-MF) to communicate with Management Functions (MF) in the system. MFs in the system may have responsibility for managing EASs deployed in the system. For example, the installation/de-installation, activation/de-activation, configuration/re-configuration of EASs hosted on the edge nodes within the edge networks of the system. Via IEAHS-MF, an EAHS may support communicating with MFs to assist with the management of EASs and to ensure edge application handovers take place in a seamless fashion. For example, an EAHS may support the capability to interface to a MF to request that an EAS be installed, configured and/or activated on an edge node within a specified edge network which a UE has just connected to or is about to connect to. By interfacing to a MF and assisting with the management, the EAHS can help ensure that an AC hosted on the UE can transition over to the new EAS with little/no interruption. Note, the operations shown in FIG. 11 may be performed in different sequences than the one shown, and operations may be performed independently of others. The IEAHS-MF reference point may support operations such as but not limited to those in Table 5 of the Appendix.

In addition, but not shown in FIG. 11 or Table 5 of the Appendix, an EAHC may support being configured with EAH policies or instructed to perform EAH related operations via the MF over an IEAHC-MF reference point An EAHC can also issue requests to a MF to perform EAH related operations over an IEAHC-MF.

Assisted Edge Application Handover Procedures

In the following sub-clauses, procedures are defined which enable an EAHC and EAHS to assist ACs and EASs in performing edge application handovers. These procedures leverage the operations defined by each of the aforementioned EAHC and EAHS reference points.

EAH Policy Configuration

Figure 12:
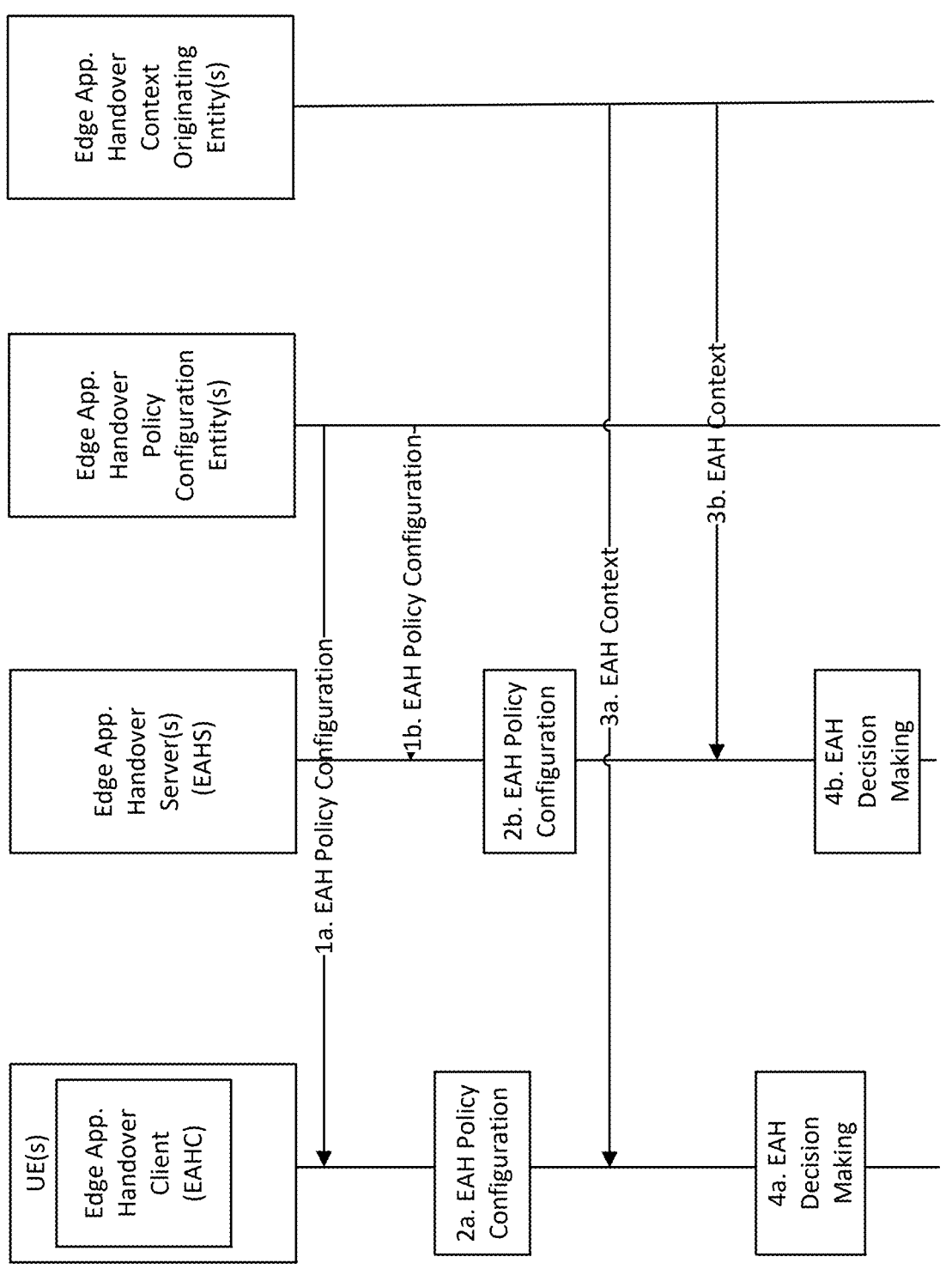
FIG. 12 is a call flow of an example EAH Policy functionality.

FIG. 12 illustrates EAH policy functionality. As shown in FIG. 12 Steps 1a and 1b, both the EAHSs and EAHCs in the system may be configured with EAH policies. The EAH policies may include criteria used to determine what EAH operations an EAHS or EAHC is to perform and under what conditions it is to perform these operations. These policies may be configured by various entities in the system such as but not limited to Users in the system, Core Network Functions, Application Clients. Edge Enabler Clients, Edge Application Handover Clients, V2X Application Enabler Servers, SEAL Servers, Edge Enabler Servers, Edge Data Network Configuration Servers and SCS/ASs. These entities may issue requests to an EAHS or EAHC to configure its EAH policies. Alternatively, an EAHS or EAHC may retrieve EAH policies from these entities or subscribe to these entities to receive notifications if/when changes to EAH policies are required (not shown in FIG. 12).

An EAH policy may include EAH rules such as but not limited to the ones defined in Table 6. These rules may be stored and used by an EAHS or EAHC to control what EAH operations it performs and under what conditions it performs EAH operations (FIG. 12 Steps 2a and 2b). The information in Table 6 of the Appendix can be provided per EAS or EAS type.

EAH policy rules may have dependencies upon various types of EAH related context information available in the system such as but not limited to the types defined in Table 7 of the Appendix. This context information may be generated from various entities in a 3GPP system such as but not limited to Core Network Functions, Application Clients, Edge Enabler Clients, Edge Application Handover Clients, V2X Application Enabler Servers, SEAL Servers, Edge Enabler Servers, Edge Data Network Configuration Servers and SCS/ASs. As shown in FIG. 12 Steps 3a and 3b, these entities may issue requests to an EAHS or EAHC to share EAH related context information. Alternatively, an EAHS or EAHC may retrieve EAH related context from these entities or subscribe to these entities to receive notifications if/when context information of interest becomes available (not shown in FIG. 12). EAH related context information may be made available to the EAHS and EAHC in the system such that they can evaluate it along with the specified rules defined within the EAH policies to determine what EAH operations to perform and under what conditions FIG. 12 Steps 4a and 4b.

EAH Aware FQDN Resolution

To minimize the complexity and overhead of EAH for ACs, EAHCs and EAHSs may support functionality to allow ACs to continue to use the same EAS FQDNs that they were using before an EAH after the EAH. The functionality involves the EAHC and EAHS managing the lower level point-of-contact information (e.g., IP addresses, ports, URI paths, identifiers, security credentials and/or service description information) of EASs and performing EAS FQDN resolution operations on behalf of ACs. In doing so, the EAHC and EAHS can offload ACs of the burden of performing these operations or even being aware that these operations are being performed on their behalf.

The functionality involves the EAHC supporting enhanced DNS client functionality which also has awareness of when edge application handovers occur. This allows the EAHC to correctly resolve EAS FQDNs to the correct EAS point-of-contacts even when a UE is connecting to/from different edge networks and run-time edge application handovers are occurring. The EAHC may also support an API that allows ACs to issue requests to the EAHC to resolve EAS FQDNs on their behalf and receive back EAS point-of-contact information if desired.

Figure 13A:
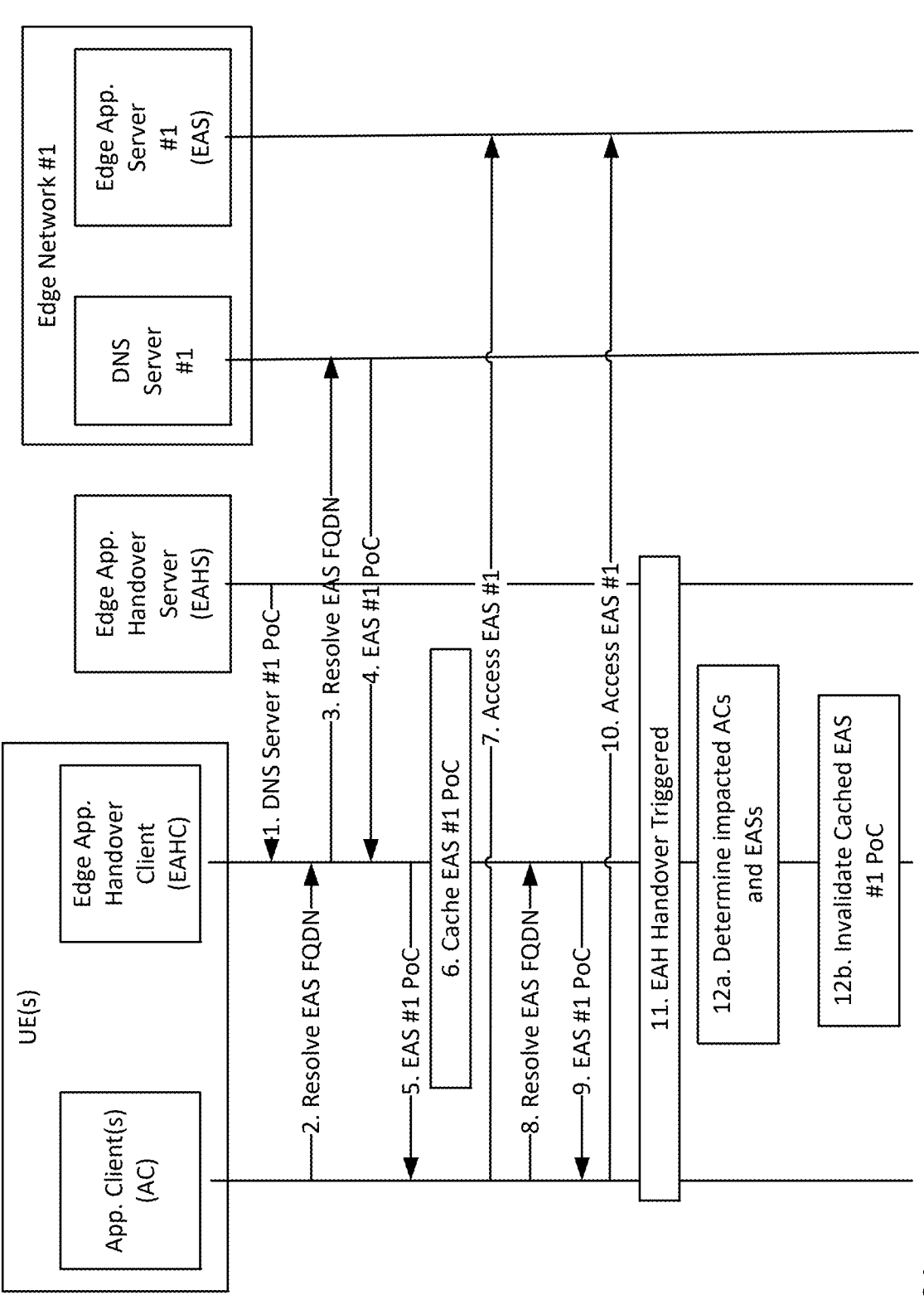
FIGS. 13A and 13B show a call flow of an example EAH-ware FQDN resolution.
Figure 13B:
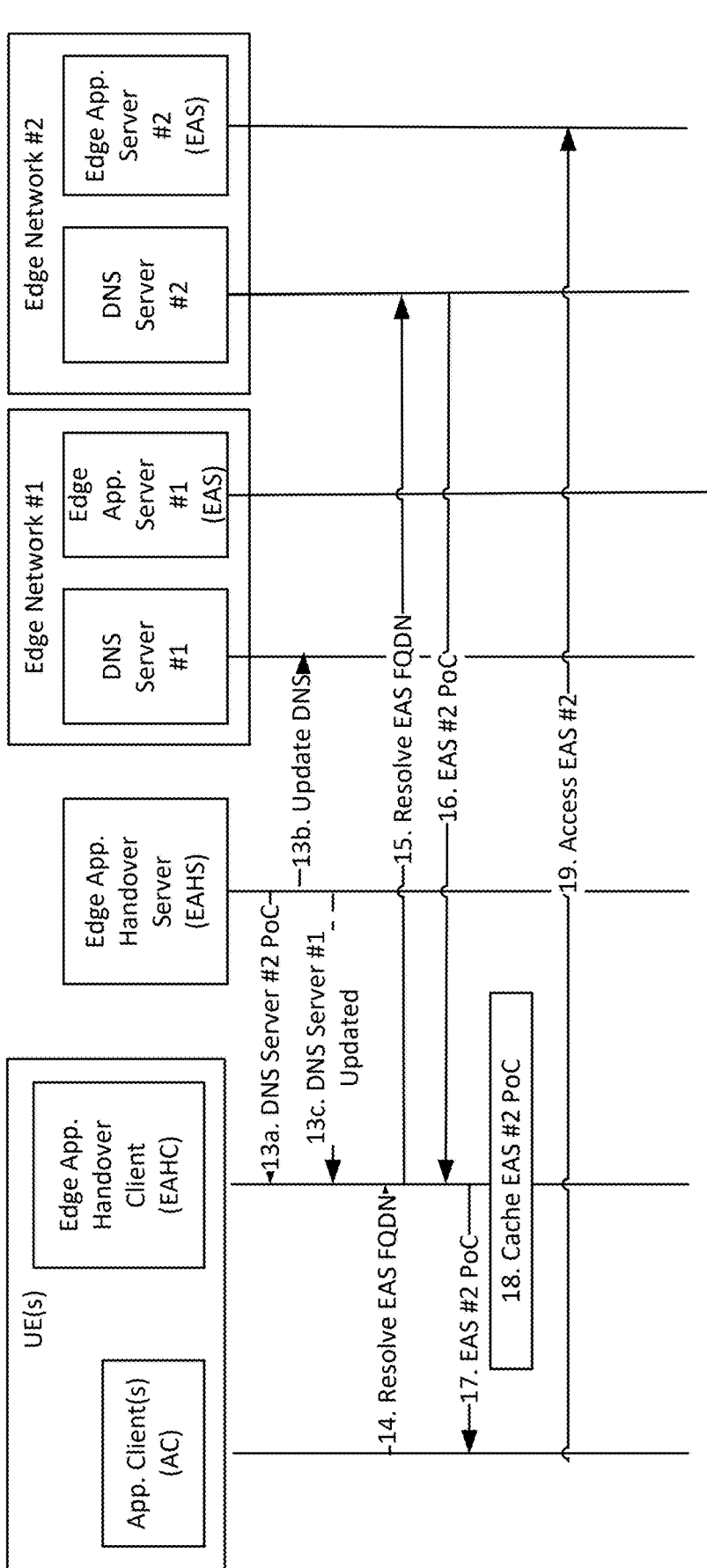

FIGS. 13A and 13B illustrates an example of EAH Aware FQDN Resolution functionality. To enable an EAHC to perform this functionality, the EAHC may support the capability to be configured with point-of-contact information for DNS server(s) (Step 1 of FIG. 13A). The DNS server(s) host the DNS records for EASs currently available to the AC (e.g., EAS #1). When a UE connects to a different network domain (either a core or edge network domain) it may be configured with this point-of-contact information of the DNS server(s). The entity that configures the UE's EAHC with this DNS server point-of-contact information may be an EAHS as shown in Step 1 or another entity in the system such as but not limited to an Edge Data Network Configuration Server, a SEAL Server, an Edge Enabler Server or SCS/ASs. In step 1, multiple DNS server point-of-contacts may be provided to the UE. Each point-of-contact may be associated with an S-NSSAI and a DNN. An EAS may be associated with a particular network slice. For example, the UE uses a particular 3GPP PDU session associated with a particular network slice to access a given EAS. For this reason, a given DNS server could be associated with a particular edge data network and/or a particular 3GPP network slice. Note the SMF may provide the UE with DNS server point-of-contacts during PDU Session establishment. The EAHC may give DNS server point-of-contacts that are provisioned by an Edge Data Network Configuration Server, a SEAL Server, an Edge Enabler Server or SCS/ASs higher precedence and only use the DNS server point-of-contacts that were provided by the SMF when the point-of-contacts that were provisioned by an Edge Data Network Configuration Server, a SEAL Server, an Edge Enabler Server or SCS/ASs are not able to resolve the FQDN.

Once an EAHC is configured with the point-of-contact information of one or more DNS Servers, it can service requests from ACs to resolve EAS FQDNs (Step 2). The first time the EAHC receives a request targeting a given EAS FQDN it may perform a DNS lookup (Step 3) to the configured DNS servers to resolve the FQDN to the proper EAS point-of-contact information (Step 4). The EAHC may return the EAS point-of-contact information to the AC (Step 5). The EAHC may also cache the point-of-contact information (Step 6) such that subsequent requests to the same EAS from the same AC do not require another DNS lookup to be repeated (Steps 8 and 9). The AC can then use the EAS point-of-contact information to access the EAS (Steps 7 and 10).

If/when an EAH for one or more ACs is triggered by an AC, EAHC or EAHS (Step 11), the EAHC can detect the occurrence of the EAH, determine the impacted ACs and EASs (Step 12a), and mark any cached DNS lookup results for these impacted ACs and EASs as invalid/stale such that they are no longer used (Step 12b). In addition, the EAHC may also receive updated DNS server point-of-contact(s) if the UE has connected to a different edge network having different DNS server(s) that bind EAS FQDNs to different point-of-contacts (Step 13a of FIG. 13B). Alternatively, if a handover to a different EAS in the same edge network occurs, an EAHS may instead update DNS server records on DNS servers such that EAS FQDN point-of-contact information is updated to reflect new EASs that should be accessed instead old EASs (Step 13b). Updated DNS information may be sent from an EAHS to an EAHC within an EAH Notification Requests. After updating DNS servers, an EAHS may notify EAHC(s) such that the EAHC(s) know to refresh any cached DNS results pertaining to the updated DNS server(s) (Step 13c). Following the EAH, and if/when an EAHC receives its next request from an AC to resolve an EAS FQDN (Step 14), the EAHC can perform a fresh DNS lookup and obtain the latest EAS point-of-contact information (Step 15 and 16). The EAHC may return this point-of-contact information to the AC as well as cache it until if/when another EAH is triggered (Step 17 and 18). The AC can then use the EAS point-of-contact information to access the new EAS (Steps 19).

Alternatively, but not shown in FIGS. 13A and 13B, rather than an AC issuing EAS FQDN resolution requests to an EAHC and have it return EAS point-of-contact information to the AC, the EAHC may instead function as a message proxy between an AC and an EAS. When functioning as a proxy, an AC may forward its requests that target an EAS to an EAHC to proxy on its behalf. Within the request, the AC can use an FQDN of the targeted EAS rather than resolved point-of-contact information for the EAS. Upon receiving the request from the AC, the EAHC can then perform EAS FQDN resolution in an EAH aware fashion and replace the FQDN with the proper EAS point-of-contact information before forwarding the request to the EAS. In doing so, the AC does not need to have any awareness of the EAS point-of-contact information. The EAHC can hide EAS point-of-contact information from the AC and perform EAS FQDN resolution on the AC's behalf.

EAH Aware Security Session Tear-Down and Establishment

Depending on use case requirements, secure communication between ACs and EASs may be required. When secured communication is required, ACs and EASs must be configured with the proper credentials necessary to allows ACs and EASs to authenticate and establish a secure and trusted communication session with one another (e.g., performing two-way authentication handshakes using security protocols such as TLS). To enable seamless handovers of ACs between different EASs in the system, an EAHC and EAHS may provide assistance to ACs and EASs to help manage credentials and assist with the setup and teardown of secure communication sessions between ACs and EASs. In doing so, the EAHC and EAHS can offload ACs and EASs of the burden of performing these operations themselves.

Figure 14A:
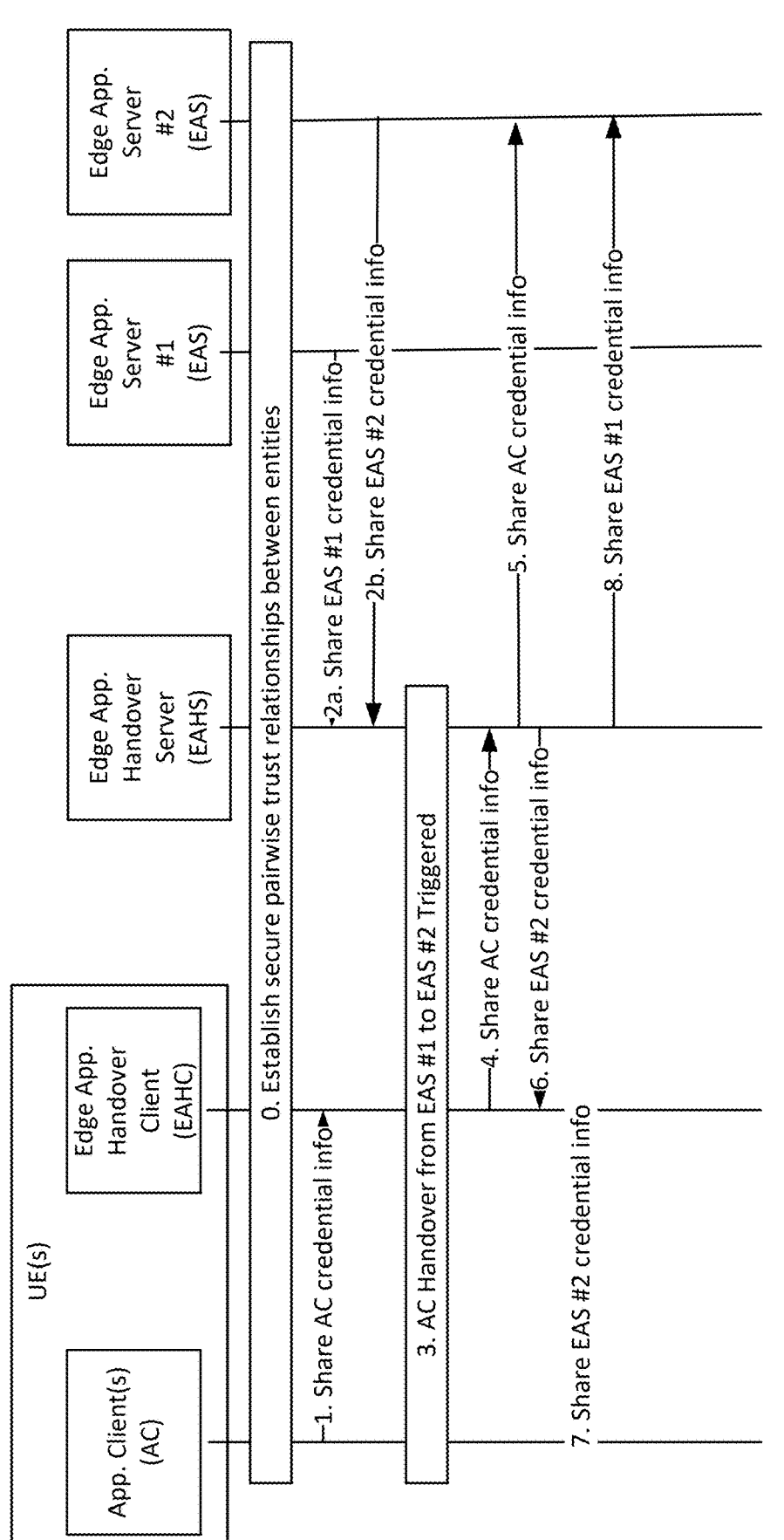
FIGS. 14A and 14B show a call flow of an example EAH-aware session tear-down and establishment.
Figure 14B:
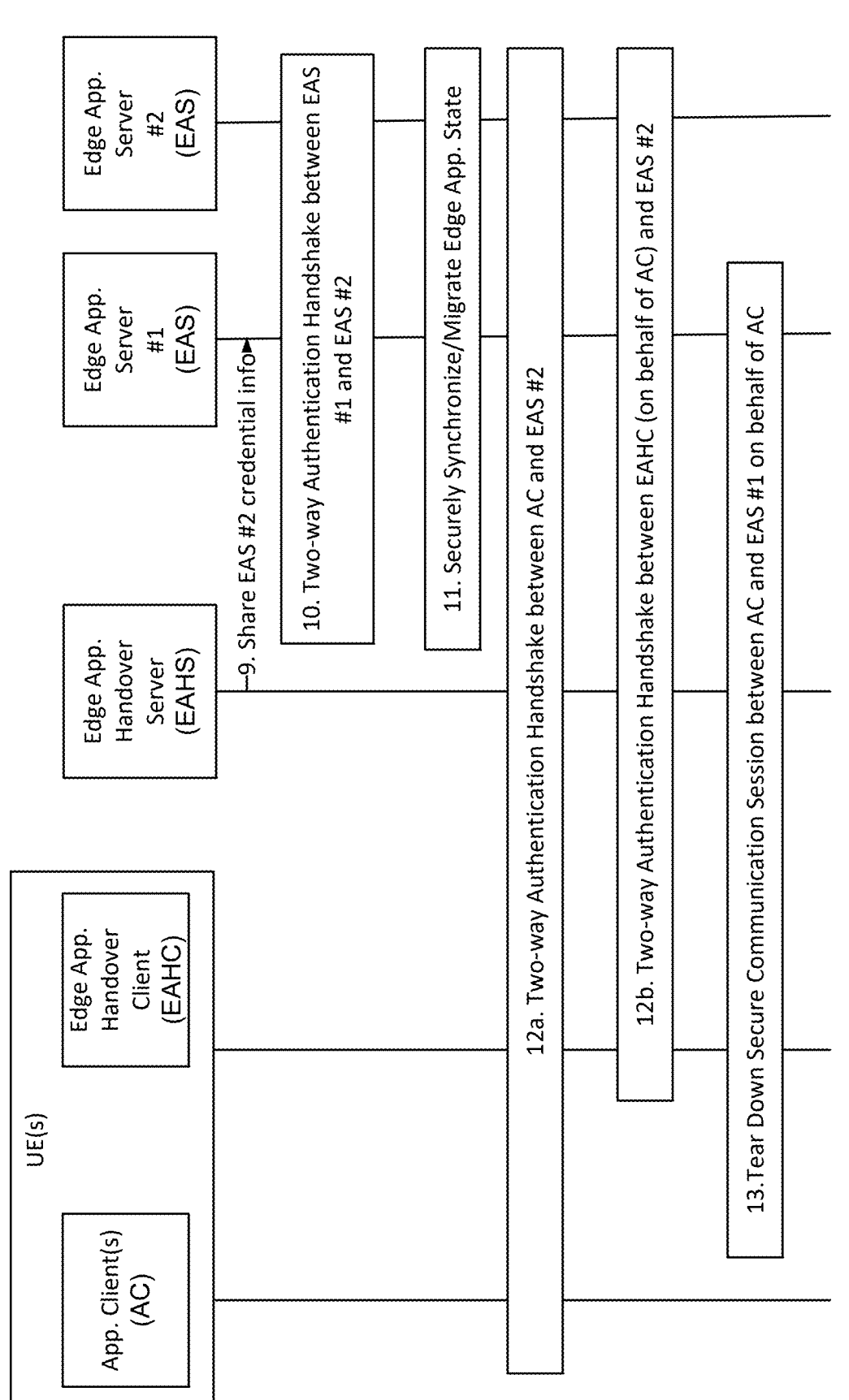

FIGS. 14A and 14B illustrate an example of functionality that involves the EAHC and EAHS assisting with the setup and tear down of secure communication sessions between ACs and EASs when edge application handovers occur. An EAHC and EAHS may leverage existing trust relationships established between the different pairwise entities in the system such as ACs and EAHCs, EAHCs and EAHSs, EASs and EAHSs, or an EAHS and a security function in the network (e.g., AAA server, Certificate Authority, etc.). These pairwise trust relationships may be established using existing and well-known security methods (e.g., TLS sessions).

Once these pairwise trust relationships have been established, the EAHC and EAHS may layer additional security functionality overtop of these pairwise trust relationships. This additional functionality may aid ACs with establishing run-time trust relationships with EASs in the system and assistance to EASs with establishing run-time trust relationships with other EASs (e.g., to enable EASs to securely synchronize or migrate edge application state during edge application handovers). This functionality can be especially useful when frequent edge application handovers occur since the overhead of managing security credentials between ACs and EASs can be high.

Leveraging their awareness of when edge application handovers occur and their trust relationships with individual ACs and EASs (Step 0 of FIG. 14A), the EAHC and EAHS can perform credential management operations to securely configure ACs and EASs with one another's public credential information (e.g., PSKs, certificates, etc.) if/when an EAH occurs. ACs can securely pass (e.g., in an encrypted manner) their credential information to an EAHC over the secure communication session that exists between the EAHC and AC (Step 1). Likewise, EASs can securely pass their credential information to an EAHS over the secure communication session that exists between the EAHS and EAS (Step 2). When a handover of an AC occurs to a new EAS (Step 3), the EAHC can securely pass the AC's credential information to the EAHS over the secure communication session that exists between the EAHC and EAHS (Step 4). The EAHS can in turn securely pass the ACs credential to the new EAS over the secure communication session that exists between the EAHS and EAS (Step 5). Likewise, the EAHS can securely pass the EAS's credential to the EAHC over the secure communication session that exists between the EAHS and EAHC (Step 6). The EAHC can in turn securely pass the EAS's credential to the AC over the secure communication session that exists between the EAHC and AC (Step 7). During this process the EAHS may also communicate with a security function in the network if new/updated credentials are required (not shown in FIGS. 14A and 14B). Once an AC and EAS have been configured with one another's credentials they can perform a two-way authentication handshake to establish a trust relationship and secure communication session with one another that they can use to securely exchange application layer messages with one another (Step 12a).

In a similar fashion, an EAHS may also assist EASs involved in handoffs with each another and help them establish a trust relationship with one other such that they can securely perform handoff operations such as secure synchronization/migration of application state. When a handover of an AC occurs to a new EAS, the EAHS can securely pass the old EAS's credential to the new EAS and vice versa (Step 8 of FIG. 14A and Step 9 of FIG. 14B). This can be done over the secure communication session that exists between the EAHS and each EAS. During this process the EAHS may also communicate with a security function in the network if new/updated credentials are required (not shown in FIGS. 14A and 14B). Once EASs have been configured with one another's credentials they can perform a two-way authentication handshake to establish a trust relationship and secure communication session with one another (Step 10) that they can then use to securely synchronize/migrate application layer state with one another (Step 11).

In addition to assisting with credential management, an EAHC and/or EAHS may also assist with establishing and/or tearing down secure communication sessions between ACs and EASs. Since an EAHC is hosted on the same UE with the same IP address as the ACs, the EAHC is well-positioned to function as a security proxy on behalf of the ACs. The EAHC may establish (Step 12b) and/or tear secure communication sessions with EASs on behalf of ACs (Step 13). This can offload ACs of the burden of having to do this themselves and hence free them up to perform other application centric operations more efficiently. In addition, the EAHC may be able to perform these operations in a more efficient manner since the EAHC may be privy to the occurrence of EAH operations sooner than ACs. Hence the EAHC may be able to start establishing or tearing down secure communication sessions sooner than ACs would be able to. This can help reduce EAH latency and improve overall system performance. For example, if the EAHC and EAHS are performing EAH operations such as migrating/synchronizing state between ESAs during the EAH, the EAHC and EAHS may have awareness of when a secure communication session to an ESA is no longer needed and can tear down a secure communication between an AC and EAS is an efficient and timely manner.

EAH Aware Application State Synchronization/Migration

Depending on use case requirements, the synchronization or migration of application state from an EAS that an AC is currently using to a new EAS which the AC is being handed off to may be required.

To enable seamless handovers of ACs between different EASs in the system, an EAHC and EAHS may aid ACs and EASs to help manage efficient synchronization or migration of application state between EASs. In doing so, an EAHC and EAHS can offload ACs of the burden of performing these operations.

Figure 15A:
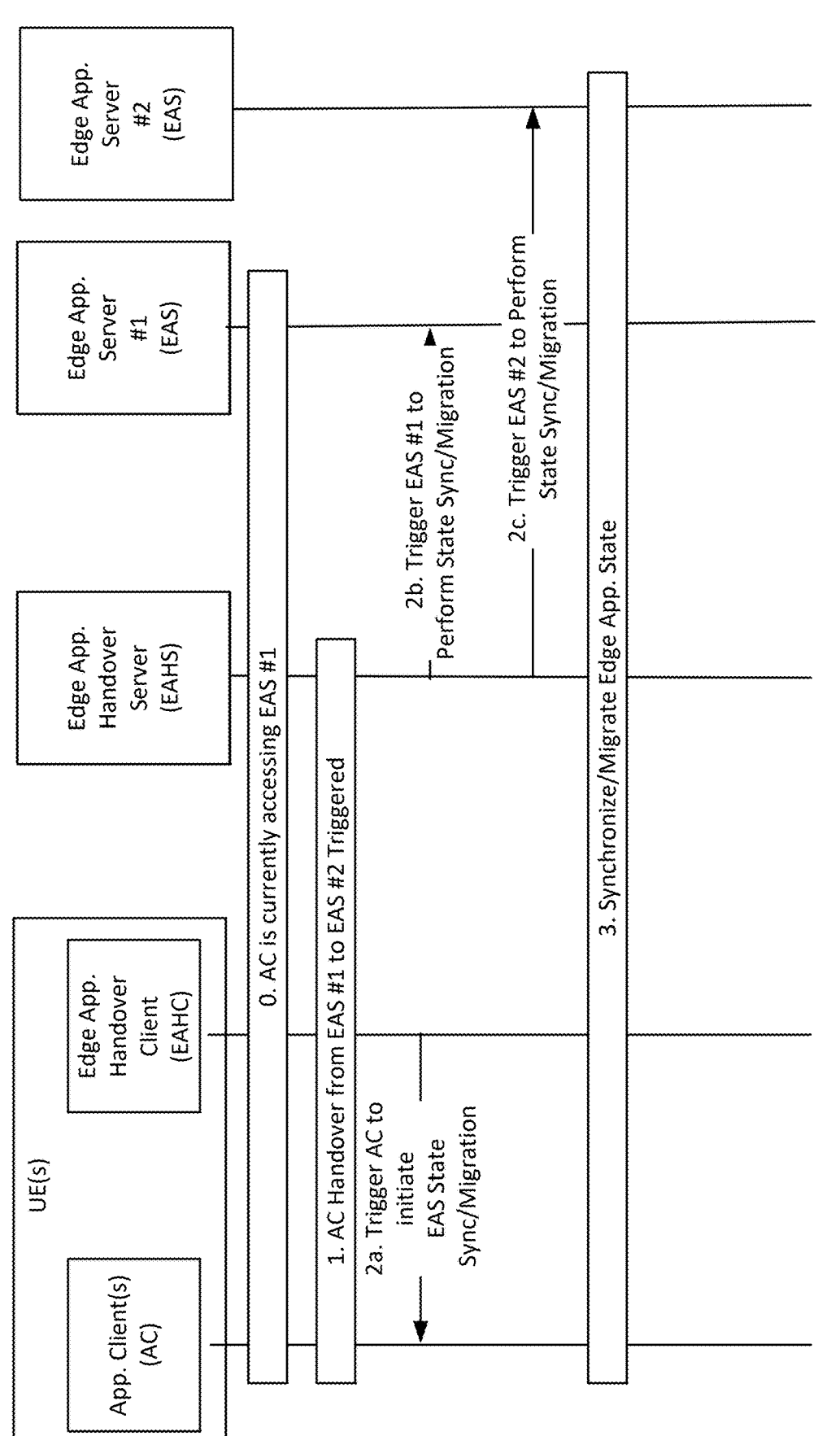
FIGS. 15A and 15B show a call flow of an example EAH-aware state synchronization/migration.
Figure 15B:
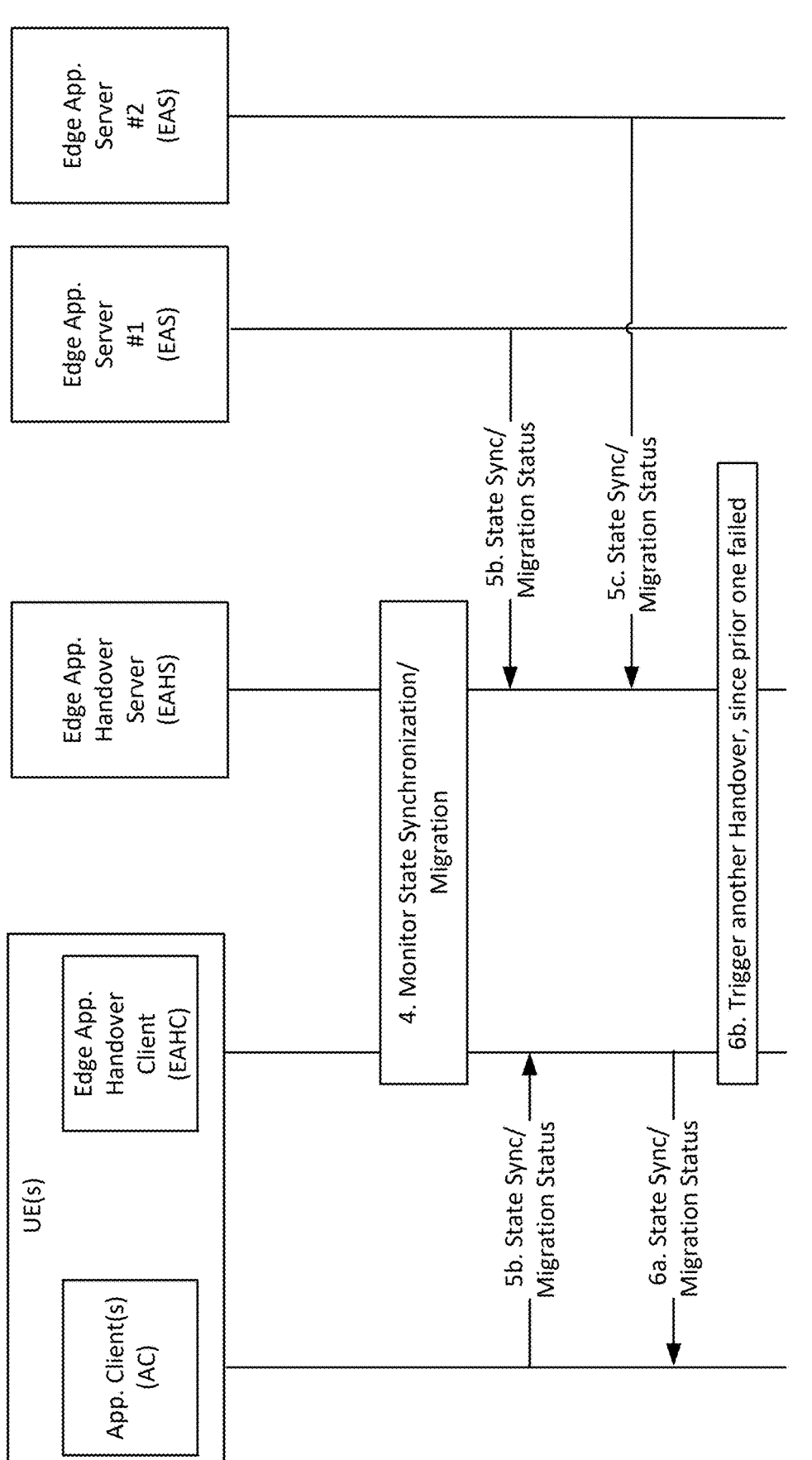

FIGS. 15A and 15B illustrate an example of functionality which involves an EAHC and/or EAHS triggering application state synchronization or migration operations to occur during an EAH (Step 1 of FIG. 15A). These triggers can optionally be sent to ACs to have the ACs initiate and/or perform the synchronization or migration operation (Step 2a). Alternatively, the trigger can be sent from an EAHS or EAHC to the old EAS (EAS #1) (Step 2b) and/or new EAS (EAS #2) involved in the EAH (Step 2c), or both. An EAHC and/or EAHS may trigger application state synchronization or migration operations when they detect that an EAH is required and other pre-requisite EAH operations have been completed (e.g., discovery of selection of a new EAS, provisioning of EAS credentials to the EASs involved in the handoff). After triggering an application state synchronization or migration operation, the EAHC and/or EAHC may monitor whether the operation completes successfully or not (Step 4 of FIG. 15B). The EAHC and/or EAHS may receive status updates from EASs and/or ACs regarding whether the application state synchronization or migration operation completed successfully. If successful, the EAHC and/or EAHS may use this as a qualification that the EAH completed successfully and send a notification to the AC that the new EAS is ready to access (Step 6a). If unsuccessful, the EAHC and/or EAHS may use this as a qualification that the EAH failed and in turn perform additional operations such as identifying a new EAS and triggering a new EAH (Step 6b).

Leveraging their awareness of when edge application handovers are initiated, the EAHC and EAHS may be well-positioned to perform this triggering in a more optimal fashion than an AC. This can offload ACs of the burden of having to initiate this operation themselves.

EAH Aware Request Buffering

To enable seamless handovers of ACs between different EASs in the system, an EAHC may store-and-forward outgoing requests from ACs to EAS(s) until EAH operations have completed and an AC can communicate with its new EAS(s).

Figure 16A:
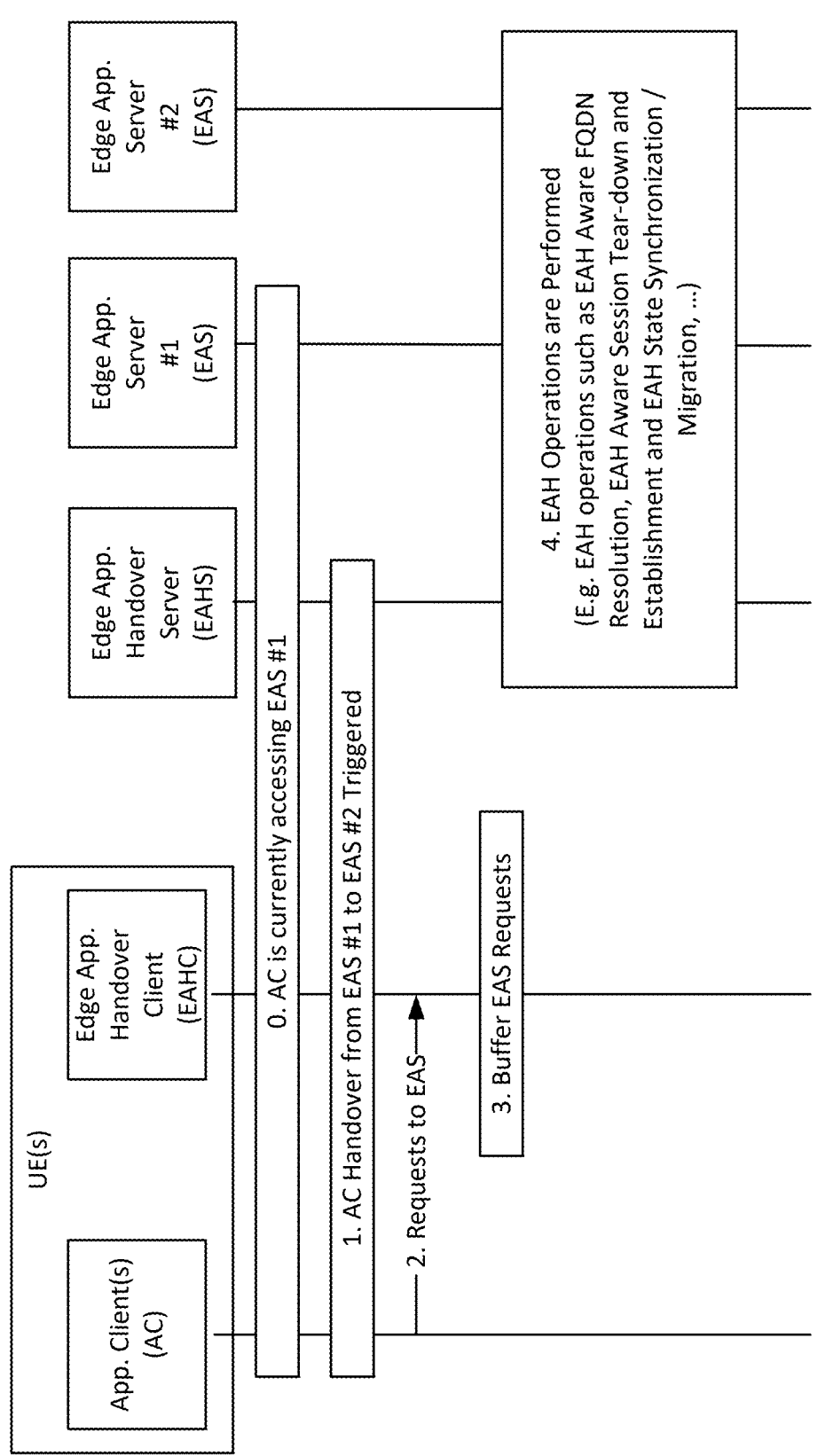
FIGS. 16A and 16B show a call flow of an example EAH-aware request buffering.
Figure 16B:
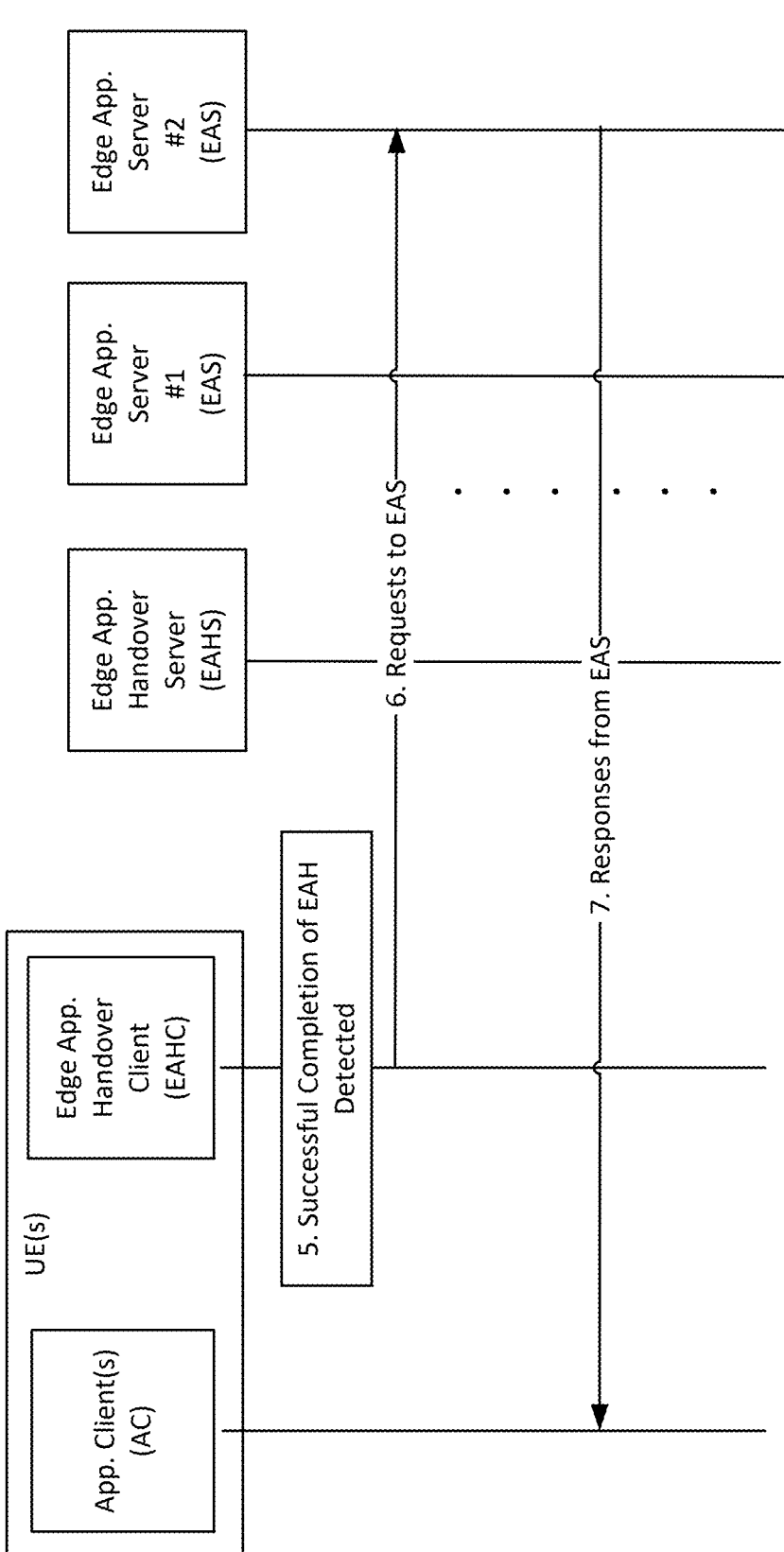

FIGS. 16A and 16B illustrate an example of functionality wherein an EAH is triggered in the system (Step 1 of FIG. 16A). While the EAH is being processed, the AC continues to issue requests to access an EAS (Step 2). The EAHC buffers these requests while the EAH operations are performed by the EAHC and/or EAHS. For example, EAH operations such as EAH Aware FQDN Resolution, EAH Aware Session Tear-down and Establishment and EAH State Synchronization/Migration (Step 4). When all the EAS handover operations are successfully completed (Step 5 of FIG. 16B), the EAHC can forward buffered requests to the "new" EAS (EAS #2) involved in a handover (Step 6) and responses can flow back to the AC (Step 7). When forwarding the buffered requests, the EAHC can make sure the targeted EAS FQDNs specified in the buffered requests are correctly resolved to the refreshed point-of-contact information of the "new" EASs which the ACs have been handed off to.

EAH Aware Session QoS Continuity

To enable seamless handovers of ACs between different EASs in the system, an EAHC or EAHS may support the capability to support EAH aware session QoS continuity functionality. This functionality entails an EAHC or EAHS ensuring that the configuration of the 3GPP network QoS flow(s) established between AC(s) hosted on a UE and corresponding EAS(s) hosted on edge node(s) are kept consistent when an EAH handover occurs. When an EAH handover occurs, an EAHC or EAHS may assist with the establishment of new QoS flow(s) between the AC(s) and the new EAS(s) they are handed off to. An EAHC or EAHS can keep track of the configuration of session QoS flows existing between AC(s) and EAS(s) when it assists with their establishment. If/when an EAH is triggered, an EAHC or EAHS can configure session QoS flows between AC(s) and new EAS(s) such that they are kept consistent with the existing flows established between the AC(s) and the current EAS(s) they are accessing.

Figure 17A:
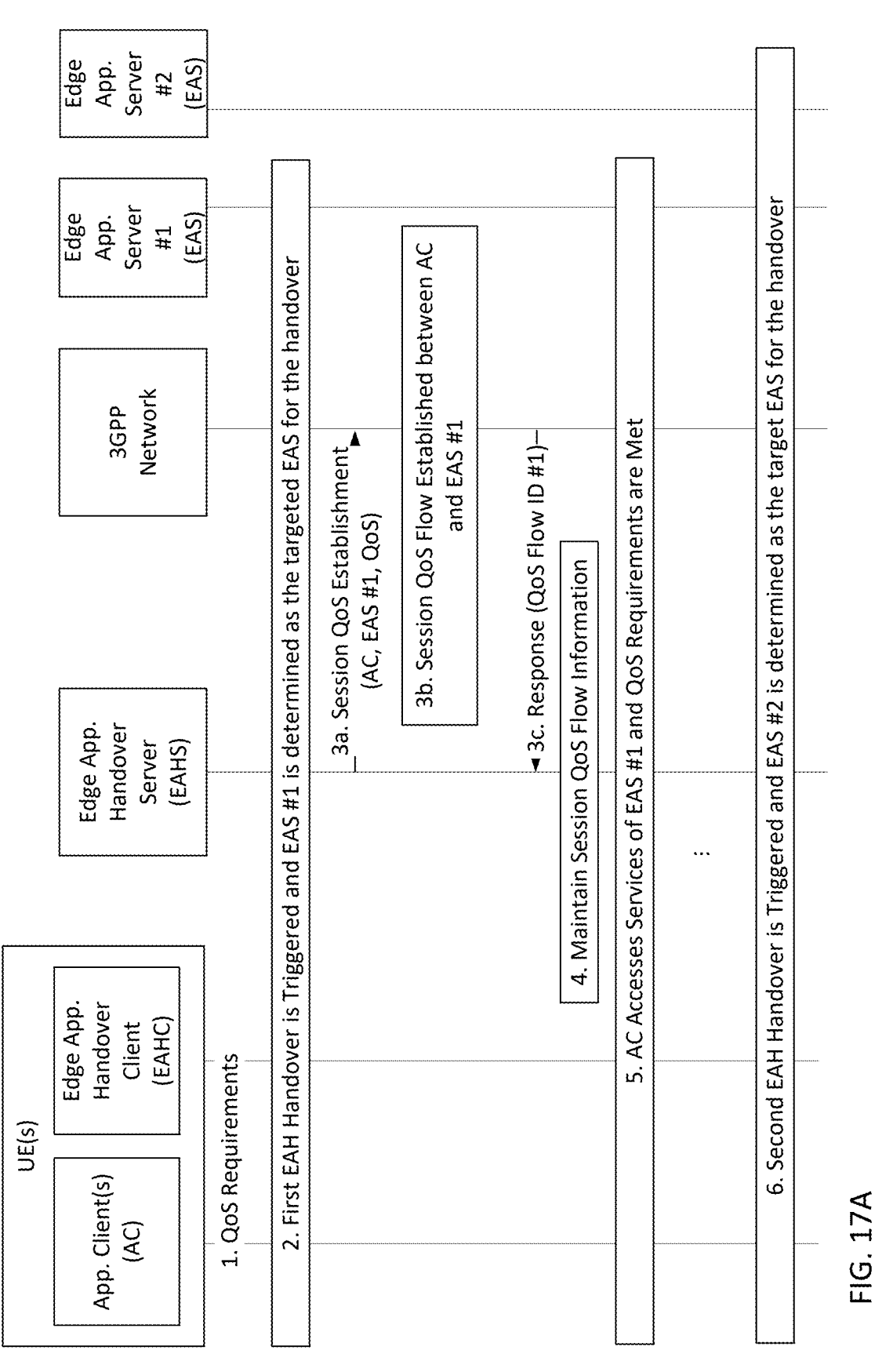
FIGS. 17A, 17B, and 17C show a call flow of an example EAH-aware session QoS continuity.
Figure 17B:
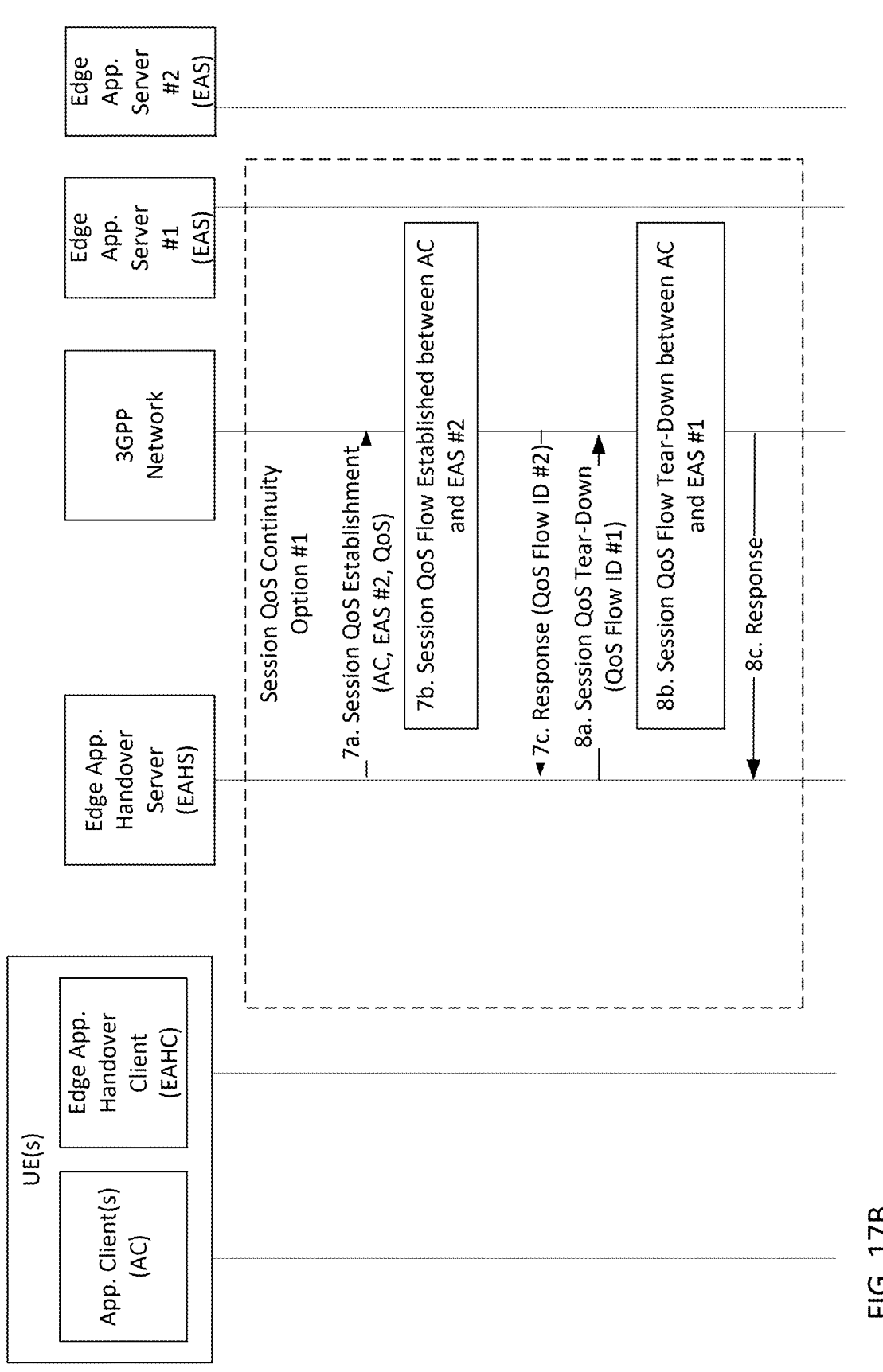
Figure 17C:
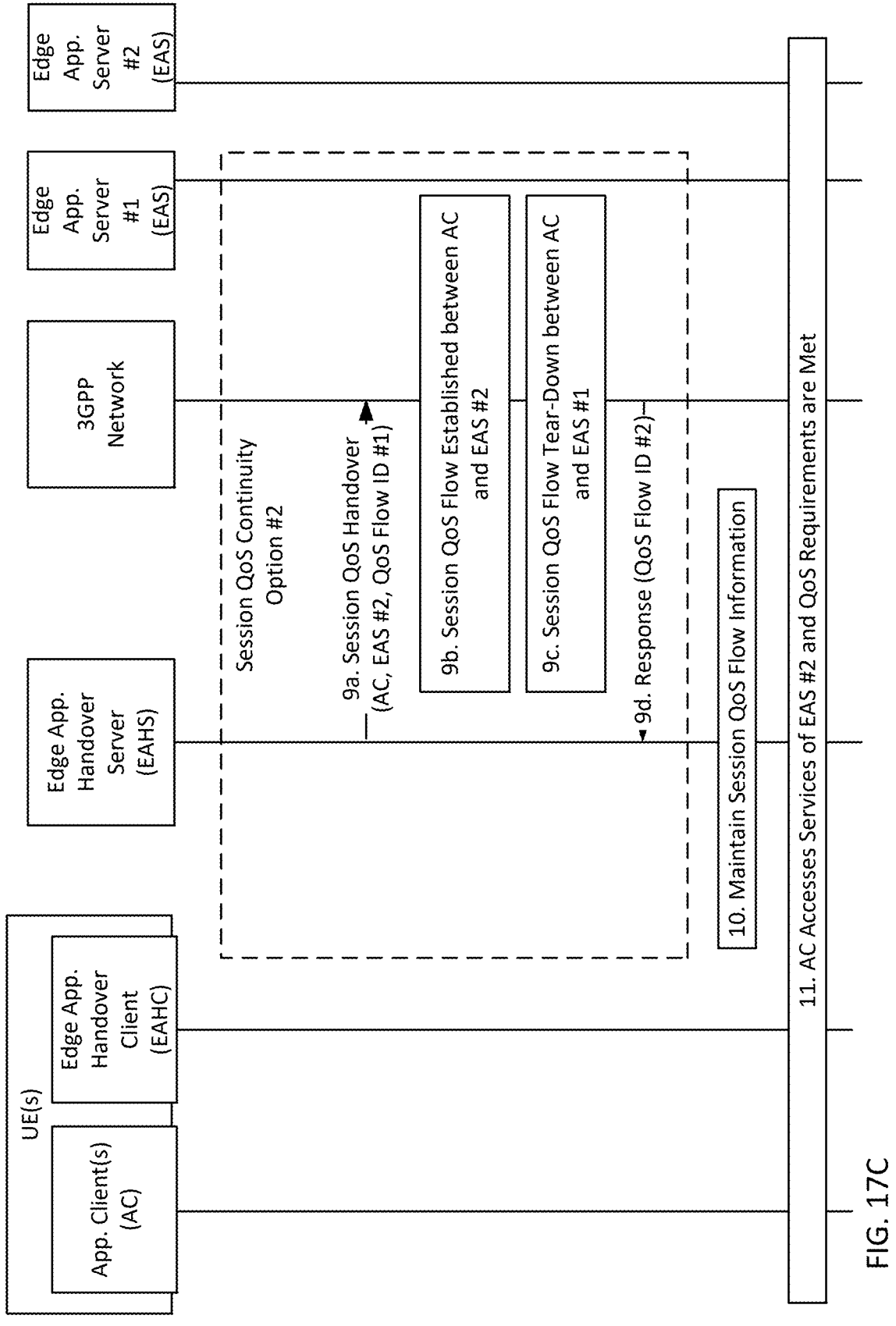

FIGS. 17A-C illustrate an example wherein an AC may share its QoS Requirements with an EAHC (Step 1 of FIG. 17A). A first EAH is triggered in the system (Step 2). While the EAH is being processed, the EAHS initiates a request to the 3GPP network to establish a session QoS flow between the AC and EAS #1 which meets the QoS session requirements of the AC (Step 3a). The 3GPP network receives and process the request and configures a QoS flow between the AC and EAS #1 (Step 3b). The 3GPP network returns a response which include a flow identifier, e.g., 5QI (5G QoS Identifier) that the is used to identify the session QoS flow (Step 3c). The EAHS maintains the session QoS flow information including the flow identifier and the applicable AC and EAS (Step 4). The AC begins communicating with EAS #1 and accessing its offered services (Step 5). During this communication, the 3GPP network ensures the QoS requirements of the AC are met.

At some point later another EAH is triggered and EAS #2 is identified as the target EAS for the handover (Step 6). The EAHS performs EAH aware session QoS continuity functionality. One method that an EAHS may use to perform EAH aware session QoS continuity, is by first sending a new session QoS establishment request to the 3GPP network to establish a session QoS flow between the AC and EAS #2 having the same QoS requirements as defined by the AC and maintained by the EAHS (Step 7a of FIG. 17B). The 3GPP network receives and process the request and configures a QoS flow between the AC and EAS #2 (Step 7b). The 3GPP network returns a response which include a flow identifier that the is used to identify the session QoS flow (Step 7c). Next the EAHS issues another request to terminate the session QoS flow between the AC and EAS #1 (Step 8a). The 3GPP network receives and process the request and tears down the QoS flow between the AC and EAS #1 (Step 8b). The 3GPP network returns a response (Step 8c). The EAHS maintains the session QoS flow information including the flow identifier and the applicable AC and EAS (Step 4). The AC begins communicating with EAS #1 and accessing its offered services (Step 5). During this communication, the 3GPP network ensures the QoS requirements of the AC are met.

Another method that the EAHS may use to perform EAH aware session QoS continuity, is to issue a session QoS handover request to the 3GPP network (Step 9a of FIG. 17C). In this request an EAHS may include a QoS flow identifier for the existing session QoS flow between the AC and EAS #1 and the identifier of the EAS targeted for the handover (EAS #2). The 3GPP network receives and process the request and establishes a session QoS flow between the AC and EAS #2 having the same QoS requirements as the flow between AC and EAS #1 (Step 9b). In this way, QoS flow identifier for the existing session is used to identify the desired QoS properties for the new session with the target EAS. After establishing this session QoS flow, the 3GPP network then tears down the session QoS flow between the AC and EAS #1 (Step 9c). The 3GPP network then returns a response to the EAHS that includes a flow identifier that is used to identify the new session QoS flow (Step 9d). The EAHS maintains the session QoS flow information including the flow identifier and the applicable AC and EAS (Step 10). The AC begins communicating with EAS #2 and accessing its offered services (Step 11). During this communication, the 3GPP network ensures the QoS requirements of the AC are met.

EAH Aware Management Procedures

To enable seamless handovers of ACs between different EASs in the system, an EAHC or EAHS may interface to various management functions in the system and assist them in performing different types of management operations. Conversely, management functions may also assist an EAHC or EAHS in performing edge application handovers.

Figure 18A:
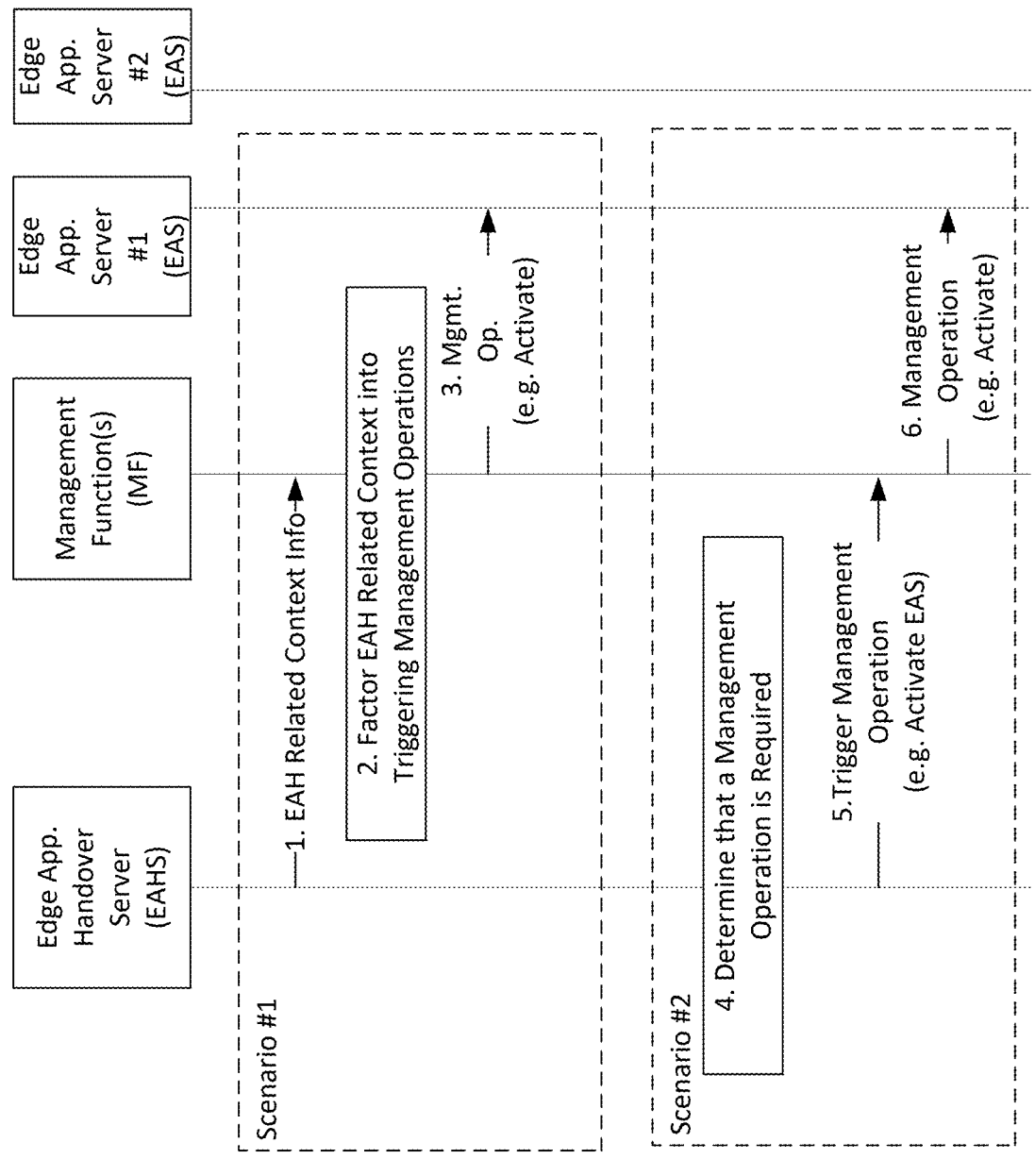
FIGS. 18A and 18B show a call flow of various example scenarios of EAH-aware management procedures.
Figure 18B:
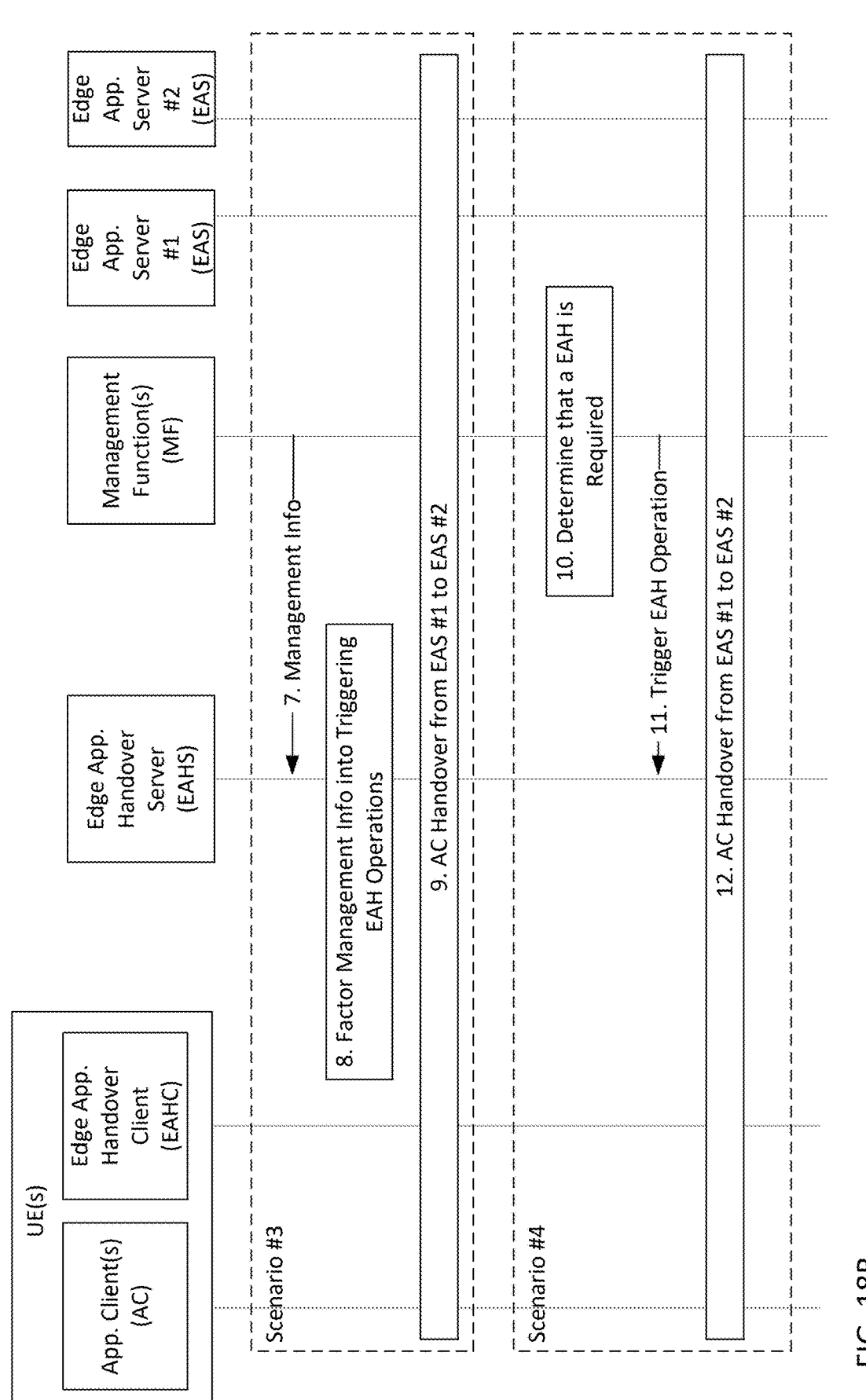

FIGS. 18A and 18B illustrates an example wherein an EAHC or EAHS may provide EAH related context information to management functions in the system such as but not limited to the types of context defined in Table 7 of the Appendix (Step 1 of FIG. 18A). The management functions may factor this information into their decision making on if/when to perform certain management operations (Steps 2 and 3). For example, an EAHC or EAHS may provide EAH related context regarding where an EAS could be deployed (e.g., on a set of edge nodes such that load balancing or performance scaling could be performed by managing the EAS status on these nodes), when an EAH is required (e.g., immediately or some specified time or schedule in the future), where an EAH is required (e.g., within a specified geographic location or region, within a specified area of the network such as within a designated edge network, or along a specified route), who an EAH is required for (e.g., which UE, AC, EAS, edge node) and why an EAH is required (e.g., UE has changed location, AC is not satisfied with level of service from current EAS, 3GPP network has signaled an issue such as network congestion).

An EAHC or EAHS may also determine that a specific management operation is required (Step 4) and may send a trigger request to a management function (Step 5) to have it perform a specific type of management operation on its behalf (Step 6) such as but not limited to deploying an EAS in a specified edge network or on a specified edge node, installing and activating/deactivating an EAS in a specified edge network or on a specified edge node.

Some types of management operations that may benefit from EAHC or EAHS assistance may include but are not limited to the following:

Optimal selection of which edge networks and edge nodes in the system are the best candidates for the deployment of a certain EAS Optimal selection of which edge networks and edge nodes in the system are the best candidates for the installation of new instances of EASs or the activation of already installed EASs Optimal selection of which edge networks, edge nodes and existing EASs in the system are the best candidates for access by specific ACs Detecting if/when there is a service availability issue in the system that is either entirely preventing an AC from accessing a certain EAS or degrading an AC's level of service when accessing the EAS Optimal selection of which existing EASs in the system are the best candidates for disabling and/or de-installing from edge networks and edge nodes when there is a shortage of available resources in edge networks or on edge nodes Determining the optimal timing for installing/activating/de-activating/modifying EASs Determining the optimal schedules for activating and de-activating EASs Reserving resources on an edge node for hosting an EAS Adjusting the status of an EAS such as the edge resource utilization of an EAS Configuration of access control policies in the system that determine which edge networks, edge nodes, edge servers, and edge application servers an AC is permitted to access.

Conversely, management functions in the system may assist an EAHC or EAHS by sharing management related information with it (Step 7 of FIG. 18B). Some types of management related information may be the status and/or availability of an edge network, edge node or an EAS in the system. An EAHC or EAHS may factor this information into its determination of whether to trigger an EAH (Step 8). An EAHC or EAHS may then determine to initiate a handover of an AC to a new EAS to alleviate an overloading condition on the EAS that the AC is currently accessing (Step 9).

A management function may also determine that an EAH is required (Step 10) and send a request to an EAHC or EAHS to trigger it to perform an EAH (Step 11) to alleviate an issue detected by a management function. An EAHC or EAHS may then initiate a handover of an AC to a new EAS to alleviate an overloading condition on the EAS that the AC is currently accessing (Step 12).

Figure 19A:
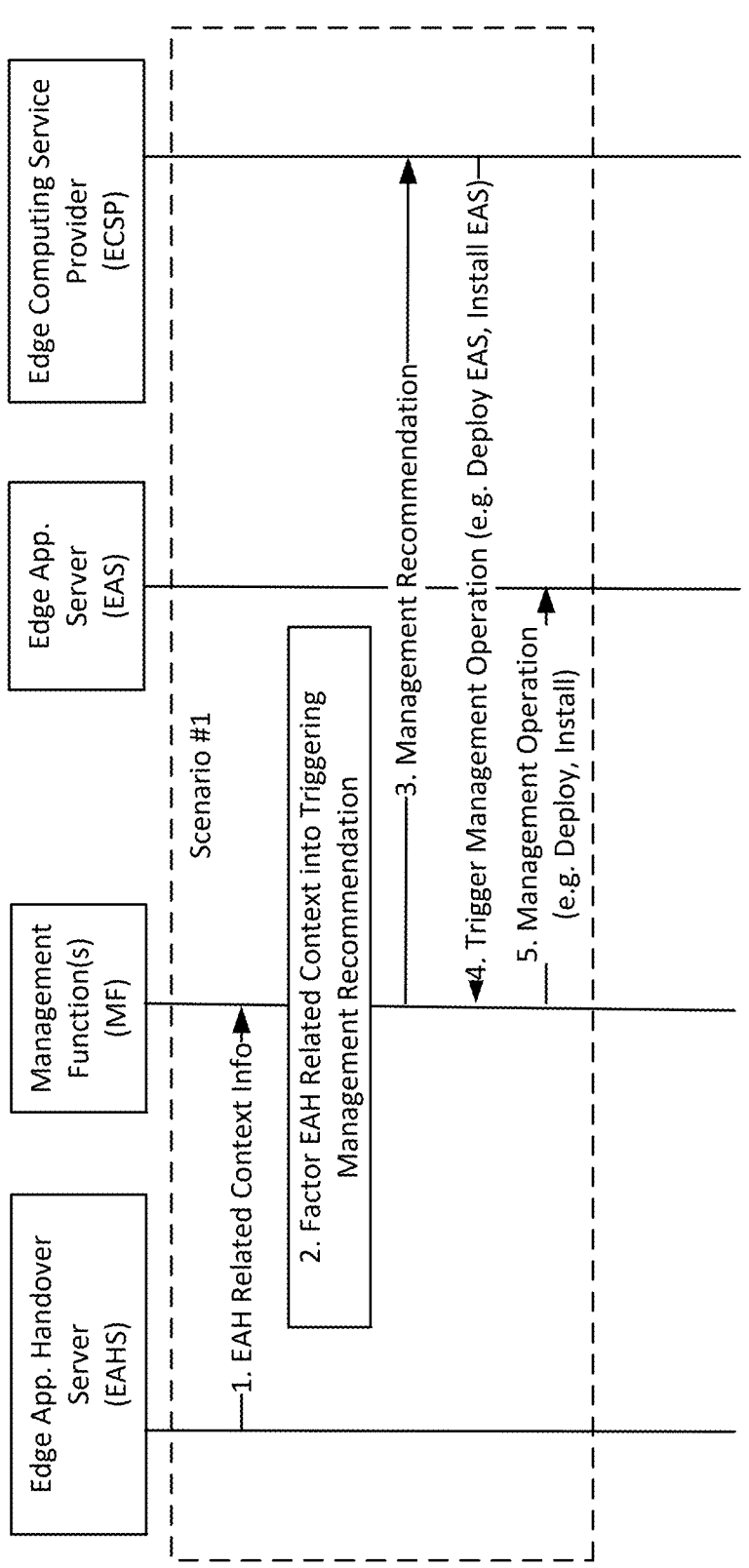
FIGS. 19A and 19B show call flows of two example scenarios of EAH-aware edge computing service provider interactions.
Figure 19B:
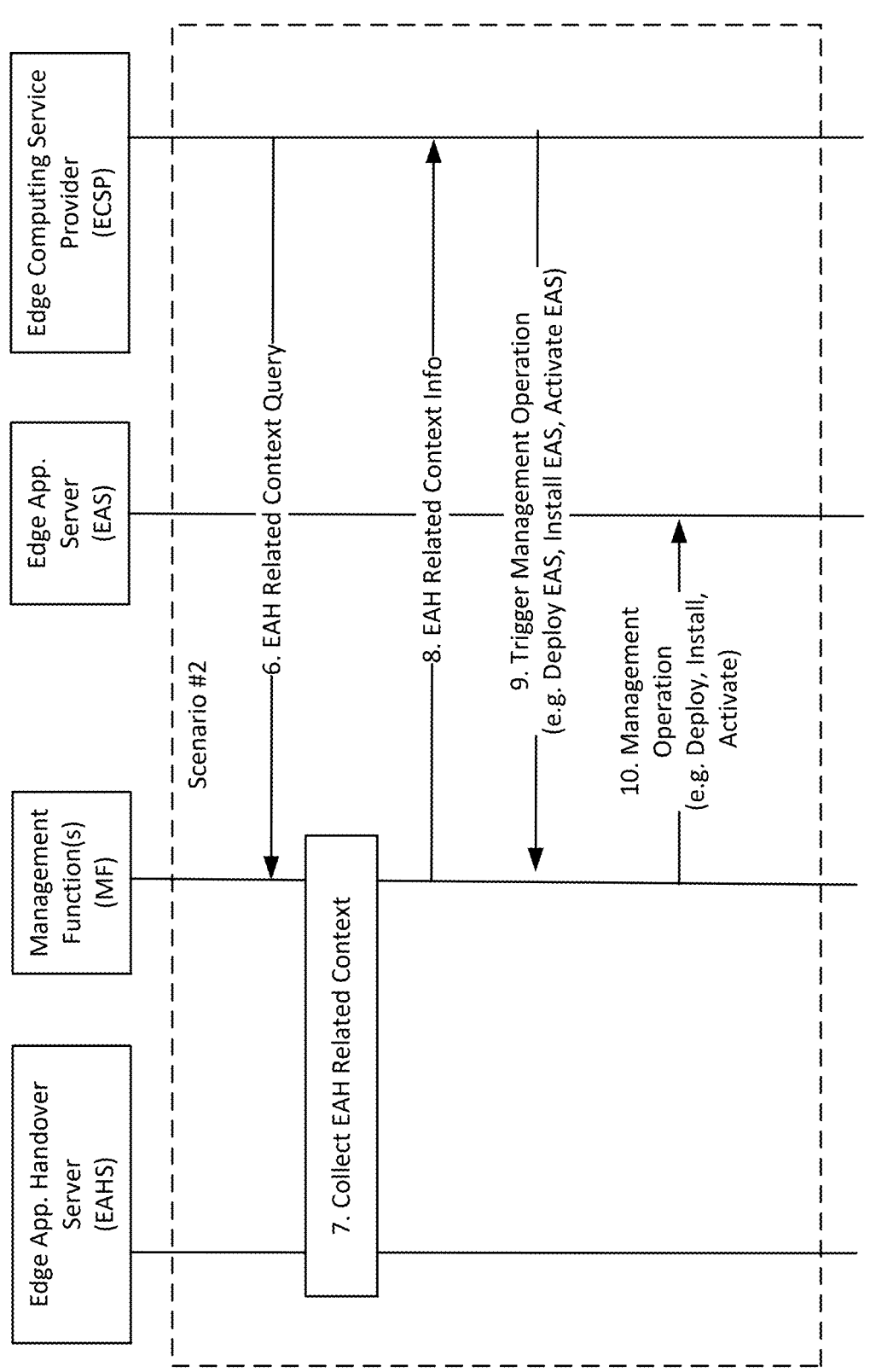

FIGS. 19A and 19B illustrate example EAH aware edge computing service provider interactions. The Edge Computing Service Provider (ECSP) may also interact with the management functions to trigger management operations such as to deploy new edge applications to the edge networks, to install new EAS instances, or to adjust the current status of a deployed or installed EAS. The EAHS may assist the management functions in interacting with the ECSP to optimize the deployment and status of EASs by sharing the EAH related context information.

The management functions may receive information about the existing EAS deployment status or instance status from the EAHS, based on which, the management functions may identify the need to deploy or install new/additional EASs (e.g., a certain type of EAS is missing in the edge network, the existing EASs of a certain type are overloading and new instances are needed). The management functions may determine the optimal operations to be taken which includes but not limited to: the type of the desired EAS, the edge nodes and edge networks that are capable of hosting the desired EASs, when the new EAS is required, if/when an EAH is required, etc. Such information may then be sent to the ECSP as a recommendation. After receiving the recommendation, the ECSP may decide whether the proposed operations are agreed. If so, the ECSP may send a request to the management functions to trigger the recommended operations, such as to deploy the desired EAS to more edge nodes or to install more instances of the desired EAS.

The management functions may receive queries from the ECSP about the deployment status and instance status of the EASs and collect the required information from the EAHS. After receiving the response, the ECSP may trigger management operations such as to deploy new EASs, to adjust the status of the deployed/installed EAS, or to perform an EAH.

Route Assisted EAH

To further optimize edge application handovers for use cases involving mobile UEs, route information of UEs may be leveraged to assist with managing edge application handovers. Route assisted edge application handovers entail leveraging route information to coordinate and manage which targeted EASs an AC is next handed off to. Route information may consist of a series of way points. Way points may be defined in terms of geographical coordinates or expressed in other terms such as but not limited to identifiers of edge networks, edge nodes and/or edge servers along a route.

Figure 20A:
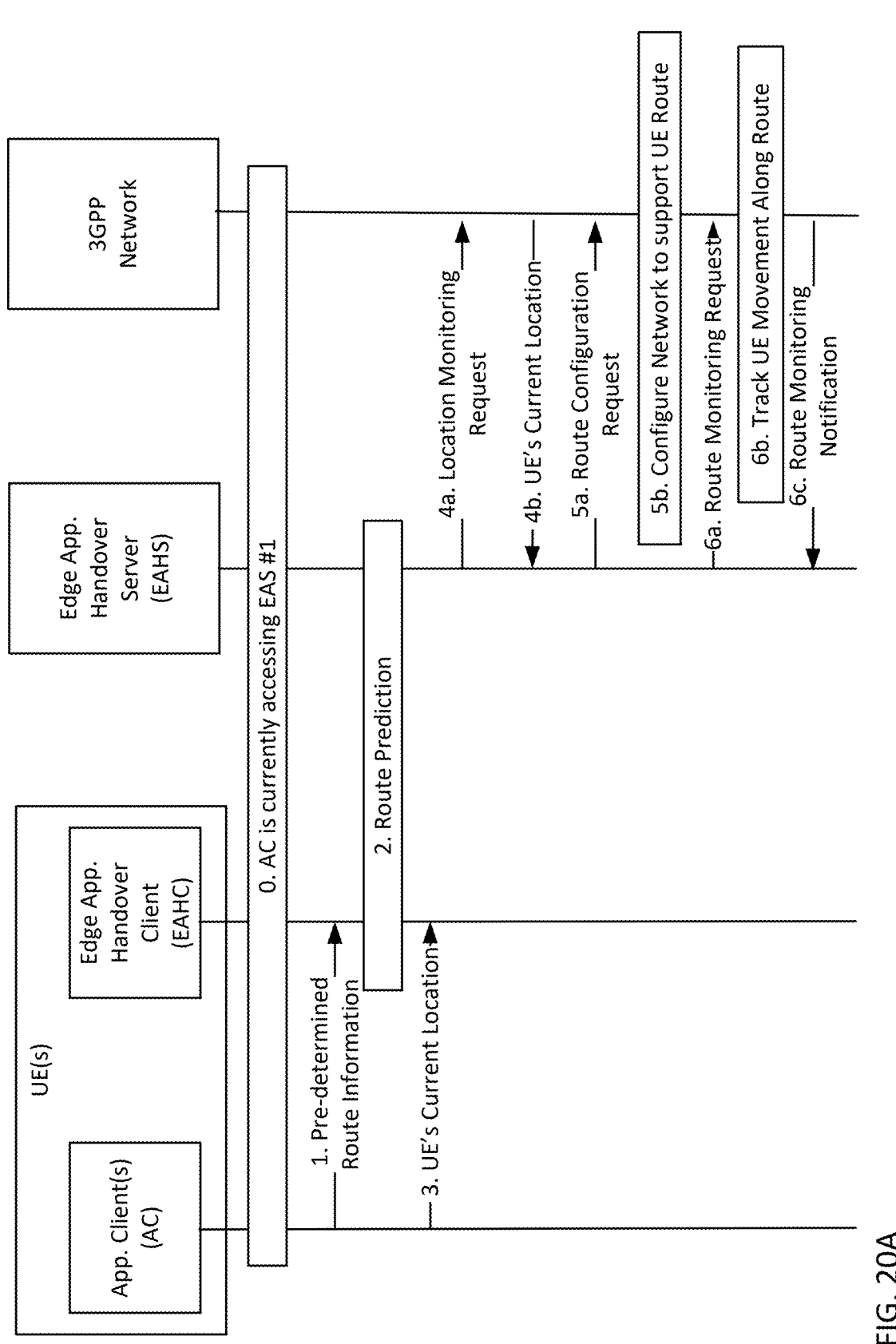
FIGS. 20A and 20B show a call flow of an example of route-assisted EAH.
Figure 20B:
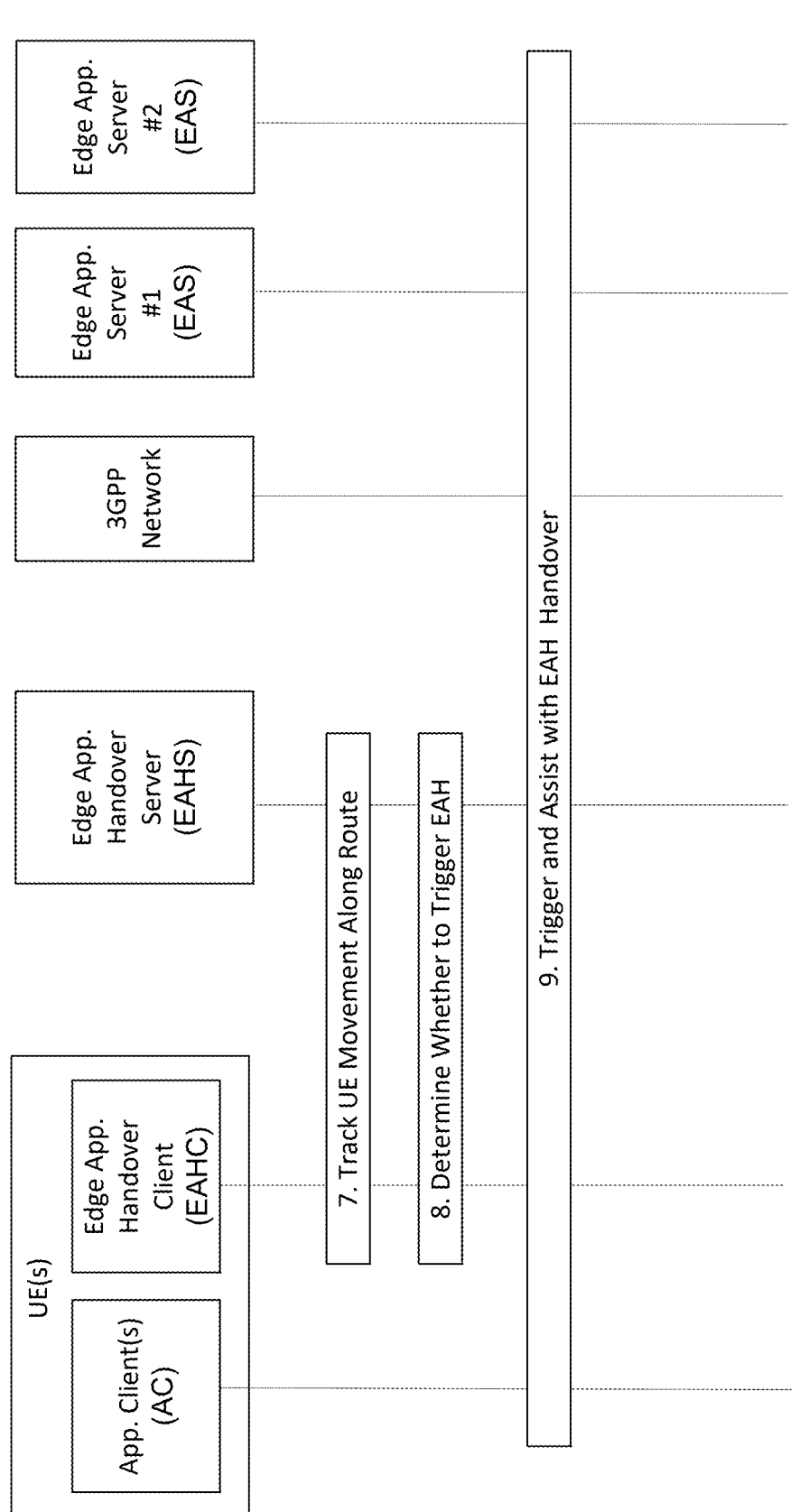

FIGS. 20A and 20B illustrate an example of route assisted EAH functionality. Route information may originate from several types of entities in the system including but not limited to a user or an AC that explicitly defines a pre-determined route in advance (Step 1). For example, a journey is planned with defined starting and ending point as well as intermediate way points. If a pre-determined route is not defined, a route may be predicted or inferred based on real-time and/or historical context information available from various entities in the system (Step 2). For example, using context information such as the roadway a UE is presently traveling on coupled with historical context such as the commute patterns of the UE, a predicted route may be calculated by an EAHS and used to assist with the selection of the next EAS(s) that AC(s) hosted on the UE are handed off to. Predictive analytic techniques may be used to assist with calculating a predicted route. Both the capability to allow pre-determined routes to be specified as well as the capability to leverage context information and predictive analytics to predict routes of a UE are functionality that may be supported by an EAHC or EAHS.

Once route information is available, the desired EAS could be proactively deployed to the edge nodes along the route. The EASs along a UE route could be pre-installed and pre-configured based on route information of the UE. Alternatively, the deployed EASs do not have to be installed or activated immediately, or stay active all the time. The timing of installation/activation/de-activation could be determined by the EAHC or EAHS according to the UE's location (Scenario #1 or #2 in FIG. 18). An EAHC or EAHS may utilize the route information to monitor the current location of UE(s) relative to the different way points defined by the route and track a UE's movement along the route as well as any unexpected deviations. To monitor and track the location of a UE along a route (Step 7), an EAHC or EAHS may rely upon updates of the current location of the UE. These updates can originate from the UE itself (Step 3), from a location function in the 3GPP network (Step 4) or from other entities in the system (e.g., SCS/ASs).

The EAHC or EAHS may share the anticipated route information for the UE with the 3GPP network such that the network can configure and optimize its network resource to ensure the UE's requirements (e.g., QoS) are met while it travels along the route (Step 5). The EAHC or EAHS may also request that the 3GPP network track the UE's movement along the route on its behalf and send it notifications regarding the UE's movement along the route (Step 6). For example, notifications including but not limited to when the UE arrives at specified way points along the route or when the UE deviates from the specified route.

Leveraging location information regarding the UE's movement along the route, an EAHC or EAHS may compare the UE's movement against available edge networks, edge nodes and/or EASs deployed along the same route and in proximity to the UE. Based on this comparison and any configured EAH policies, an EAHC or EAHS may decide on if/when it should trigger an EAH and which EAS(s) it should select as target(s) for the EAH (Step 8). If the EAHC or EAHS determines that an EAH is required is may trigger and assist other entities in the system with performing EAH operations (Step 9).

FIGS. 20A and 20B illustrate route assisted EAH. In addition to supporting route assisted edge application handovers for a single UE, an EAHC or EAHC may support route assisted EAH functionality for a group of UEs traveling together (e.g., V2X platoon). Note, this functionality is not captured in FIGS. 20A and 20B In addition to the operations captured in FIGS. 20A and 20B, an EAHS may also send one or more requests to edge or cloud nodes in a particular location or along the specified route to register the AC and/or reserve existing EASs for use by the AC such that the EASs do not become overloaded. These requests may be sent in advance (e.g., when a journey is configured, and route is determined) and before the AC is in the proximity of the cloud/edge nodes. Alternatively, these requests may be sent on-the-fly when the EAHS detects that the location of the AC has changed and is within a certain proximity of a given edge or cloud node. The request may include information such as security credentials and identifiers of the AC, projected QoS/QoE service requirements such as required service availability schedule (e.g., time window of planned use of the application or service), user profile or preference information (e.g., application settings) and/or service usage requirements (e.g., rate of requests app request rate, data limit, etc.). These requests may be sent directly to the edge node or clouds hosting the services, or they may be sent to another function in the network that facilitates registration and/or reservation of services hosted on edge node or clouds.

Example Service Layer Approaches

The assisted edge application handover ideas described herein may be applied to a variety of several service layer technologies such as but not limited to 3GPP SA6, oneM2M, and OMA LWM2M.

3GPP SA6 EDGEAPP Example

Figure 21:
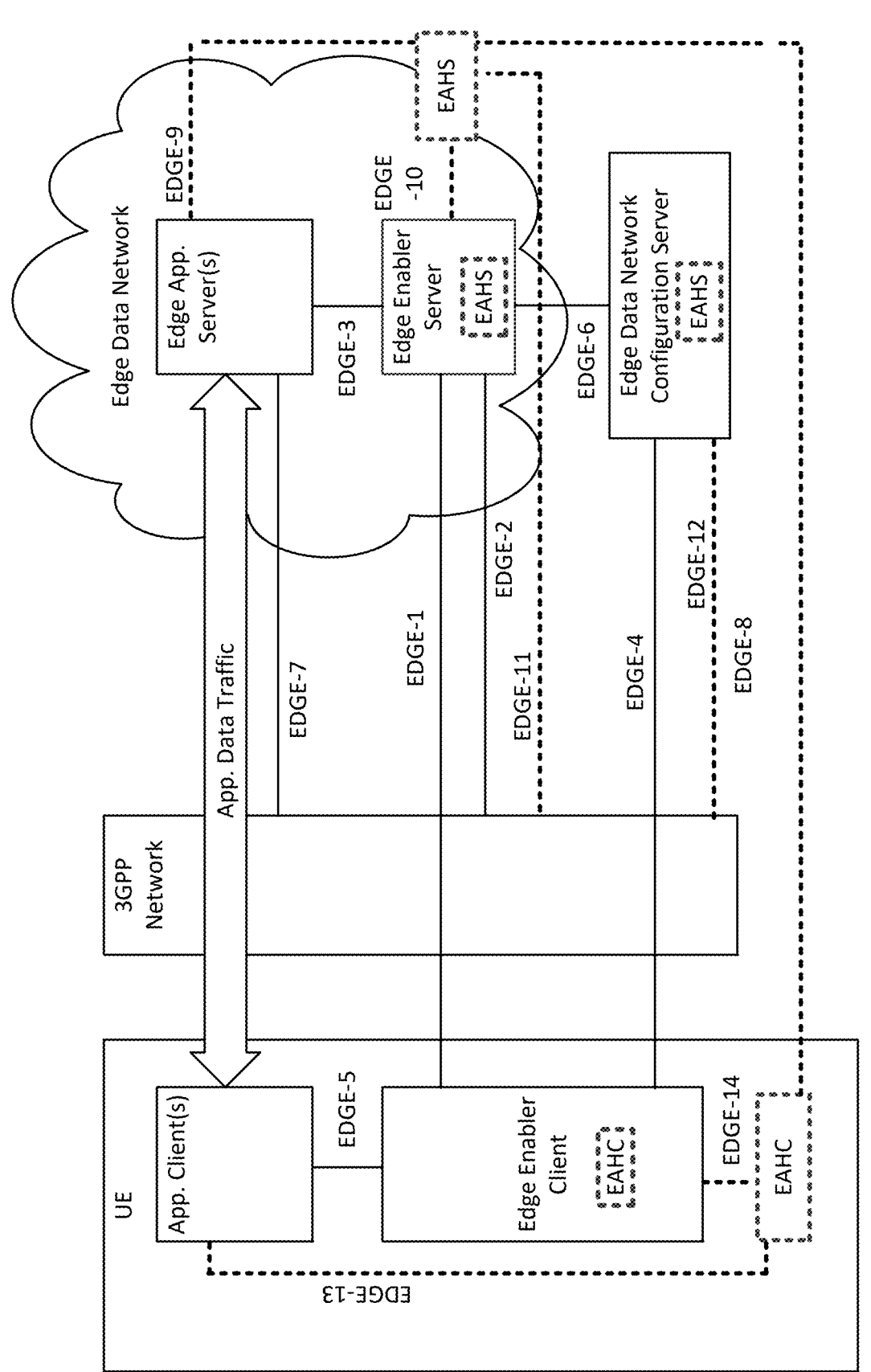
FIG. 21 is a block diagram of a 3GPP SA6 EDGEAPP example.

FIG. 21 illustrates an example of how the concepts described herein may be applied in the 3GPP SA6 defined architecture for enabling edge applications. See, e.g., TS 23.286.

The defined EAHC functionality may be realized as new functionality within the existing Edge Enabler Client function. Alternatively, the EAHC may be realized as a new standalone function of a UE. In this case, new reference points (e.g., Edge-13 and Edge-14) may be defined to support interaction with the new standalone EAHC.

The defined EAHS functionality may be realized as new functionality of an Edge Enabler Server or Edge Data Network Configuration Server functions. Alternatively, the EAHS may be realized as a new standalone function within the system. This new standalone function may be deployed in the cloud or at the edge of the network. New reference points (e.g., Edge-8, Edge-9, Edge-10, Edge-11 and Edge-12) may also be defined to support interaction between a new standalone the EAHS and an EAS, Edge Enabler Server, Edge Data Network Configuration Server, a UE and/or a 3GPP Core Network.

Table 8 of the Appendix provides an example of how the reference points of the SA6 EDGEAPP architecture could be aligned and enhanced with the functionality defined for each of the respective reference points described herein.

3GPP SA6 V2X Example

Figure 22:
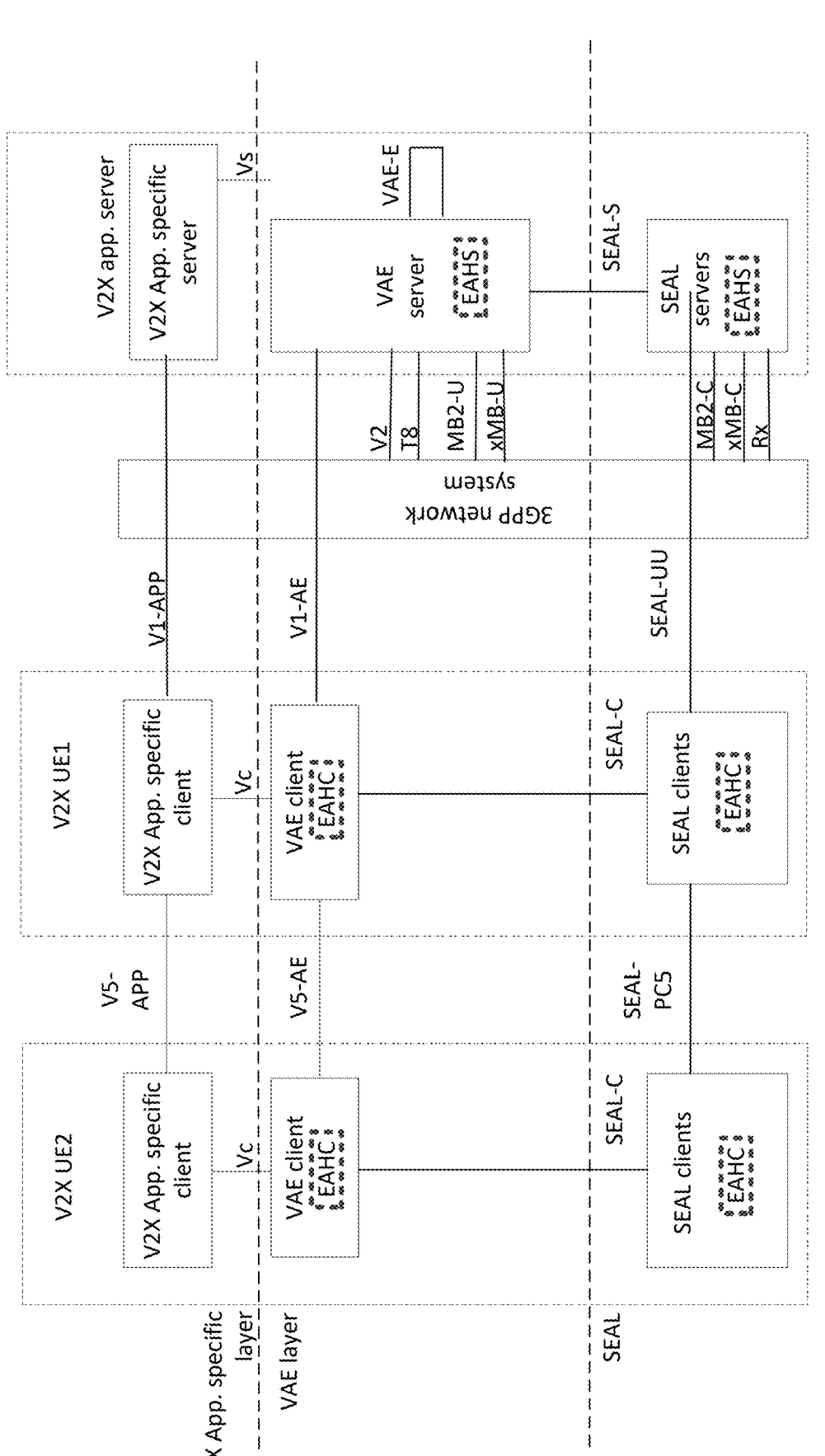
FIG. 22 is a block diagram of a 3GPP SA6 V2X example.

FIG. 22 illustrates an example of how concepts described herein may be applied in the 3GPP SA6 V2X Architecture. See, e.g., TS 23.286 and 3GPP TR 23.764.

The defined EAHC functionality may be realized as new functionality added to the existing VAE Client and/or SEAL Client functions hosted on a UE. Alternatively, the EAHC may be realized as a new standalone function of a UE (not shown in FIG. 22). In this case, new reference points may be defined to support interaction with the new standalone EAHC.

The defined EAHS functionality may be realized as new functionality added to the existing V2X Application Enabler (VAE) Server. Alternatively, the EAHS may be realized as a new standalone function within the system (not shown in FIG. 22). This new standalone function may be deployed in the cloud or at the edge of the network. In this case, new reference points may be defined to support interaction with the new standalone EAHS.

Table 9 of the Appendix provides an example of how the reference points of the SA6 V2X architecture could be aligned and enhanced with the functionality defined for each of the respective reference points described herein.

onem2M Example

Figure 23:
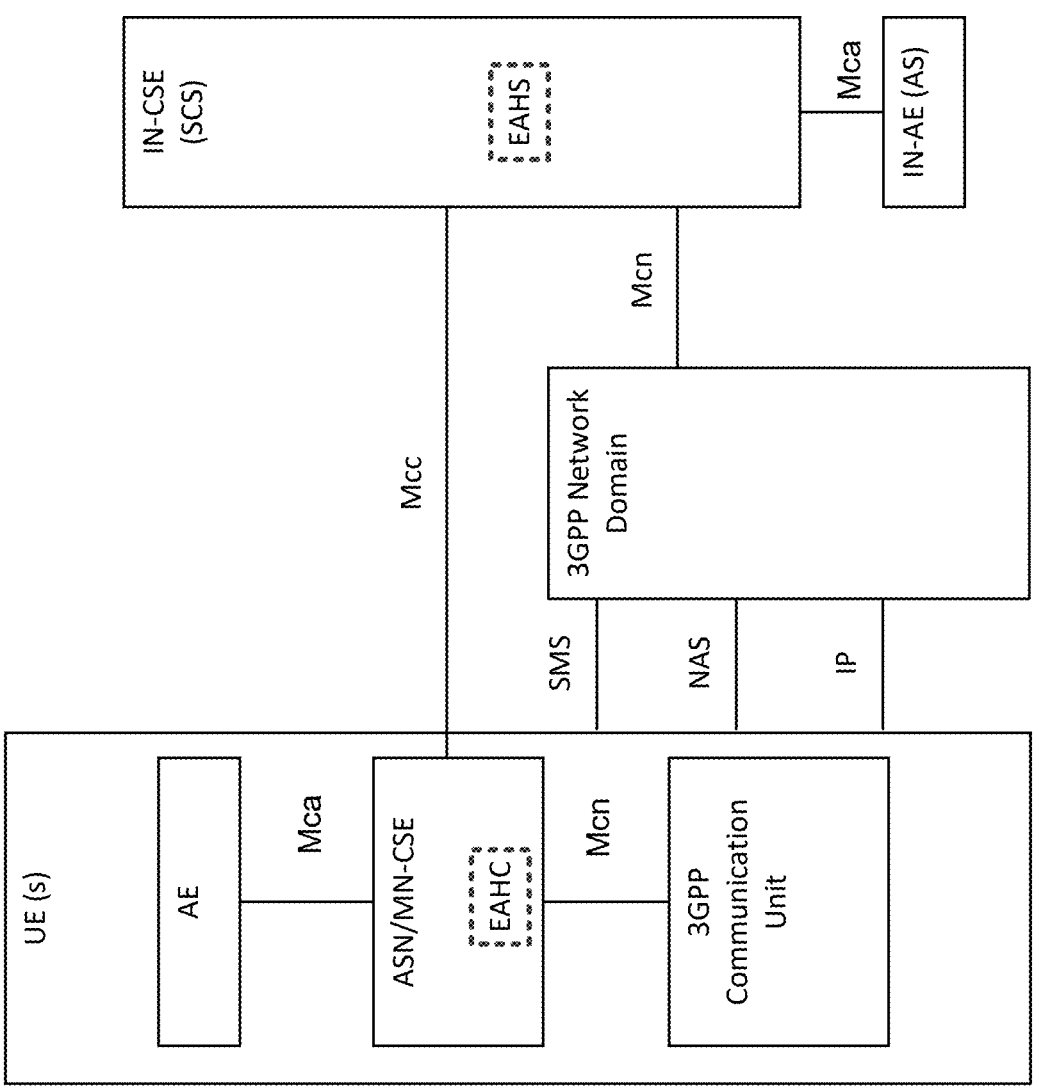
FIG. 23 is a block diagram of a oneM2M example.

FIG. 23 illustrates an example of how the functionality described herein may be applied in the oneM2M Architecture. See, e.g., TS 23.286 and 3GPP TR 23.764.

The defined EAHC functionality may be realized as new functionality added to the existing oneM2M ASN/MN-CSE hosted on a UE. The defined EAHS functionality may be realized as new functionality added to the existing oneM2M IN-CSE.

Table 10 of the Appendix provides an example of how the reference points of the SA6 EDGEAPP architecture could be aligned and enhanced with the functionality defined for each of the respective reference points described herein.

LWM2M Example

Figure 24:
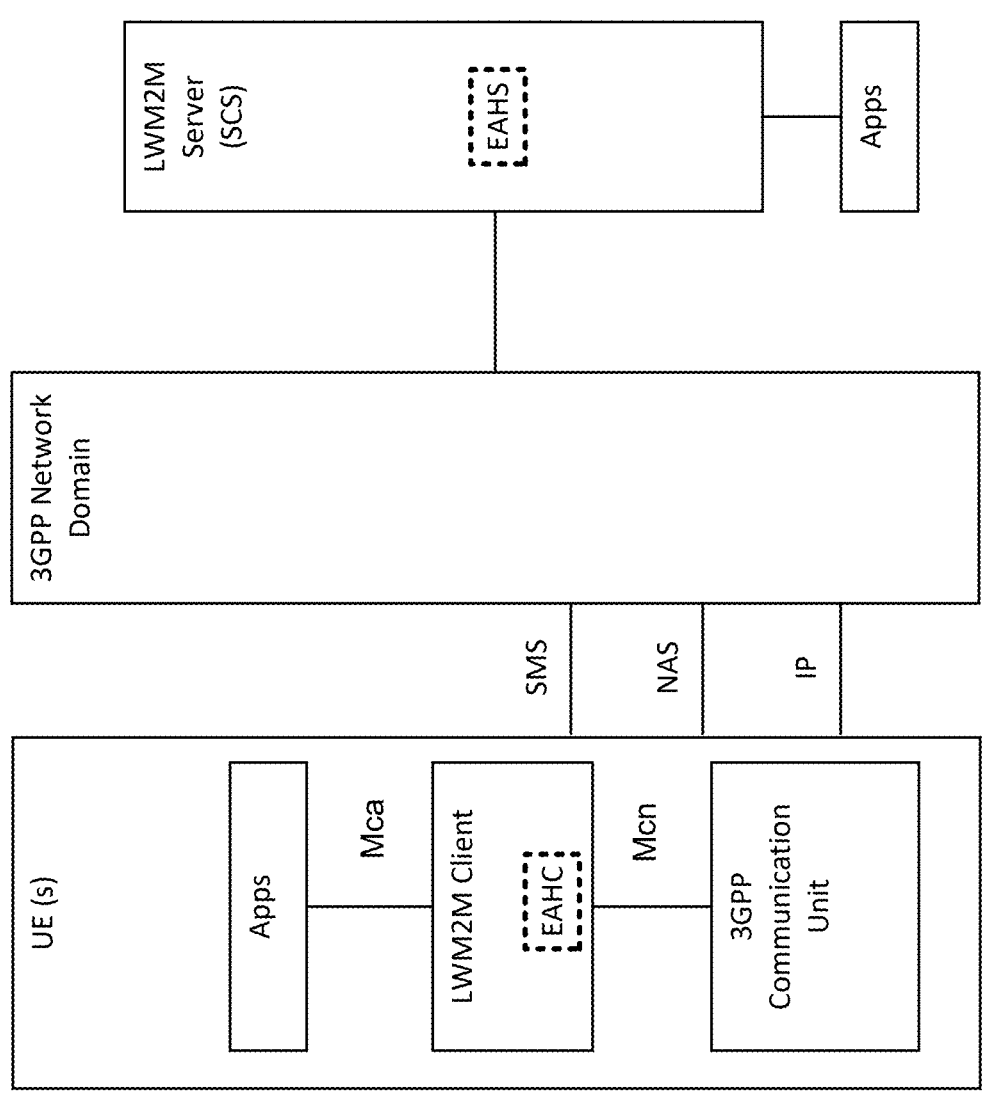
FIG. 24 is a block diagram of a LWM2M example.

FIG. 24 illustrates an example of how concepts described herein may be applied in the OMA LWM2M architecture. The EAHC defined functionality may be realized as new functionality added to the existing LWM2M Client hosted on a UE. The EAHS defined functionality may be realized as new functionality added to the existing LWM2M Server function.

Graphical User Interface (GUI)

Figure 25:
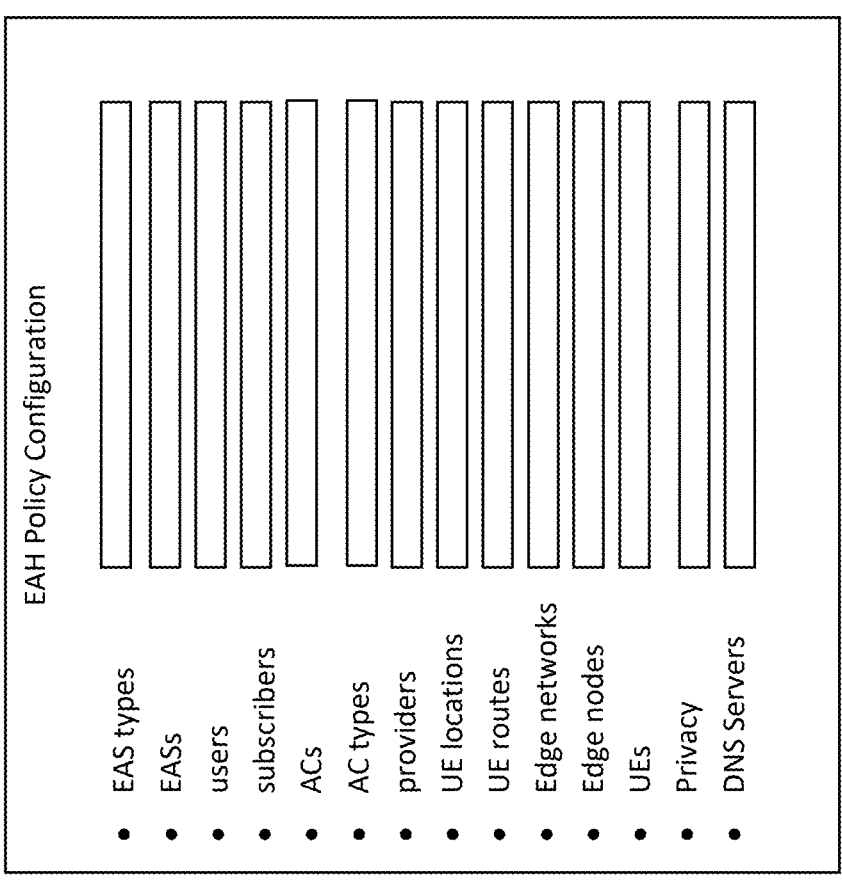
FIG. 25 illustrate an example graphical user interface (GUI) for configuring EAH policies.

FIG. 25 shows an example GUI that may be used by a person who is operating a cellular device to request config-ure EAH policy settings associated with the cellular device. These policies may be used by the EAHC and/or EAHS server functionality described herein.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards, 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spec-trum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particu-lar, the ultra-mobile broadband is expected to share a com-mon design framework with the flexible radio access below 6 GHz, with cmWave and mmWave specific design optimi-zations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V21), Vehicle-to-Net-work Communication (V2N), Vehicle-to-Pedestrian Com-munication (V2P), and vehicle communications with other entities. Specific service and applications in these categories include, e.g., monitoring and sensor networks, device remote controlling, bi-directional remote controlling, per-sonal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 26A:
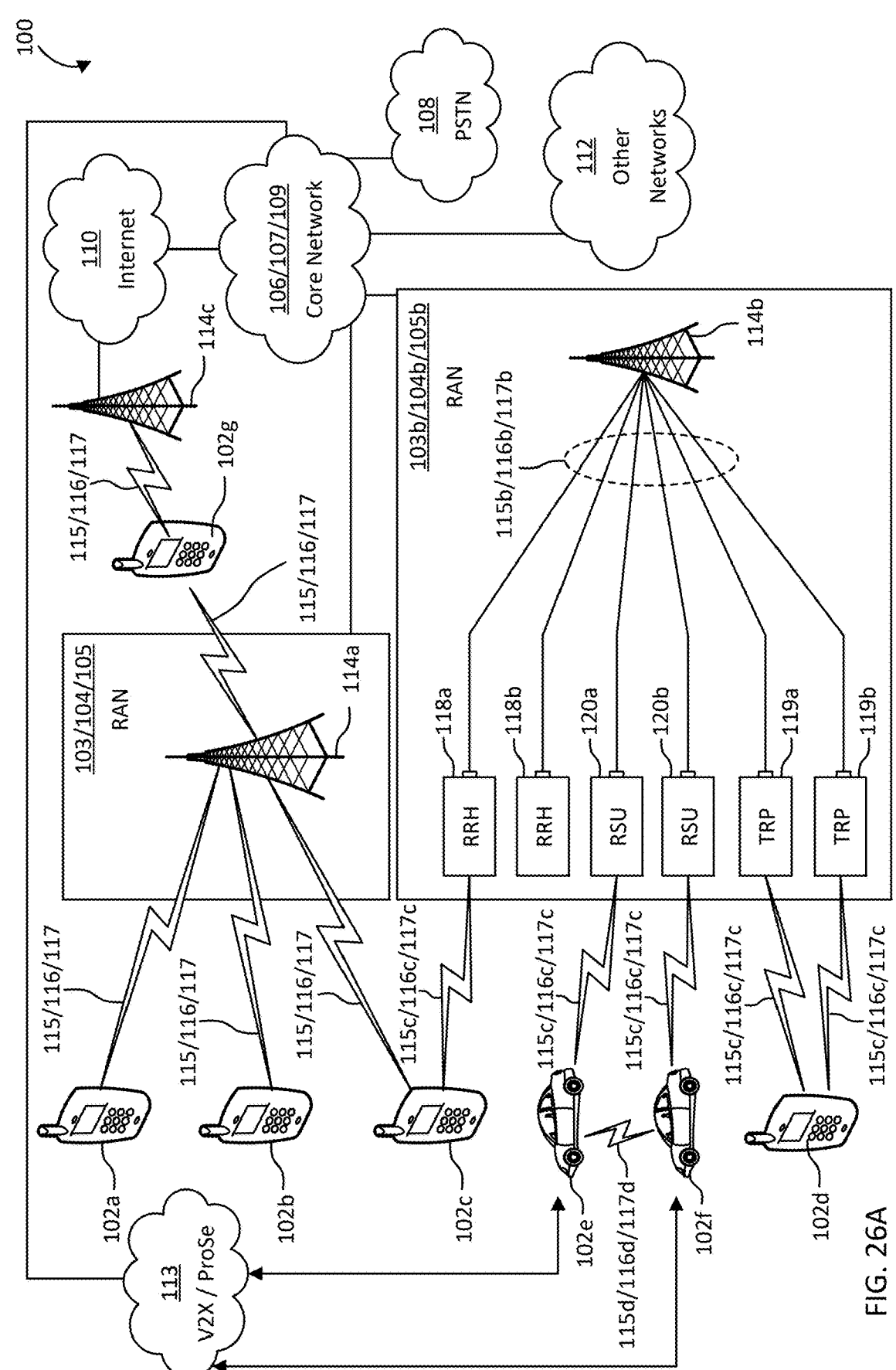
FIG. 26A illustrates an example communications system in which the methods and apparatuses described and claimed herein may be embodied.

FIG. 26A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*. 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 26A-26E as a hand-held wireless communications apparatus, it is under-stood that with the wide variety of use cases contemplated for 5G wireless communications, each WTRU may com-prise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*. 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*. 102*b*, 102*c*, or RRHs 118*a*, 118*b*, TRPs 119*a*, 119*b* and RSUs 120*a*. 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*. 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 26A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 26A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 26A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/ 105b or a different RAT. For example, in addition to being connected to the RAN 103/104/105 and/or RAN 103b/104b/ 105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 26A may be configured to communicate with the base station 114a, which may employ a cellular-based radio technology, and with the base station 114c, which may employ an IEEE 802 radio technology.

Figure 26B:
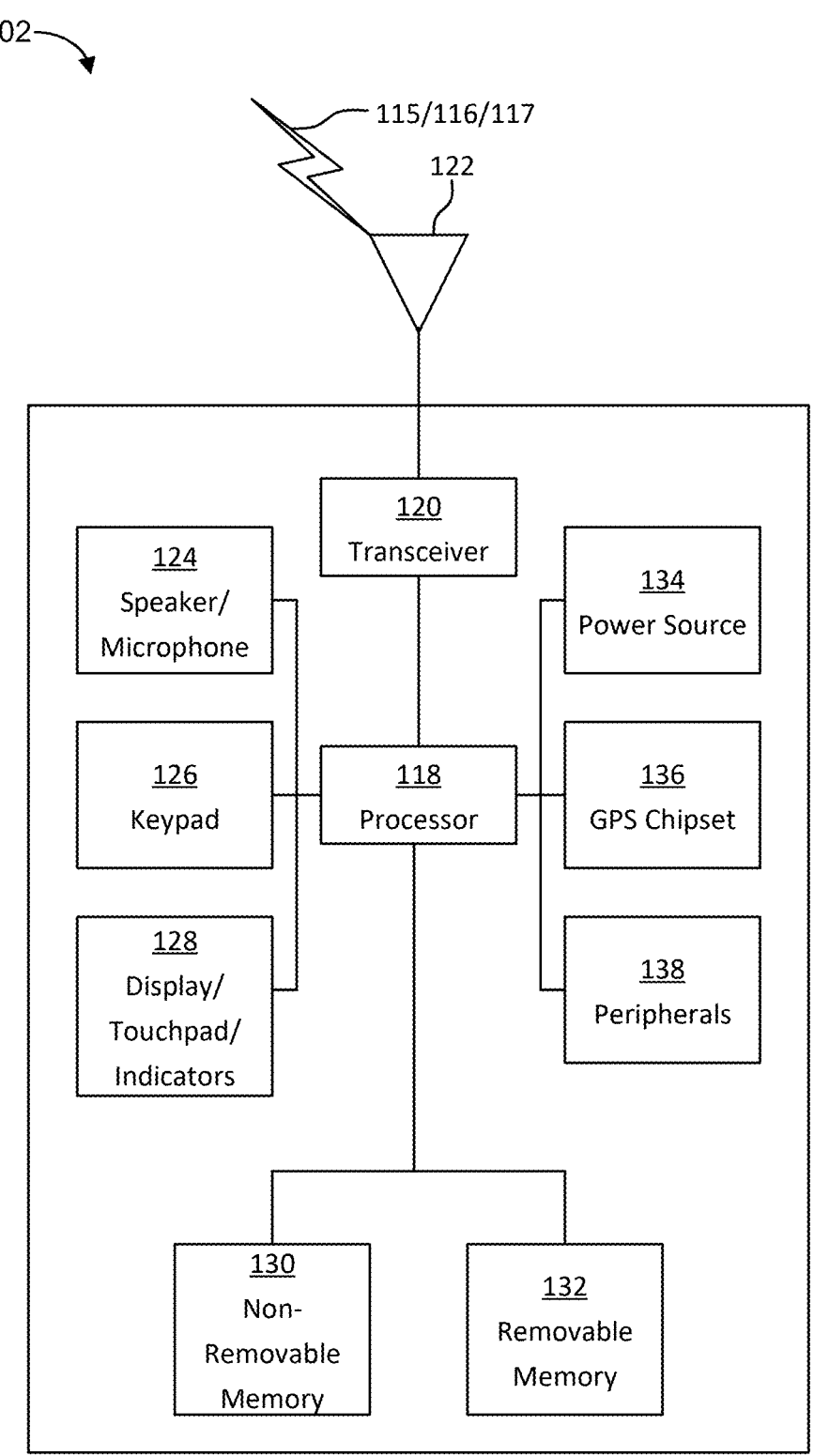
FIG. 26B is a block diagram of an example apparatus or device configured for wireless communications.

FIG. 26B is a block diagram of an example apparatus or device configured for wireless communications in accordance with the embodiments illustrated herein, such as for example, a WTRU 102. As shown in FIG. 26B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 26B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 26B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/ 117. For example, in an embodiment, the transmit/receive element 122 may be an antenna configured to transmit and/or receive RF signals. In an embodiment, the transmit/ receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/ receive element 122 may be configured to transmit and/or receive any combination of wireless signals.

In addition, although the transmit/receive element 122 is depicted in FIG. 26B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 26C:
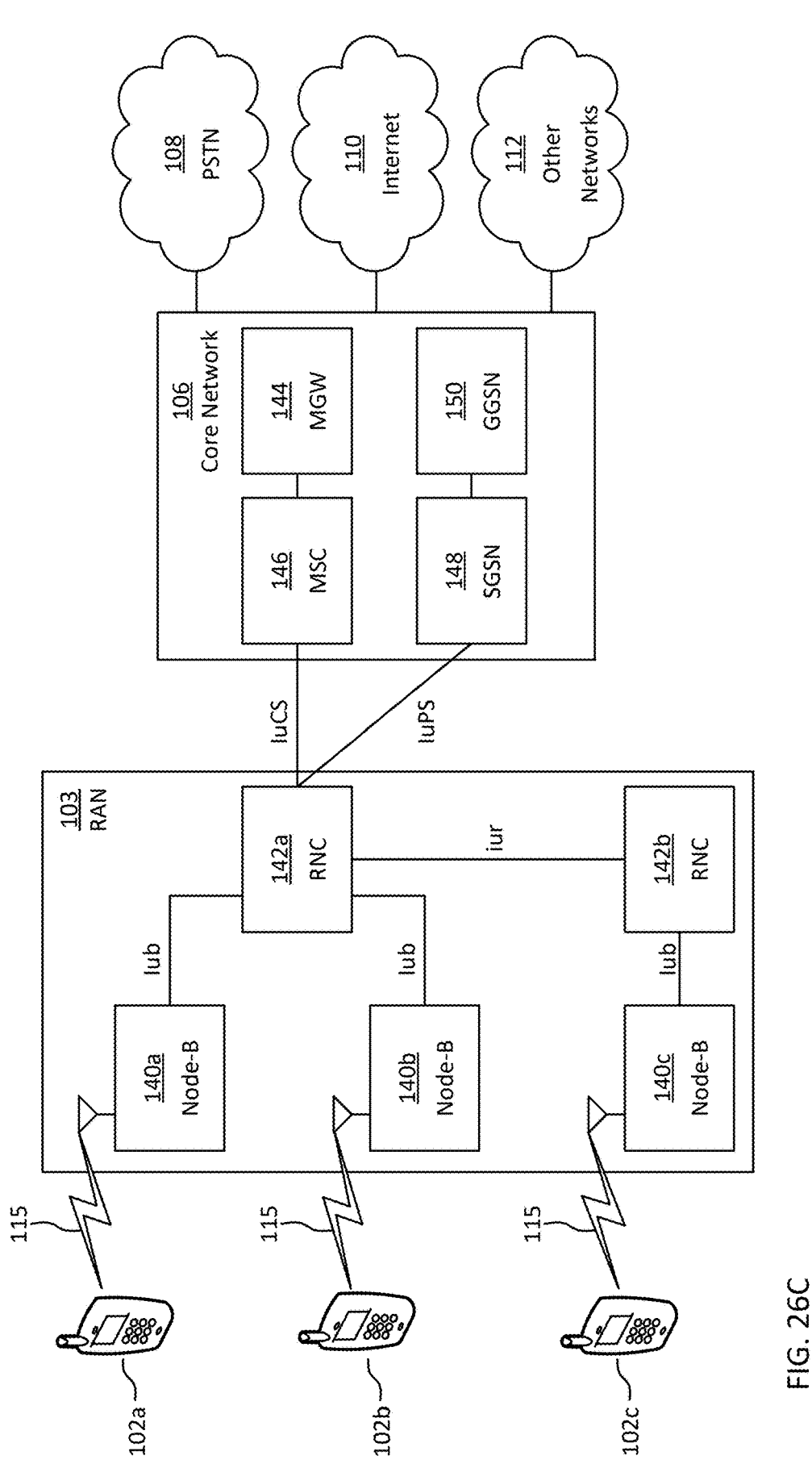
FIG. 26C is a system diagram of an example radio access network (RAN) and core network.

FIG. 26C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 26C, the RAN 103 may include Node-Bs 140a. 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 26C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a. 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 26C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b. 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 26D:
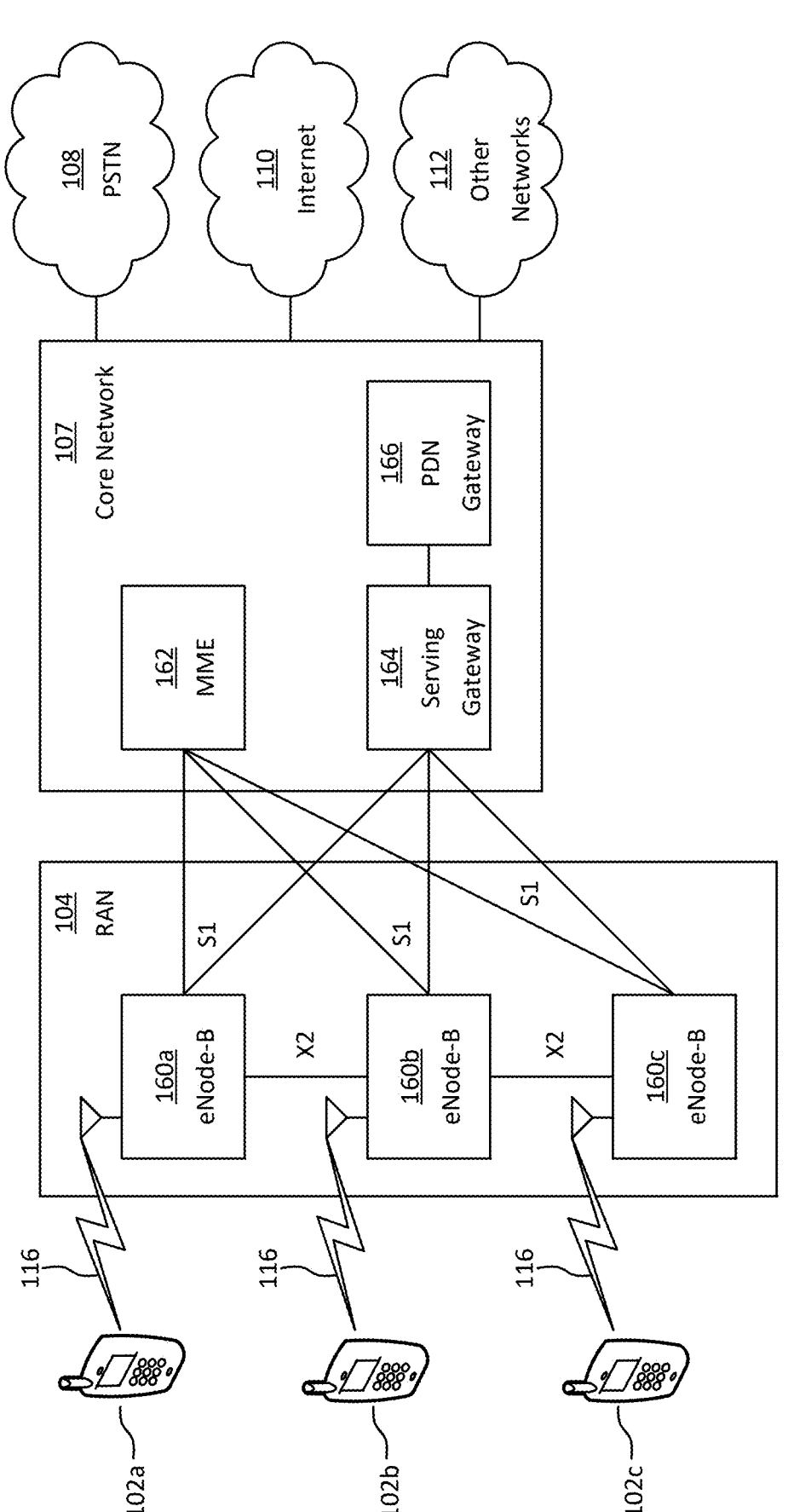
FIG. 26D is a system diagram of another example RAN and core network.

FIG. 26D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not show-n) and may be configured to handle radio resource management decisions, handover decisions, scheduling of users in the uplink and/or downlink, and the like. As shown in FIG. 26D, the eNode-Bs 160a, 160b, 160c may communicate with one another over an X2 interface.

The core network 107 shown in FIG. 26D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b. 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b. 102c with access to the networks 112, which may include other wired or wireless networks that are owned and/or operated by other service providers.

Figure 26E:
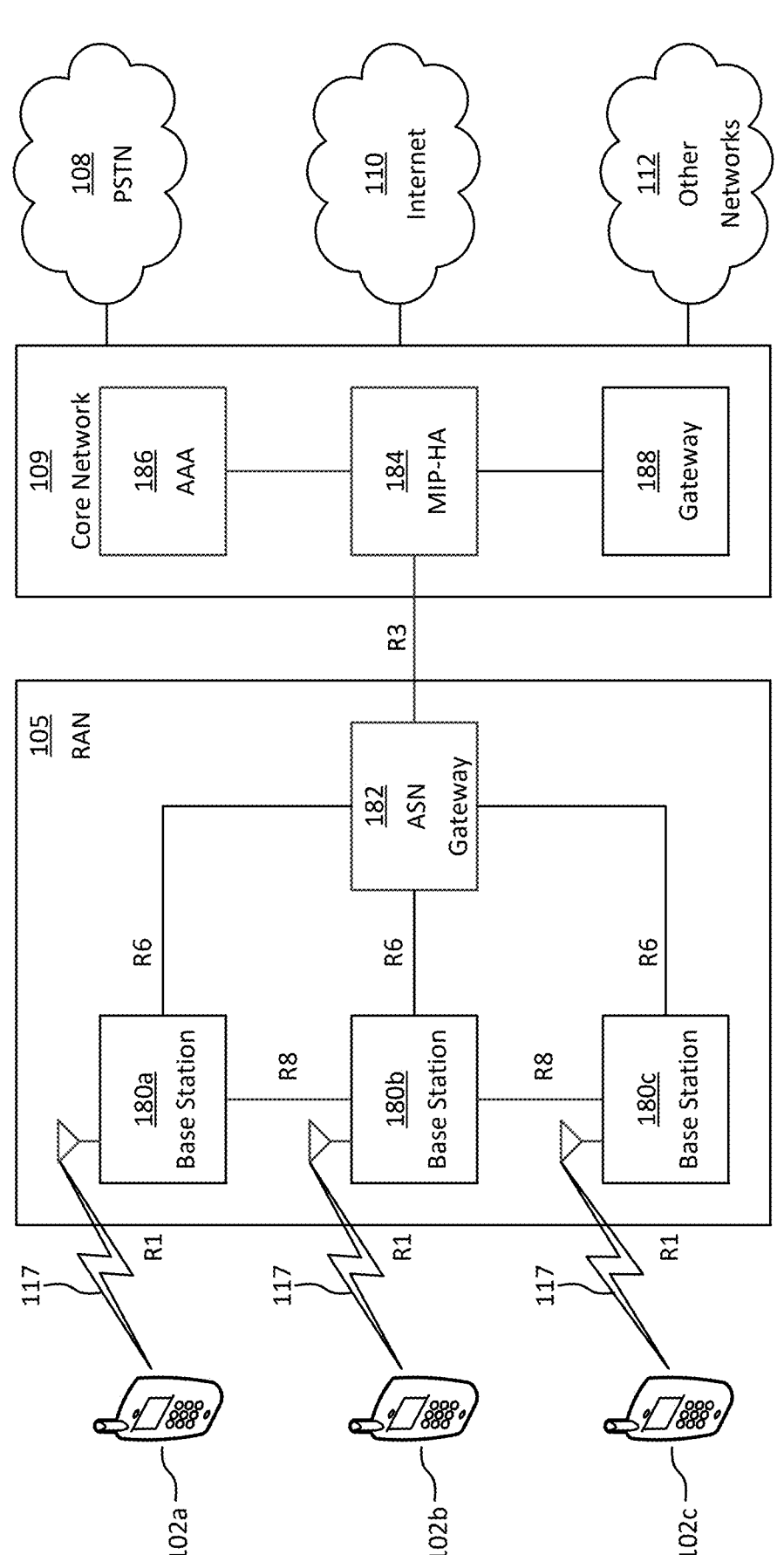
FIG. 26E is a system diagram of another example RAN and core network.

FIG. 26E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 26E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a. 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization. IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 26E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b. 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a. 102b, 102c with access to the networks 112, which may include other wired or wireless networks that are owned and/or operated by other service providers.

Although not shown in FIG. 26E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 26A, 26C, 26D, and 26E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 26A, 26B, 26C, 26D, and 26E are provided by way of example only, and it is understood that the subject matter disclosed and claimed herein may be embodied or implemented in any similar communication system, whether presently defined or defined in the future.

Figure 26F:
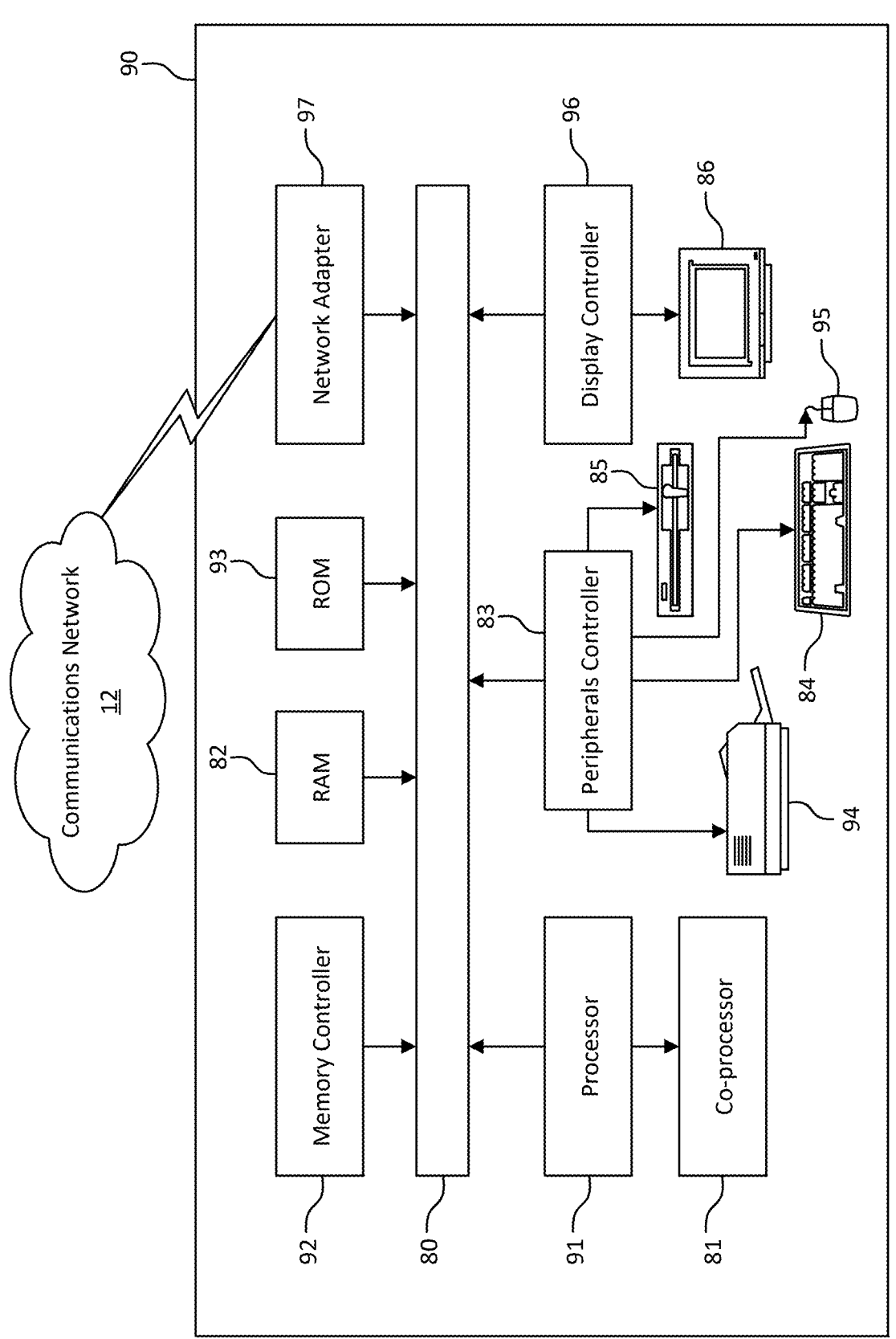
FIG. 26F is a block diagram of an example computing system.

FIG. 26F is a block diagram of an exemplary computing system 90 in which one or more apparatuses of the communications networks illustrated in FIGS. 26A, 26C, 26D and 26E may be embodied, such as certain nodes or functional entities in the RAN 103/104/105, Core Network 106/107/109, PSTN 108. Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 26A, 26B, 26C, 26D, and 26E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 26G:
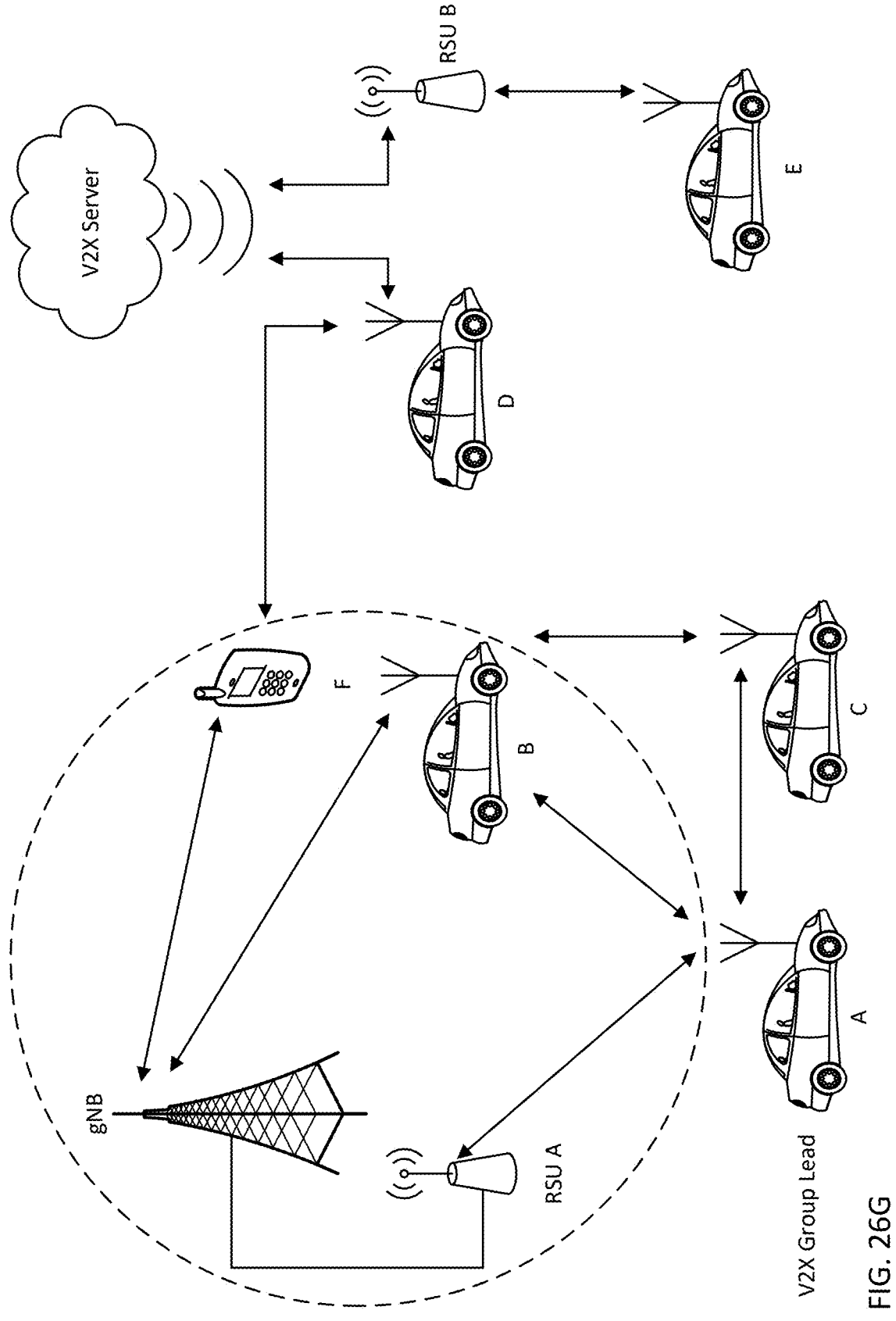
FIG. 26G is a block diagram of another example communications system.

FIG. 26G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

TABLE 0.1

| Abbreviations | |
| --- | --- |
| 5GC | 5G Core Network |
| 5QI | 5G QoS Identifier |
| AAA | Authentication, Authorization, and Accounting |
| API | Application Programming Interface |
| AS | Application Server |
| AC | Application Client |
| CN | Core Network |
| CPU | Central Processing Unit |
| DNN | Data Network Name |
| DNS | Domain Name Server |
| EAH | Edge Application Handover |
| EAHC | Edge Application Handover Client |
| EAHS | Edge Application Handover Server |
| EAS | Edge Application Server |
| ECS | Edge Configuration Server |
| EES | Edge Enabler Server |
| EEC | Edge Enabler Client |
| FQDN | Fully Qualified Domain Name |
| GUI | Graphical User Interface |
| LADN | Local Area Data Network |
| MF | Management Function |
| NEF | Network Exposure Function |
| NF | Network Function |
| PDU | Protocol Data Unit |

TABLE 0.1-continued

| Abbreviations | |
| --- | --- |
| PLMN | Public Land Mobile Network |
| PoC | Point-Of-Contact |
| PSK | Pre-Shared Key |
| QoS | Quality of Service |
| QoE | Quality of Experience |
| SCS | Service Capability Server |
| SCEF | Service Capability Exposure Function |
| SEAL | Service Enabler Architecture Layer |
| SL | Service Layer |
| SSC | Session and Service Continuity |
| SSCMSP | SSC Mode Selection Policy |
| TLS | Transport Layer Security |
| UE | User Equipment |
| URI | Universal Resource Identifier |
| VAE | V2X Application Enabler |
| V2X | Vehicle to Everything |

TABLE 0.2

| Selected Terminology | |
| --- | --- |
| Application Server | An entity deployed on a network node that provides services to Application Clients |
| Application Client | An entity that accesses the services of an Application Server |
| Edge Application Server | A server hosted on an edge node |
| Edge Node | A virtual or physical entity deployed within an edge network and that hosts edge-based applications and services |
| Edge Network | A network domain deployed at the periphery of a larger network |
| Edge Application Handover | The process to migrate an Application Client from using one Edge Application Server to another Edge Application Server or Cloud Application Server (or vice versa). |
| Edge Enabler Server | An entity deployed within an edge network that provides edge network centric services to Edge Enabler Clients and Edge Application Servers |
| Edge Enabler Client | An entity deployed on a device that provides edge network centric services to Application Clients hosted on the device. |
| Edge Data Network Configuration Server | An entity in the network that configures Edge Enabler Clients and Edge Enabler Servers such that they can function in an edge network |
| V2X Application Server | An Application Server that offers V2X centric services to V2X Application Clients |
| V2X Application Client | An entity deployed on a V2X device that accesses V2X centric services of a V2X Application Server in a network |
| V2X Application Enabler Server | An entity deployed within an edge network that provides V2X centric services to V2X Application Servers |
| V2X Application Enabler Client | An entity deployed on a V2X device that provides V2X centric services to V2X Application Clients on the device |

TABLE 1

| $I_{EAHC-AC}$ Operations | | | | |
| --- | --- | --- | --- | --- |
| # | Operation | Source | Destination | Description | Parameters |
| 1 | AC Context Request | AC | EAHC | An AC may send this request to the EAHC to share EAH related context of the AC with the EAHC. This context may pertain to past, present or future AC service requirements or status information. The EAHC may locally store and/or use this | AC identifier (e.g., User Identifier) AC status (e.g., location, active/inactive, current user, etc.) AC requirements: one or more identifiers or type indicators of required services one or more locations or anticipated routes for which the services are required |

TABLE 1-continued $I_{EAHC-AC}$ Operations

| # | Operation | Source | Destination | Description | Parameters |
|---|-----------|--------|-------------|-------------|------------|
| | | | | information to assist with the seamless edge application handovers of ACs between EASs. The EAHC may factor this information into its determination of if/when a handover of the AC is required from one EAS to another EAS. The types of context that may be published by an AC may include but is not limited to the AC related context defined in Error! Reference source not found. Table 7. | required levels of service or network QoS (e.g., latency or a 5QI) required levels of service or network QoE (e.g., rate of requests, data limits) continuity of service requirements (e.g., data/information history or persistency needs or SSC Mode) security requirements (e.g., minimum level of security) required service providers required data network providers (PLMN IDs) required service charges/fees (e.g., free, max rate) |
| 2 | EAH Context Response | EAHC | AC | An EAHC returns this response to the AC to indicate that it received the context information shared by the AC | Status indicator |
| 3 | EAH Request | AC | EAHC | An AC sends this request to the EAHC to explicitly request that the EAHC assist it with performing an EAH. For example, if an AC detects that the level of service that it is receiving from an EAS is not meeting its requirements, an AC can initiate an EAH via a request to the EAHC. The EAHC can receive such requests from ACs and assist the ACs by performing EAH operations on their behalf. An AC may also send this request to the EAHC to explicitly request that the EAHC assist it with initially connecting to an EAS (e.g., when AC first starts up and is not connected to an EAS). | AC identifier AC type EAS/Service type indicators Current EAS identifier Location Route Service schedule requirements Service usage requirements, Service provider requirements Service charges/fee requirements Service access requirements (e.g., rate, response time, etc.) Security requirements |
| 4 | EAH Response | EAHC | AC | An EAHC returns this response to the AC to indicate whether the EAH was completed successfully or not. | New EAS identifier/contact info Location of EAS Allowed service schedule Allowed service usage (e.g., service coverage area, geo-fence restrictions) Service provider Service charges/fee structure Security IDs/credentials Contact info of security bootstrap server API info of new EAS New EAS identifier/contact info Level of QoS/QoE available Service provider Any handover operations that AC needs to perform |
| 5 | EAH Subscription Request | AC | EAHC | An AC sends this request to create a new EAH subscription with an EAHC or update an existing one. An EAH subscription is used by an AC to subscribe to receive EAH notifications if/when the EAHC determines that an EAH is required or has occurred. | Callback URI to receive EAH notifications EAH subscription criteria that define if/when an AC is interested in receiving EAH notifications from an EAHC and the contents of these notifications. |
| 6 | EAH Subscription Response | EAHC | AC | An EAHC returns this response to the AC to indicate whether the EAH subscription was created or updated successfully or not. | Subscription Identifier (if request is an update) Status indicator of whether the EAH subscription was created or updated Identifier of EAH subscription which can be used by the AC to associate EAH notifications to this subscription as well as to perform future updates or deletes to the subscription. |
| 7 | EAH Notification Request | EAHC | AC | An EAHC may initiate EAH operations on behalf of ACs to assist them with determining when an EAH is required. An EAHC may also receive an EAHS initiated EAH request. In either case, the EAHC may send an EAH notification request to an AC to notify it that an EAH has occurred | EAH Subscription Identifier Similar information that is defined in EAH response above. |

TABLE 1-continued $I_{EAHC-AC}$ Operations

| # | Operation | Source | Destination | Description | Parameters |
|---|-----------|--------|-------------|-------------|------------|
| | | | | and/or to trigger an AC to perform an EAH related operation (e.g., state synchronization/migration). Alternatively, the EAHC may perform the EAH operations on behalf of the AC such that the AC does not need to be aware that edge application handovers have occurred. In this case EAH notifications may not be sent to an AC. | |
| 8 | EAH Notification Response | AC | EAHC | An AC sends this response to the EAHC to indicate whether it received and processed the EAH notification and any associated EAH operations that were specified in the notification request and/or whether the AC transitioned over to using the new EAS. | Status indicator whether notification was received and processed by the AC |
| 9 | EAH Subscription Delete Request | AC | EAHC | AC sends this request to delete an EAH subscription from an EAHC such that it no longer receives EAH notifications from the EAHC. | AC identifier Subscription Identifier |
| 10 | EAH Subscription Delete Request | EAHC | AC | An EAHC returns this response to the AC to indicate whether the EAH subscription was deleted successfully or not. | Status indicator whether subscription was deleted by the EAHC |
| 11 | EAS FQDN Resolution Request | AC | EAHC | AC sends this request to have the EAHC assist it with resolving the FQDN of a specified EAS into the point-of-contact information for the EAS. The EAHC can perform this operation in an EAH aware manner such that it can cache point-of-contact information for EAS until an EAH occurs. If an EAH does occur, the EAHC can refresh new EAS point-of-contact information from the correct DNS Server associated with the edge network that the AC is accessing the EAS from. | EAS FQDN |
| | EAS FQDN Resolution Response | EAHC | AC | An EAHC returns this response with the FQDN resolution results. | Indicator of whether the FQDN was successfully resolved Point-of-Contact information (e.g., IP address, port, URI) of the resolved FQDN |

TABLE 2

$I_{EAHS-EAS}$ Operations

| # | Operation | Source | Destination | Description | Parameters |
|---|-----------|--------|-------------|-------------|------------|
| 1 | EAH Context Request | EAS | EAHS | An EAS may send this request to the EAHS to share EAH related context with the EAHS. This context may pertain to past, present or future EAS context information. The EAHS may locally store and/or use this information to assist with the seamless handovers of ACs between EASs. The EAHS may factor this context into its determination of if/when an EAH is required from one EAS to another EAS. The types of context that may be published by an EAS may include but is not limited to the EAS related context defined in Error! Reference source not found. Table 7. | EAS identifier EAS context |

TABLE 2-continued $I_{EAHS-EAS}$ Operations

| # | Operation | Source | Destination | Description | Parameters |
|---|-----------|--------|-------------|-------------|------------|
| 2 | EAH Context Response | EAHS | EAS | An EAHS returns this response to the EAS to indicate that it received the context information shared by the EAS. | Status indicator |
| 3 | EAH Request | EAS | EAHS | An EAS sends this request to the EAHS to explicitly request that the EAHS assist it with performing an EAH. For example, if an EAS detects that it is overloaded or that an AC is accessing it services, but the AC is no longer in its proximity, an EAS can initiate an EAH via a request to the EAHS. The EAHS can receive such requests from EASs and assist the EASs by performing EAH operations on their behalf. | EAS identifier<br>AC identifier(s)<br>EAH priority<br>EAH schedule<br>EAH reason |
| 4 | EAH Response | EAHS | EAS | An EAHS returns this response to the EAS to indicate whether the EAH was completed successfully or not. | Status indication whether request was performed successfully<br>Identifier of EAS that handover occurred to<br>EAH handover operations that an EAS is to<br>perform (e.g., application state synchronization/migration) |
| 5 | EAH Subscription Request | EAS | EAHS | An EAS may send this request to subscribe to an EAHS to receive EAH notifications if/when the EAHS determines that the EAS needs to perform EAH centric operations. For example, synchronize/migrate application state information with another EAS. | Callback URI to receive EAH notifications<br>EAH notification criteria |
| 6 | EAH Subscription Response | EAHS | EAS | An EAHS returns this response to the EAS to indicate whether the EAH subscription was processed successfully or not. | Status indicator<br>Subscription Identifier |
| 7 | EAH Notification Request | EAHS | EAS | An EAHS may send a notification request to an EAS to notify it that it must perform some EAH related operations or that an EAH occurred regarding one or more ACs. | Subscription Identifier<br>EAS identifier/contact info of another EAS that this EAS must perform EAH operations with (e.g., Edge Application state synchronization/migration)<br>EAH centric operation(s) to perform |
| 8 | EAH Notification Response | EAS | EAHS | EAS sends this response to the EAHS to indicate whether it received and processed the EAH notification. | Status indicator |
| 9 | EAH Subscription Delete Request | EAS | EAHS | EAS sends this request to delete an EAH subscription from an EAHS such that it no longer receives EAH notifications from the EAHS. | EAS identifier<br>Subscription Identifier |
| 10 | EAH Subscription Delete Response | EAHS | EAS | An EAHS returns this response to the EAS to indicate whether the EAH subscription was deleted successfully or not. | Status indicator |

TABLE 3

IEAHS-EAHC Operations

| # | Operation | Source | Destination | Description | Parameters |
|---|-----------|--------|-------------|-------------|------------|
| 1 | EAH Context Request | EAHC | EAHS | An EAHC may send this request to an EAHS to share EAH related context with the EAHS. The EAHS may locally store and/or use this information to assist with the seamless edge application handovers of ACs between EASs. The EAHS may factor this context into its determination of if/when an EAH of an AC is required from one EAS to another EAS. The types of context that may be published by an EAHC may include but is not limited to the context defined inError! Reference source not found. Table 7. | AC identifier<br>AC context |

TABLE 3-continued

IEAHS-EAHC Operations

| # | Operation | Source | Destination | Description | Parameters |
|---|-----------|--------|-------------|-------------|------------|
| | | | | An EAHC may trigger the sending of this request if/when it receives an EAH Context Request from an AC. An EAHC may also trigger the sending of this request in other situations as well. | |
| | EAH Context Response | EAHS | EAHC | An EAHS may return this response to the EAHC to indicate that it received the context information shared by the EAHC. | Status indicator |
| 3 | EAH Request | EAHC | EAHS | An EAHC may send this request to an EAHS to explicitly request that the EAHS assist it with performing an EAH. An EAHC may also send this request to the EAHS to explicitly request that the EAHS assist it with initially connecting an AC to an EAS (e.g., when AC first starts up and is not connected to an EAS). An EAHC may trigger the sending of this request if/when it receives an EAH Request from an AC. An EAHC may also trigger the sending of this request when it autonomously initiates an EAH itself. An EAHC may also trigger the sending of this request to obtain information regarding available EASs in the current proximity (e.g., within the same LADN) of the UE and that are the best candidate EASs for an AC to be handed over to. | AC identifier(s) EAS/Service type indicators Current EAS identifier Location Route Service schedule requirements Service usage requirements Service provider requirements Service charges/fee requirements Service access latency requirements, Service access jitter requirements Security requirements Anticipate Communication Pattern (e.g., anticipate times for mobile originated data and data sizes). |
| 4 | EAH Response | EAHS | EAHC | An EAHS may return this response to the EAHC to indicate whether the requested EAH was completed successfully or not. Alternatively, this response may include a list of candidate EASs that the EAHS identifies as candidates for the EAHC to use when performing the handover of AC(s). An EAHC may then select one or more EASs from this list and transition AC(s) over to using the ESA(s). | New EAS identifier/contact info Allowed service schedule Allowed service usage Service provider Service charges/fee structure Security IDs/credentials API info of new EAS |
| 5 | EAH Subscription Request | EAHC | EAHS | An EAHC may send this request to subscribe to an EAHS to receive EAH notifications if/when the EAHS determines that an EAH is required by one or more ACs hosted on the same UE as the EAHC. The request may include notification criteria which an EAHC can specify to define what conditions the EAHC would like to receive EAH notifications from the EAHS. | Callback URI to receive EAH notifications EAH notification criteria Other parameters defined in EAH Request above |
| 6 | EAH Subscription Response | EAHS | EAHC | An EAHS may return this response to the EAHC to indicate whether the EAH subscription was processed successfully or not. | Status indicator Subscription Identifier |
| 7 | EAH Notification Request | EAHS | EAHC | An EAHS may send this request to the EAHC to notify it that an EAH is required for one or more ACs hosted on the same UE as the EAHC. The request may specify one or more EAH related operations that the EAHC is requested to perform. | Subscription Identifier Identifier(s)/contact info if new EAS(s) Identifier(s) of ACs EAH operations to perform New DNS Server contact info Allowed service schedule Allowed service usage Service provider Service charges/fee structure Security IDs/credentials API info of new EAS(s) |
| 8 | EAH Notification Response | EAHC | EAHS | An EAHC may send this response to the EAHS to indicate whether it received and processed the EAH notification and performed the necessary operations to handover the AC(s) to using the new EAS(s). | Status indicator |
| 9 | EAH Subscription Delete Request | EAHC | EAHS | An EAHC may send this request to delete an EAH subscription from an EAHS such that it no longer receives EAH notifications from the EAHS. | AC identifier Subscription Identifier |
| 10 | EAH Subscription Delete Response | EAHS | EAHC | An EAHS may return this response to the EAHC to indicate whether the EAH subscription was deleted successfully or not. | Status indicator |

TABLE 4

IEAHS-3GPP Operations

| # | Operation | Source | Destination | Description | Parameters |
|---|-----------|--------|-------------|-------------|------------|
| 1 | Edge Network Connect Request | EAHS | 3GPP Network | An EAHS may issue this request to have the 3GPP Network trigger one or more UEs to connect to a specified edge network, edge node and/or edge server | UE identifier(s)<br>Group identifier(s)<br>Edge network identifier<br>Edge node identifier<br>Edge server identifier<br>Trigger schedule<br>Trigger priority<br>The parameters that are listed above may be sent to the EAHC as part of a trigger payload. |
| 2 | Edge Network Connect Response | 3GPP Network | EAHS | 3GPP Network may return a response indicating if UE(s) connected to an edge network, node and/or server | UE identifier(s)<br>Group identifier(s)<br>Edge network identifier<br>Edge node identifier<br>Edge server identifier |
| 3 | Edge Network Monitoring Request | EAHS | 3GPP Network | An EAHS may issue a subscription request to the 3GPP Network to have it monitor for UE(s) that connect or disconnect from specified edge network(s), edge node(s), or edge server(s) | UE identifier(s)<br>Group identifier(s)<br>Edge network identifier<br>Edge node identifier(s)<br>Edge server identifier(s) that UE(s) are to connect to<br>Monitoring Schedule<br>Monitoring criteria<br>Notification call back address |
| 4 | Edge Network Monitoring Response/ Notification | 3GPP Network | EAHS | A 3GPP Network may return a response indicating status of the subscription request. A 3GPP Network may also return notifications to an EAHS if/when monitoring criteria have been met for UE(s) that connect or disconnect from an edge network, edge node and/or edge server | Subscription identifier<br>UE identifier(s)<br>Group identifier(s)<br>Edge network identifier<br>Edge node identifier(s)<br>Edge server identifier(s)<br>Indication(s) of whether connect or disconnect occurred for UE(s) from a specified edge network, node, server. |
| 5 | QoS Session Handover Request | EAHS | 3GPP Network | An EAHS may issue a request to the 3GPP Network to have it perform a QoS session handover operation consisting of setting up a new QoS session between a specified set of session endpoints that has the same QoS configuration as an existing QoS session. Optionally, once the new QoS session has been established, the 3GPP Network can also tear down the old one if instructed to do so. | Existing QoS session ID (e.g., flowID)<br>New QoS session endpoints<br>QoS session handover schedule<br>QoS session handover criteria<br>Indicator whether to tear-down existing QoS Session once new one is established |
| 6 | QoS Session Handover Response | 3GPP Network | EAHS | 3GPP Network may return a response indicating status of QoS session handover request. | Status of whether new QoS session was established<br>New QoS session ID (e.g., flowID)<br>New QoS description (e.g., flow description)<br>Indication of whether existing QoS Session was torn down |
| 7 | Route Configuration Request | EAHS | 3GPP Network | An EAHS may issue a request to the 3GPP Network to inform it of the anticipated route that a UE is expected to take. The 3GPP Network may use this information to manage its network resources along the route more efficiently. | Route information consisting of way point locations along the route. The locations may be specified in terms of geo-locations or in terms of identifiers of edge networks, edge nodes and/or edge servers along the route.<br>Route information may also include schedule component indicating the times when a UE is expected to be in proximity to the specified way points. |
| 8 | Route Configuration Response | 3GPP Network | EAHS | 3GPP Network may return a response indicating that it received the request. The 3GPP may include a suggested modification to the route (e.g., to allow for more optimal management/utilization of network resources) | Status indication<br>Suggested route modifications |

TABLE 4-continued

IEAHS-3GPP Operations

| # | Operation | Source | Destination | Description | Parameters |
|---|---|---|---|---|---|
| 9 | Route Monitoring Request | EAHS | 3GPP Network | An EAHS may issue a subscription request to the 3GPP Network to have it monitor UE(s) along an anticipated route and send notifications to the EAHS based on events of interest to the EAHS such when a UE reaches the next specified way point along the route, or the UE deviates from the specified route. | UE identifier(s) Group identifier(s) Notification call back address Monitoring Schedule Monitoring criteria (e.g., UE has reached the next way point along route, or deviated from route, etc.) Route information (see description above in Route Configuration Request) |
| 10 | Route Monitoring Response/ Notification | 3GPP Network | EAHS | 3GPP Network may return a response indicating status of subscription request. 3GPP Network may also returns notifications to EAHS if/when monitoring criteria have been for UE(s) that connect or disconnect from an edge network, edge node and/or edge server | Subscription identifier UE identifier(s) Group identifier(s) Indication(s) of which monitoring criteria have been met (e.g., UE has reached the next way point along route, or deviated from route, etc.) whether connect or disconnect occurred for UE(s) from a specified edge network, node, server |

TABLE 5

IEAHS-MF Operations

| # | Operation | Source | Destination | Description | Parameters |
|---|---|---|---|---|---|
| 1 | EAS Management Request | EAHS | MF | An EAHS may issue this request to trigger a MF to manage one or more EASs on one or more edge nodes residing in one or more edge networks such that the EAS is available for an AC to access. | EAS Type(s) Management Operations (e.g., install/de-install EAS, configure/re-configure EAS, activate/de-activate EAS, etc.) UE identifier(s) Group identifier(s) AC identifier(s) Edge network identifier Edge node identifier Edge server identifier(s) Management schedule Management priority |
| 2 | EAS Management Response | OF | EAHS | A MF may return a response indicating if the management operation was successfully performed and the identifier(s) of the EAS(s) that were managed. | Management status indication EAS identifier(s) |
| 3 | Edge Monitoring Request | EAHS | MF | An EAHS may issue a subscription request to a MF to have it monitor status and availability of one or more EASs, edge nodes, and/or edge networks. The EAHS may factor this information into its decisions on whether handovers of ACs to different EASs is required. | UE identifier(s) Group identifier(s) Edge network identifier(s) Edge node identifier(s) EAS identifier(s) Monitoring Schedule Monitoring criteria Notification call back address |
| 4 | Edge Monitoring Response/ Notifications | 3GPP Network | EAHS | An MF may return a response indicating status of subscription request. An MF may also return notifications to the EAHS if/when monitoring criteria have been for regarding the status and availability of the specified EASs, edge nodes, and/or edge networks. | Subscription identifier UE identifier(s) Group identifier(s) Edge network identifier Edge node identifier(s) EAS identifier(s) Indication(s) of which monitoring criteria has been met |

TABLE 6

EAH Policy Rules

| Rule | Description |
| --- | --- |
| EAS types | Defines the types of EASs that EAHS/EAHC may perform EAH for |
| EASs | Defines specific EAS instances that EAHS/EAHC may perform EAH for |
| users | Defines the users that EAHS/EAHC may perform EAH for |
| subscribers | Defines the subscribers (e.g., account holders) that EAHS/EAHC may perform EAH for |
| ACs | Defines specific AC instances that EAHS/EAHC may perform EAH for |
| AC types | Defines the types of ACs that EAHS/EAHC may perform EAH for |
| providers | Defines the network or service providers that EAHS/EAHC may perform EAH for |
| UE locations | Defines the UE locations for which EAHS/EAHC may perform EAH for |
| UE routes | Defines the UE routes for which EAHS/EAHC may perform EAH for |
| Edge networks | Defines the edge networks for which EAHS/EAHC may perform EAH for |
| Edge nodes | Defines the edge nodes for which EAHS/EAHC may perform EAH for |
| UEs | Defines the UE instances that EAHS/EAHC may perform EAH for |
| Privacy | Defines privacy restrictions regarding what information an EAHS/EAHC is permitted to include or share while performing EAH (e.g., UE location, route, application data, etc.) |
| DNS Servers | Defines the DNS Servers that an EAHS/EAHC shall use when performing edge application handovers |
| SSCMP | SSC mode selection policy or an SSC Mode |
| 5QI | Required 5QI values or ranges |
| Speed | Maximum Client Speed to access the service |

TABLE 7

EAH Related Context Information

| Context | Description |
| --- | --- |
| EAS types | The type(s) of EAS(s) required by an AC |
| EASs | The current EAS instance(s) being used by an AC |
| EAS availability | The current availability of EASs (e.g., deployment status and/or installation/activation status) |
| user | The current user of an AC |
| subscriber | The subscriber associated with the current user of an AC |
| ACs | The current AC instances active on a UE |
| AC types | The current type(s) of AC(s) active on a UE |
| UE location | The current or planned location of a UE |
| UE route | The current or planned/predicted route that a UE is taking |
| core network | The current core network that is being used |
| core network status | The status of the 3GPP core network (e.g., congestion levels) |
| edge networks | The current edge network(s) that UE is connected to and using |
| edge network status | The status of the edge network(s) |
| edge node availability | The current availability of edge nodes (e.g., resource utilization status of edge nodes). |
| QoS/QoE | The current QoS/QoE requirements of an active AC or its user |
| Schedule | The scheduled times of when an AC requires access to EAS(s) |

TABLE 8

3GPP SA6 EDGEAPP Reference Point Applicability

| Reference Point | SA6 EDGEAPP Reference Points |
| --- | --- |
| $I_{EAHC-AC}$ | EDGE-5, EDGE-13(new) |
| $I_{EAHS-EAHC}$ | EDGE-1, EDGE-4, EDGE-8(new) |
| $I_{EAHS-3GPP}$ | EDGE-2, EDGE-11(new), EDGE-12(new) |
| $I_{EAHS-MF}$ | EDGE-6 |
| $I_{EAHS-EAS}$ | EDGE-3, EDGE-9(new) |

TABLE 9

3GPP SA6 V2X Reference Point Applicability

| Reference Point | SA6 V2X Reference Points |
| --- | --- |
| $I_{EAHC-AC}$ | Vc, SEAL-C |
| $I_{EAHS-EAHC}$ | V5-AE, V1-AE, SEAL-PC5, SEAL-UU |
| $I_{EAHS-3GPP}$ | T8, V2, Rx, xMB-C, xMB-U, MB2-C, MB2-U |
| $I_{EAHS-MF}$ | Possible new reference point |
| $I_{EAHS-EAS}$ | Vs, SEAL-S |

TABLE 10 oneM2M Reference Point Applicability

| Reference Point | oneM2M Reference Points |
| --- | --- |
| $I_{EAHC-AC}$ | Mca |
| $I_{EAHS-EAHC}$ | Mcc |
| $I_{EAHS-3GPP}$ | Mcn |
| $I_{EAHS-MF}$ | Mcn |
| $I_{EAHS-EAS}$ | Mca |

We claim:

1. A user equipment, UE, hosting an Edge Application Handover Client, EAHC, the UE comprising a processor, a memory, and communication circuitry, the UE being connected to a first network via the communication circuitry, the UE further comprising computer-executable instructions stored in the memory which, when executed by the processor, cause the EAHC to:

receive, from an application client, AC a first request comprising AC context information, wherein the AC context information comprises, for a service from a first Edge Application Server, EAS, an expected location or an anticipated route of the UE where the service provided by the EAS will be required, and wherein the AC context information further comprises a schedule of times during which the service provided by the EAS will be required;

send, to an Edge Application Handover Server, EAHS, based on the AC context information, a second request comprising the AC context information; and receive, from the EAHS, an acknowledgement of the second request.

2. The UE of claim 1, wherein the AC context information further comprises an identifier of the AC.

3. The UE of claim 1, wherein the AC context information further comprises a required rate of requests when accessing the first EAS.

4. The UE of claim 1, wherein the AC context information further comprises a current location of the AC.

5. The UE of claim 1, wherein the AC context information further comprises an identifier of the first EAS.

6. The UE of claim 1, wherein the AC context information further comprises a service continuity requirement.

7. The UE of claim 6, wherein the service continuity requirement comprises a service continuity mode.

8. A network apparatus hosting an Edge Application Handover Server, EAHS, the apparatus comprising a processor, a memory, and communication circuitry, the apparatus being connected to a first network via the communication circuitry, the apparatus further comprising computer-executable instructions stored in the memory which, when executed by the processor, cause the EAHS to:

receive, from a first Edge Application Handover Client, EAHC, hosted on a first User Equipment, UE, a request comprising Application Client, AC, context information pertaining to an AC, wherein the AC context information comprises an expected location or an anticipated route for which a service provided by a first Edge Application Server, EAS, is required to be accessible by the AC, and wherein the AC context information further comprises a schedule comprising times when the AC requires access to the service provided by the EAS;

send, to the first EAHC, a response indicating the AC context information was received;

trigger, based on the schedule and the expected location or the anticipated route, a handover of the AC from the first EAS to a second EAS.

9. The EAHS of claim 8, wherein the instructions further cause the EAHS to:

support an interface to a 3GPP entity in a 3GPP system;

receive a current location of the first UE from the 3GPP entity;

determine, by comparing the current location of the first UE to the expected location or anticipated route, timing of when to trigger the handover of the AC from the first EAS to the second EAS.

10. The EAHS of claim 8, wherein the instructions further cause the EAHS to trigger the first EAHC, to perform edge application handover operations on behalf of an AC to assist the AC in performing an edge application handover.

11. The EAHS of claim 8, wherein the instructions further cause the EAHS to receive, from a second EAHC hosted on a second UE, a subscription request pertaining to receiving notifications from the EAHS.

12. The EAHS of claim 11, wherein the instructions further cause the EAHS to send, to second EAHC, a notification responsive the subscription request.

13. The EAHS of claim 8, wherein the instructions further cause the EAHS to support an interface to a management function and, via the interface, trigger the management function to instantiate the first EAS.

14. The EAHS of claim 8, wherein the instructions further cause the EAHS to:

send, to a 3GPP network, a request that the 3GPP network track movement of the first UE along the anticipated route; and receive, from the 3GPP network, a notification regarding the movement of the first UE, the notification comprising either an indication of an arrival of the first UE within proximity of a way point along the anticipated route or an indication that the first UE has deviated from the anticipated route.

* * * * *